US012651014B1

(12) United States Patent
Ménard et al.

(10) Patent No.: US 12,651,014 B1
(45) Date of Patent: Jun. 9, 2026

(54) CONTENT GENERATION SERVICE FOR A USER INTERFACE OF A CONTENT COLLABORATION PLATFORM

(71) Applicant: Atlassian Pty Ltd., Sydney (AU)

(72) Inventors: Guillaume Ménard, Mountain View, CA (US); Peter Martigny, San Francisco, CA (US); Rudra Saha, Jersey City, NJ (US); Faraz Mahmoodian, Melbourne (AU); Anand Kamleshbhai Naik, Toronto (CA); Alex Jansons, Sunnyvale, CA (US); Thirumalaivelu Alagianambi, Milpitas, CA (US)

(73) Assignee: ATLASSIAN PTY LTD., Sydney (AU)

( * ) Notice: Subject to any disclaimer, the term of this patent is extended or adjusted under 35 U.S.C. 154(b) by 0 days.

(21) Appl. No.: 19/087,537

(22) Filed: Mar. 23, 2025

(51) Int. Cl.
  *G06F 16/3329*    (2025.01)
  *G06F 9/451*    (2018.01)

(52) U.S. Cl.
  CPC .......... *G06F 16/3329* (2019.01); *G06F 9/451* (2018.02)

(58) Field of Classification Search
  CPC .............................. G06F 16/332; G06F 9/451
  See application file for complete search history.

(56) References Cited

U.S. PATENT DOCUMENTS

| | | | | |
|---|---|---|---|---|
| 2023/0188577 A1* | 6/2023 | Venkiteswaran | ... | G06F 16/9536 709/204 |
| 2023/0205833 A1* | 6/2023 | Saha | ...... | G06F 16/93 715/711 |
| 2025/0112878 A1* | 4/2025 | Bayless | ........ | H04L 51/02 |
| 2025/0217399 A1* | 7/2025 | Mauritz | ...... | G06F 16/345 |

* cited by examiner

*Primary Examiner* — William P Bartlett
(74) *Attorney, Agent, or Firm* — Brownstein Hyatt Farber Schreck, LLP

(57) ABSTRACT

Embodiments described herein relate to systems and methods for content summary generation within a content collaboration platform. A graphical user interface for a platform of the system may include selectable graphical objects, hierarchically arranged elements of a hierarchical element tree, feed items, and other graphical objects. The objects may contain a portion of content obtained from associated content items, and other selectable elements and graphics. Content summaries may be generated synchronously for a variety of use cases and user-preference attributes or settings and stored in a content graph for use by a frontend operating a particular graphical user interface.

20 Claims, 21 Drawing Sheets

500a

500b

500c

500d

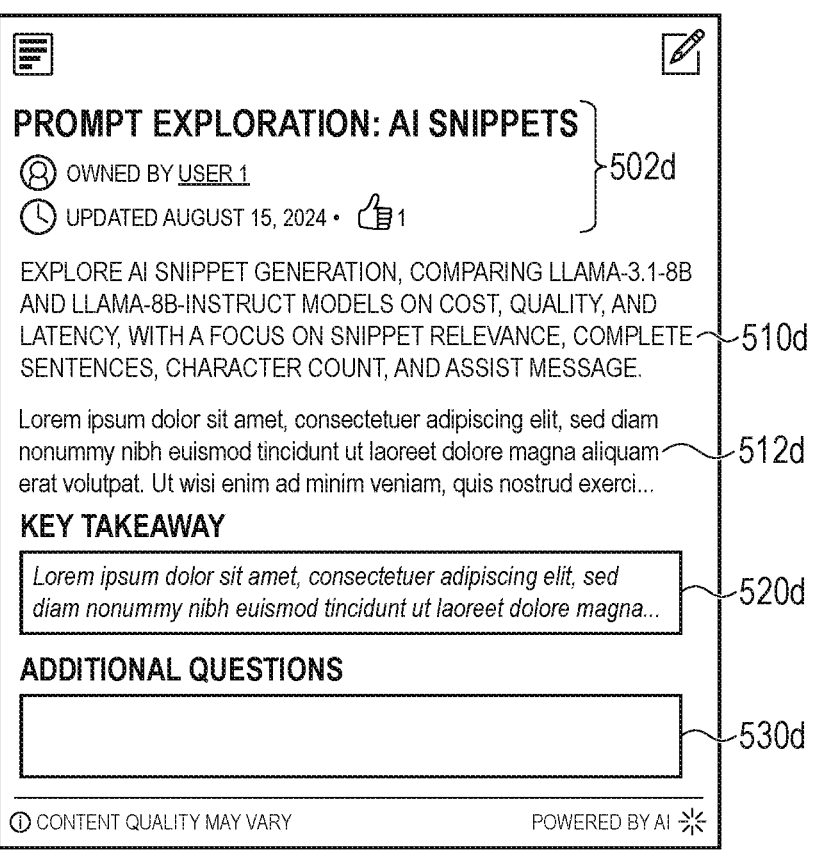

PROMPT EXPLORATION: AI SNIPPETS

⊗ OWNED BY USER 1

🕐 UPDATED AUGUST 15, 2024 • 👍1

502d

EXPLORE AI SNIPPET GENERATION, COMPARING LLAMA-3.1-8B AND LLAMA-8B-INSTRUCT MODELS ON COST, QUALITY, AND LATENCY, WITH A FOCUS ON SNIPPET RELEVANCE, COMPLETE SENTENCES, CHARACTER COUNT, AND ASSIST MESSAGE. — 510d

Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci... — 512d

KEY TAKEAWAY

*Lorem ipsum dolor sit amet, consectetuer adipiscing elit, sed diam nonummy nibh euismod tincidunt ut laoreet dolore magna...* — 520d

ADDITIONAL QUESTIONS

530d

ⓘ CONTENT QUALITY MAY VARY        POWERED BY AI ※

CONTENT GENERATION SERVICE FOR A USER INTERFACE OF A CONTENT COLLABORATION PLATFORM

TECHNICAL FIELD

Embodiments described herein relate to content collaboration platforms and, in particular, to systems and methods for generating content to be displayed in a graphical user interface of the content collaboration platform.

BACKGROUND

An organization can establish a collaborative work environment by self-hosting, or providing its employees with access to, a suite of discrete software platforms or services to facilitate cooperation and completion of work. However, in some instances, content may be managed by multiple discrete platforms or widely distributed within a single platform. Identifying relevant content or referenced content for particular elements in a given user interface may, in some implementations, require the user to make numerous user-interface selections or navigate away from the current user interface. These selections or navigation operations can burden the resources of the various systems and also delay or complicate the user's interaction with the platform or multiple platforms.

The systems and techniques described herein are directed to a content generation service that is able to generate predefined content snippets or segments that can be displayed in-context with other selected elements, which may reduce the need for numerous interface selections or navigation operations.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIGS. 5A-5D depict example portions of a graphical user interface including different example content windows, in accordance with aspects described herein.

The use of the same or similar reference numerals in different figures indicates similar, related, or identical items.

Figure 1:
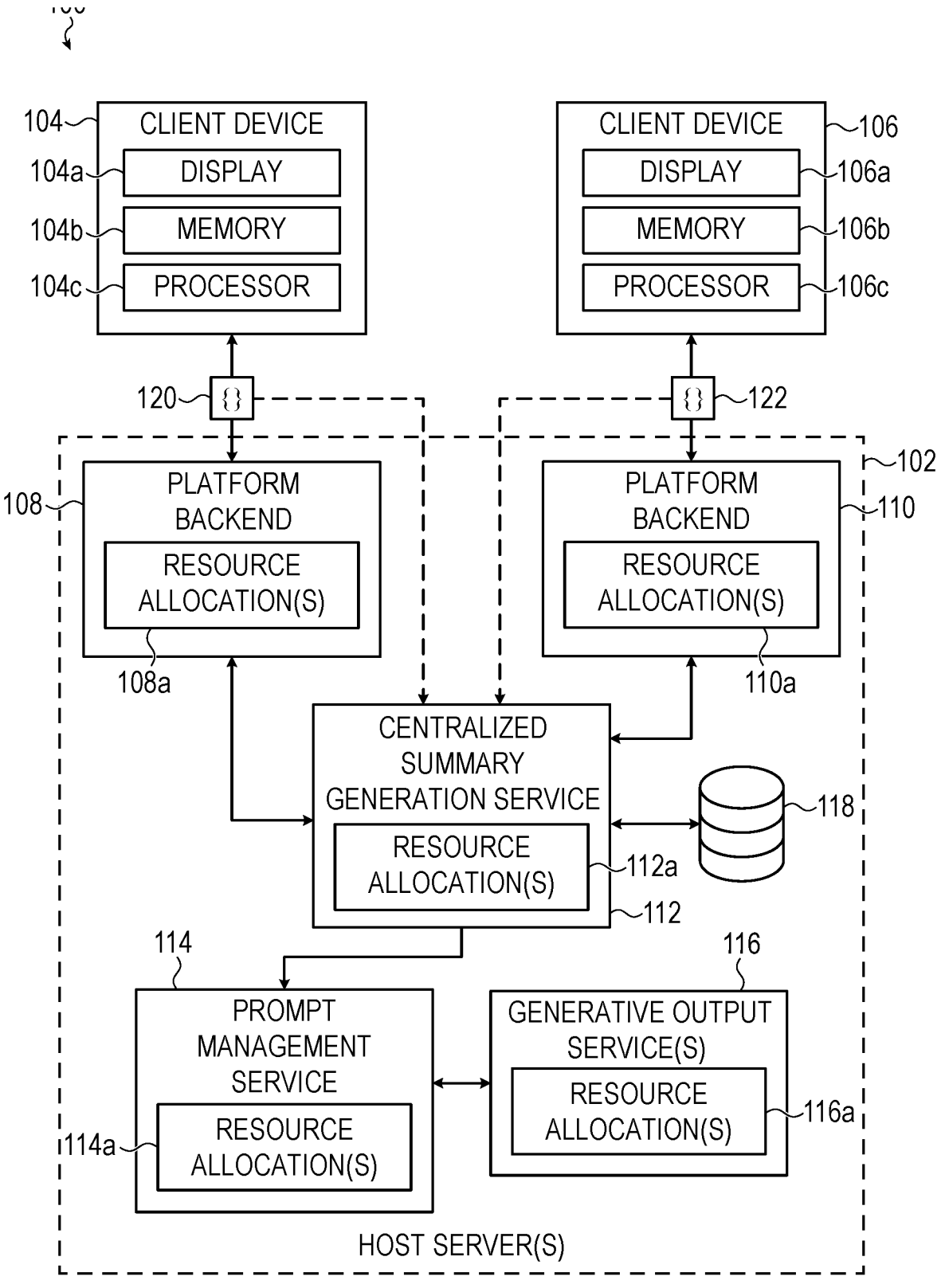
FIG. 1 depicts a system diagram that can include and/or may receive input from a generative output engine, in accordance with aspects described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems, devices, and methods for content generation, including summary generation within window elements of a graphical user interface in content collaboration platforms. As described herein, the content generation may be performed using portions of existing content items managed by respective platforms and presented to a user via window elements or other graphical objects displayed in a current graphical user interface. The generation of at least some of the content may be automatically performed asynchronously with respect to use and display of respective graphical user interfaces, which may improve the performance of the interface while also allowing the system to generate accurate and current generative content. The content may also be generated in accordance with an anticipated role or user profile of a content viewer, which may adapt the graphical user interface for use by a particular user. Further, the format and presentation of the generative content may be adapted based on a classification of the source material or content items.

Example content collaboration platforms include documentation platforms or systems, issue tracking platforms or systems, information technology service management (ITSM) platforms, project management platforms, scheduling platforms or systems, software development platforms, file sharing systems, video sharing platforms, video conferencing platforms, customer relation management systems, and the like. In general, content collaboration platforms (also referred to herein as "collaboration platforms" or "collaboration services") can be used to generate, store, and organize user-generated content. As described herein, a collaboration platform or service may include an editor that is configured to receive user input and generate user-generated content that is saved as a content item. With respect to various examples provided herein, the term "collaboration platform" or "collaboration service" may be used to refer to a documentation platform or service configured to manage electronic documents or pages created by the system users, an issue tracking platform or service that is configured to manage or track issues or tickets in accordance with an issue or ticket workflow, a source-code management platform or service that is configured to manage source code and other aspects of a software product, a manufacturing resource planning platform or service configured to manage inventory, purchases, sales activity or other aspects of a company or enterprise. In some instances, the functionality described herein may be adapted to multiple platforms or adapted for cross-platform use, through the use of a common or unitary service, such as a summary generation service. For example, the functionality described in an example may be provided with respect to a particular collaboration platform, but the same or similar functionality can be extended to other platforms by using the same service. Also, as described above, a set of host services or platforms may be accessed through a common gateway or using a common authentication scheme, which may allow a user to transition between platforms and access platform-specific content without having to enter user credentials for each platform.

A collaboration platform may utilize mechanisms such as selectable graphical objects, to link from one portion of the collaboration platform to another portion of the collaboration platform, or between one platform and content of a second platform. The selectable graphical objects may be associated with a particular content item and the object may contain (e.g., display) a portion of content obtained from the particular content item, and other selectable elements and graphics. While the displayed content may provide some limited information about the associated content item, the displayed content may be insufficient to provide enough context for the user about the topic or subject matter of the content item. In some systems, a user would need to select the selectable graphical object, causing the graphical user interface to be redirected to the associated content item, which may be hosted by the same or a different platform. However, as described herein, a user may hover over the selectable graphical object to cause generation display of a floating window or other graphical element that includes additional information about the associated content item. The additional content may include additional metadata that is extracted from the content item and a summary or brief description of the content of the content item. The summary or brief description may include one or more text phrases, which may be referred to herein as snippets, text fragments, or blurbs, which may include a topical description, content overview, or content summary of the respective content item. As described herein, the summary or brief description may be produced as rich text and may include non-text elements that may be formatted in accordance with platform-specific content definitions. For example, the summary or brief description may include "@mentions," special graphical elements or symbols, interactive elements, or other rich content, which may be provided by the respective platform.

A collaboration platform may also include other graphical elements that may be associated with content items including, for example, hierarchical tree elements, feed elements, a card, a tile, or other similar elements. Similar to as described above with respect to selectable graphical objects, a designated user input may be used to trigger a floating window or other graphical object that contains additional information extracted from and generated using content from the associated content item. Additionally, the floating window may include metadata or other content that is extracted from the content items along with selectable links and selectable controls for obtaining additional information related to the associated content item.

The summary or brief description may be generated by the system in accordance with a synchronous or scheduled timing profile, prior to the user input, which may improve the responsiveness and performance of the user interface. The system may use a centralized summary generation service or other similar service to provide generative content that represents topical descriptions or subject matter summaries that are based on content extracted from the content item. As described herein, the centralized summary generation service may use a generative output engine, which includes or access a large-language model in order to produce a generative response. More specifically, the centralized summary generation service may include a prompt generation service or module, which build or constructs custom prompts including predetermined query prompt text and content extracted from the respective content item. The prompt may be provided to the generative output engine which, in response, produces or generates a generative response. The generative response typically includes natural language content, which may be used to produce the summary or brief description. In some cases, the generative response is processed in order to produce rich text content, which is adapted for use with a respective platform or system.

Further, the centralized summary generation service may be configured to provide current or accurate representations of the underlying content by performing regular or frequent summary-generation cycles. To reduce the computational load on the system, summary-generation operations may be limited to new content items and content items that have experienced a substantial or threshold amount of change since the last summary-generation operation. As described herein, a content criteria or data freshness criteria may be used to assess whether summary-generation operations are to be performed on a particular content item. The content criteria may be used by determining an amount of content modification that has occurred, which may be managed by performing a content comparison or, in some cases, using a content modification flag or other attribute of the content item, which may be used to indicate that a threshold amount of modifications have been performed. Limiting the number of generation operations while maintaining a suitable generation cycle frequency can provide accurate and current content without overly burdening the system.

As further described herein, the synchronous or scheduled generation of the summaries or brief descriptions may be saved in a content store for recall and use by a respective frontend application operating a graphical user interface of the collaboration platform. The content store may include a graph-based data storage structure or scheme in which content is stored in nodes, which may have defined relationships or edges with respect to other nodes. A graph-based data storage structure may provide a scalable system for accessing the content quickly for the respective frontend. In some cases, the graph-based storage structure may be referred to as a knowledge graph and may include nodes having a variety of types or classes of stored content and may correspond to a variety of different entities, platforms, or other abstractions. The graph-based data storage structure may also allow for the expansion of nodes or related content to allow the system to utilize different versions of the summaries, which may be deployed in different contexts or use cases.

As described herein, the summary or brief description may be formulated based on a type of content (e.g., a classification type) of the respective content item. This allows the system to adapt the format and content of the summary to correlate more closely with the underlying content item in order to propagate the most relevant content to the user. For example, some content may be more relevant or useful when presented as a text narrative. Other content may be more relevant or useful when presented in a table or list format. As described herein, a generative output engine may be used to analyze and classify content items in order to determine the parameters and format of the summary. In addition, content may be generated based on an anticipated role of a user or an anticipated use case. For example, the technical nature or amount of detail in a summary may be tailored for different user profile attributes including user role, job description, technical expertise, or other quality. Multiple versions or content summaries may be stored in the graph-based data storage structure and an appropriate version may be selected based on the context and/or user of the frontend application.

As further described herein, in response to a designated input (e.g., a hover input), the selectable graphical object may be refreshed or displayed with a button or other input to request a summary of the target content to be populated into the selectable graphical object. Upon receiving input to the button, the centralized summary generation service can prepare a prompt for a generative output engine based on the target content, provide the prompt to the generative output engine, receive a response, and cause generation of a summary within the selectable graphical object based on the response. In some examples, the interface may also provide an input field which may allow the user to ask questions of or otherwise query the system regarding the target content, the answers to which can be displayed along with, or instead of, the summary within the selectable graphical object. Other example interfaces and modifications may be implemented using the principles and techniques described herein.

Automatically generated content can supplement, summarize, format, and/or structure existing tenant-owned user-generated content created by a user while operating a software platform, such as described herein. In one embodiment, user-generated content can be supplemented by an automatically generated summary. The generated summary may be prepended to the content such that when the content is rendered for other users, the summary appears first. In other cases, the summary may be appended to an end of the document. In yet other examples, the generated summary may be transmitted to another application, messaging system, or notification system. For example, a generated document summary can be attached to an email, a notification, a chat or ITSM support message, or the like, in lieu of being attached or associated with the content it summarizes.

In another example, user-generated content can be supplemented by automatic insertion of format markers or style classes (e.g., markdown tags, CSS classes, and the like) into the user-generated content itself. In other examples, user-generated content can be rewritten and/or restructured to include more detail, remove unnecessary detail, and/or adopt a more neutral or positive tone. These examples are not exhaustive.

In yet other examples, multiple disparate user-generated content items, stored in different systems or in different locations, can be collapsed together into a single summary or list of summaries.

In addition to embodiments in which automatically generated content is generated in respect of existing user-generated content (and/or appended thereto), automatically generated content as described herein can also be used to supplement API requests and/or responses generated within a multiplatform collaboration environment. For example, in some embodiments, API request bodies can be generated automatically by leveraging systems described herein. The API request bodies can be appended to an API request provided as input to any suitable API of any suitable system. In many cases, an API with a generated body can include user-specific, API-specific, and/or tenant-specific authentication tokens that can be presented to the API for authentication and authorization purposes.

The request bodies, in these embodiments, can be structured so as to elicit particular responses from one or more software platforms' API endpoints. For example, a documentation platform may include an API endpoint that causes the documentation platform to create a new document from a specified template. Specifically, in these examples, a request to this endpoint can be generated, in whole or in part, automatically. In other cases, an API request body can be modified or supplemented by automatically generated output, as described herein.

For example, an issue tracking system may present an API endpoint that causes creation of new issues in a particular project. In this example, string or other typed data such as a new issue titles, new issue state, new issue description, and/or new issue assignee fields can be automatically generated and inserted into appropriate fields of a JSON-formatted request body. Submitting the request, as modified/supplemented by automatically generated content, to the API endpoint can result in creation of an appropriate number of new issues.

In another example, a trouble ticket system (e.g., an information technology service management or "ITSM" system) may include an interface for a service agent to chat with or exchange information with a customer experiencing a problem. In some cases, automatically generated content can be displayed to the customer, whereas in other cases, automatically generated content can be displayed to the service agent.

For example, in the first case, automatically generated content can summarize and/or link to one or more documents that outline troubleshooting steps for common problems. In these examples, the customer experiencing an issue can receive through the chat interface, one or more suggestions that (1) summarize steps outlined in comprehensive documentation, (2) link to a relevant portion of comprehensive documentation, or (3) prompt the customer to provide more information. In the second case, a service agent can be assisted by automatically generated content that (1) summarizes steps outlined in comprehensive documentation and/or one or more internal documentation tools or platforms, (2) link to relevant portions of comprehensive help documentation, or (3) prompt the service agent to request more information from the customer. In some cases, generated content can include questions that may help to further narrowly characterize the customer's problem. More generally, automatically generated content can assist either or both service agents and customers in ITSM environments.

The foregoing embodiments are not exhaustive of the manners by which automatically generated content can be used in multi-platform computing environments, such as those that include more than one collaboration tool.

More generally and broadly, embodiments described herein include systems configured to automatically generate content within environments defined by software platforms. The content can be directly consumed by users of those software platforms or indirectly consumed by users of those software platforms (e.g., formatting of existing content, causing existing systems to perform particular tasks or sequences of tasks, orchestrate complex requests to aggregate information across multiple documents or platforms, and so on) or can integrate two or more software platforms together (e.g., reformatting or recasting user generated content from one platform into a form or format suitable for input to another platform).

Scalable Network Architecture for Automatic Content Generation

More specifically, systems and methods described herein can leverage a scalable network architecture that includes an input request queue, a normalization (and/or redaction) preconditioning processing pipeline, an optional secondary request queue, and a set of one or more purpose-configured large language model instances (LLMs) and/or other trained classifiers or natural language processors.

Collectively, such engines or natural language processors may be referred to herein as "generative output engines." A system incorporating a generative output engine can be referred to as a "generative output system" or a "generative output platform." Broadly, the term "generative output engine" may be used to refer to any combination of computing resources that cooperate to instantiate an instance of software (an "engine") in turn configured to receive a string prompt as input and configured to provide, as deterministic or pseudo-deterministic output, generated text which may include words, phrases, paragraphs and so on in at least one of (1) one or more human languages, (2) code complying with a particular language syntax, (3) pseudocode conveying in human-readable syntax an algorithmic process, or (4) structured data conforming to a known data storage protocol or format, or combinations thereof.

The string prompt (or "input prompt" or simply "prompt") received as input by a generative output engine can be any suitably formatted string of characters, in any natural language or text encoding.

In some examples, prompts can include non-linguistic content, such as media content (e.g., image attachments, audiovisual attachments, files, links to other content, and so on) or source or pseudocode. In some cases, a prompt can include structured data such as tables, markdown, JSON formatted data, XML formatted data, and the like. A single prompt can include natural language portions, structured data portions, formatted portions, portions with embedded media (e.g., encoded as base64 strings, compressed files, byte streams, or the like) pseudocode portions, or any other suitable combination thereof.

The string prompt may include letters, numbers, whitespace, punctuation, and in some cases formatting. Similarly, the generative output of a generative output engine as described herein can be formatted/encoded according to any suitable encoding (e.g., ISO, Unicode, ASCII as examples).

In these embodiments, a user may provide input to a software platform coupled to a network architecture as described herein. The user input may be in the form of interaction with a graphical user interface affordance (e.g., button or other UI element), or may be in the form of plain text. In some cases, the user input may be provided as typed string input provided to a command prompt triggered by a preceding user input. Many of the examples described herein are directed to an interface that includes a generative interface panel having an input region that can receive commands, references to content, links, and other input, at least a portion of which is provided as natural language text.

In some examples, the user may engage with a button in a UI that causes the generative interface panel or a command prompt input box to be rendered, into which the user can begin typing a command. In other cases, the user may position a cursor within an editable text field and the user may type a character or trigger sequence of characters that cause a command-receptive user interface element to be rendered. As one example, a text editor may support slash commands-after the user types a slash character, any text input after the slash character can be considered as a command to instruct the underlying system to perform a task.

Regardless of how a software platform user interface is instrumented to receive user input, the user may provide an input that includes a string of text including a natural language request or instruction (e.g., a prompt). The prompt may be provided as input to an input queue including other requests from other users or other software platforms. Once the prompt is popped from the queue, it may be normalized and/or preconditioned by a preconditioning service. The preconditioning service may be provided by one or more registered plugins that are selected in accordance with an analysis of the input and/or context of the current session.

The preconditioning service can, without limitation: append additional context to the user's raw input; may insert the user's raw input into a template prompt selected from a set of prompts (also referred to herein as "predetermined query prompt text" or "predetermined prompt text"); replace ambiguous references in the user's input with specific references (e.g., replace user-directed pronouns with user IDs, replace @mentions with user IDs, and so on); correct spelling or grammar; translate the user input to another language; or other operations. Thereafter, optionally, the modified/supplemented/hydrated user input can be provided as input to a secondary queue that meters and orders requests from one or more software platforms to a generative output system, such as described herein. The generative output system receives, as input, a modified prompt and provides a continuation of that prompt as output which can be directed to an appropriate recipient, such as the graphical user interface operated by the user that initiated the request or such as a separate platform. Many configurations and constructions are possible.

Large Language Models

An example of a generative output engine of a generative output system as described herein may be a large language model (LLM). An LLM may include a neural network specifically trained to determine probabilistic relationships between members of a sequence of lexical elements, characters, strings or tags (e.g., words, parts of speech, or other subparts of a string), the sequence presumed to conform to rules and structure of one or more natural languages and/or the syntax, convention, and structure of a particular programming language and/or the rules or convention of a data structuring format (e.g., JSON, XML, HTML, Markdown, and the like).

More simply, an LLM is configured to determine what word, phrase, number, whitespace, nonalphanumeric character, or punctuation is most statistically likely to be next in a sequence, given the context of the sequence itself. The sequence may be initialized by the input prompt provided to the LLM. In this manner, output of an LLM is a continuation of the sequence of words, characters, numbers, whitespace, and formatting provided as the prompt input to the LLM.

To determine probabilistic relationships between different lexical elements (as used herein, "lexical elements" may be a collective noun phrase referencing words, characters, numbers, whitespace, formatting, and the like), an LLM is trained against as large of a body of text as possible, comparing the frequency with which particular words appear within N distance of one another. The distance N may be referred to in some examples as the token depth or contextual depth of the LLM.

In many cases, word and phrase lexical elements may be lemmatized, part of speech tagged, or tokenized in another manner as a pretraining normalization step, but this is not required of all embodiments. An LLM is typically trained on natural language text in respect of multiple domains, subjects, contexts, and so on; typical commercial LLMs are trained against substantially all available internet text or written content available (e.g., printed publications, source repositories, and the like). Training data may occupy petabytes of storage space in some examples.

As an LLM is trained to determine which lexical elements are most likely to follow a preceding lexical element or set of lexical elements, an LLM must be provided with a prompt that invites continuation. In general, the more specific a prompt is, the fewer possible continuations of the prompt exist. For example, the grammatically incomplete prompt of "can a computer" invites completion, but also represents an initial phrase that can begin a near limitless number of probabilistically reasonable next words, phrases, punctuation and whitespace. A generative output engine may not provide a contextually interesting or useful response to such an input prompt, effectively choosing a continuation at random from a set of generated continuations of the grammatically incomplete prompt.

By contrast, a narrower prompt that invites continuation may be "can a computer supplied with a 30 W power supply consume 60 W of power?" A large number of possible correct phrasings of a continuation of this example prompt exist, but the number is significantly smaller than the preceding example, and a suitable continuation can be selected or generated using a number of techniques. In many cases, a continuation of an input prompt may be referred to more generally as "generated text" or "generated output" provided by a generative output engine as described herein.

Fundamentally all written natural languages, syntaxes, and well-defined data structuring formats can be probabilistically modeled by an LLM trained by a suitable training dataset that is both sufficiently large and sufficiently relevant to the language, syntax, or data structuring format desired for automatic content/output generation. In addition, because punctuation and whitespace can serve as a portion of training data, generated output of an LLM can be expected to be grammatically and syntactically correct, as well as being punctuated appropriately. As a result, generated output can take many suitable forms and styles, if appropriate in respect of an input prompt.

Further, as noted above in addition to natural language, LLMs can be trained on source code in various highly structured languages or programming environments and/or on data sets that are structured in compliance with a particular data structuring format (e.g., markdown, table data, CSV data, TSV data, XML, HTML, JSON, and so on).

As with natural language, data structuring and serialization formats (e.g., JSON, XML, and so on) and high-order programming languages (e.g., C, C++, Python, Go, Ruby, JavaScript, Swift, and so on) include specific lexical rules, punctuation conventions, whitespace placement, and so on. In view of this similarity with natural language, an LLM generated output can, in response to suitable prompts, include source code in a language indicated or implied by that prompt. For example, a prompt of "what is the syntax for a while loop in C and how does it work" may be continued by an LLM by providing, in addition to an explanation in natural language, a C++ compliant example of a while loop pattern. In some cases, the continuation/generative output may include format tags/keys such that when the output is rendered in a user interface, the example C++ code that forms a part of the response is presented with appropriate syntax highlighting and formatting.

As noted above, in addition to source code, generative output of an LLM or other generative output engine type can include and/or may be used for document structuring or data structuring, such as by inserting format tags (e.g., markdown). In other cases, whitespace may be inserted, such as paragraph breaks, page breaks, or section breaks. In yet other examples, a single document may be segmented into multiple documents to support improved legibility. In other cases, an LLM generated output may insert cross-links to other content, such as other documents, other software platforms, or external resources such as websites.

In yet further examples, an LLM generated output can convert static content to dynamic content. In one example, a user-generated document can include a string that contextually references another software platform. For example, a documentation platform document may include the string "this document corresponds to project ID 123456, status of which is pending." In this example, a suitable LLM prompt may be provided that causes the LLM to determine an association between the documentation platform and a project management platform based on the reference to "project ID 123456."

In response to this recognized context, the LLM can wrap the substring "project ID 123456" in anchor tags with an embedded URL in HTML-compliant syntax that links directly to project 123456 in the project management platform, such as: "<a href='https://example link/123456>project 123456</a>". In addition, the LLM may be configured to replace the substring "pending" with a real-time updating token associated with an API call to the project management system. In this manner, the LLM converts a static string within the document management system into richer content that facilitates convenient and automatic cross-linking between software products, and may result in additional downstream positive effects on performance of indexing and search systems.

In further embodiments, the LLM may be configured to generate as a portion of the same generated output a body of an API call to the project management system that creates a link back or other association to the documentation platform. In this manner, the LLM facilitates bidirectional content enrichment by adding links to each software platform.

More generally, a continuation produced as output by an LLM can include not only text, source code, pseudocode, structured data, and/or cross-links to other platforms, but it also may be formatted in a manner that includes titles, emphasis, paragraph breaks, section breaks, code sections, quote sections, cross-links to external resources, inline images, graphics, table-backed graphics, and so on.

In yet further examples, static data may be generated and/or formatted in a particular manner in a generative output. For example, a valid generative output can include JSON-formatted data, XML-formatted data, HTML-formatted data, markdown table formatted data, comma-separated value data, tab-separated value data, or any other suitable data structuring defined by a data serialization format.

Transformer Architecture

In many constructions, an LLM may be implemented with a transformer architecture. In other cases, traditional encoder/decoder models may be appropriate. In transformer topologies, a suitable self-attention or intra-attention mechanism may be used to inform both training and generative output. A number of attention mechanisms, including self-attention mechanisms, may be suitable.

In response to an input prompt that at least contextually invites continuation, a transformer-architected LLM may provide probabilistic, generated, output informed by one or more self-attention signals. Even still, the LLM or a system coupled to an output thereof may be required to select one of many possible generated outputs/continuations. In some cases, continuations may be misaligned in respect of conventional ethics. For example, a continuation of a prompt requesting information to build a weapon may be inappropriate. Similarly, a continuation of a prompt requesting to write code that exploits a vulnerability in software may be inappropriate. Similarly, a continuation requesting drafting of libelous content in respect of a real person may be inappropriate. In more innocuous cases, continuations of an LLM may adopt an inappropriate tone or may include offensive language.

In view of the foregoing, more generally, a trained LLM may provide an output that continues an input prompt, but in some cases, that output may be inappropriate. To account for these and other limitations of source-agnostic trained LLMs, fine tuning may be performed to align output of the LLM with values and standards appropriate to a particular use case. In many cases, reinforcement training may be used. In particular, output of an untuned LLM can be provided to a human reviewer for evaluation.

The human reviewer can provide feedback to inform further training of the LLM, such as by filling out a brief survey indicating whether a particular generated output: suitably continues the input prompt; contains offensive language or tone; provides a continuation misaligned with typical human values; and so on.

This reinforcement training by human feedback can reinforce high quality, tone neutral, continuations provided by the LLM (e.g., positive feedback corresponds to positive reward) while simultaneously disincentivizing the LLM to produce offensive continuations (e.g., negative feedback corresponds to negative reward). In this manner, an LLM can be fine-tuned to preferentially produce desirable, inoffensive, generative output which, as noted above, can be in the form of natural language and/or source code.

Generative Output Engines & Generative Output Systems

Independent of training and/or configuration of one or more underlying engines (typically instantiated as software), it may be appreciated that generally and broadly, a generative output system as described herein can include a physical processor or an allocation of the capacity thereof (shared with other processes, such as operating system processes and the like), a physical memory or an allocation thereof, and a network interface. The physical memory can include datastores, working memory portions, storage portions, and the like. Storage portions of the memory can include executable instructions that, when executed by the processor, cause the processor to (with assistance of working memory) instantiate an instance of a generative output application, also referred to herein as a generative output service.

The generative output application can be configured to expose one or more API endpoint, such as for configuration or for receiving input prompts. The generative output application can be further configured to provide generated text output to one or more subscribers or API clients. Many suitable interfaces can be configured to provide input to and receive output from a generative output application, as described herein.

For simplicity of description, the embodiments that follow reference generative output engines and generative output applications configured to exchange structured data with one or more clients, such as the input and output queues described above. The structured data can be formatted according to any suitable format, such as JSON or XML. The structured data can include attributes or key-value pairs that identify or correspond to subparts of a single response from the generative output engine.

For example, a request to the generative output engine from a client can include attribute fields such as, but not limited to: requester client ID; requester authentication tokens or other credentials; requester authorization tokens or other credentials; requester username; requester tenant ID or credentials; API key(s) for access to the generative output engine; request timestamp; generative output generation time; request prompt; string format form generated output; response types requested (e.g., paragraph, numeric, or the like); callback functions or addresses; generative engine ID; data fields; supplemental content; reference corpuses (e.g., additional training or contextual information/data) and so on. A simple example request may be JSON formatted, and may be:

```
{
    "prompt" : "Generate five words of placeholder text in the
English language.",
    "API_KEY: "hx-Y5u4zx3kaF67AzkXK1hC",
    "user_token": "PkcLe7Co2G-50AoIVojGJ"
}
```

Similarly, a response from the generative output engine can include attribute fields such as, but not limited to: requester client ID; requester authentication tokens or other credentials; requester authorization tokens or other credentials; requester username; requester role; request timestamp; generative output generation time; request prompt; generative output formatted as a string; and so on. For example, a simple response to the preceding request may be JSON formatted and may be:

```
{
    "response" : "Hello world text goes here.",
    "generation_time_ms" : 2
}
```

In some embodiments, a prompt provided as input to a generative output engine can be engineered from user input. For example, in some cases, a user input can be inserted into an engineered template prompt that itself is stored in a database and includes text that may be referred to as predetermined query prompt text or predetermined prompt text. For example, an engineered prompt template can include one or more fields into which user input portions thereof can be inserted. In some cases, an engineered prompt template can include contextual information that narrows the scope of the prompt, increasing the specificity thereof.

For example, some engineered prompt templates can include example input/output format cues or requests that define for a generative output engine, as described herein, how an input format is structured and/or how output should be provided by the generative output engine.

Prompt Pre-Configuration, Templatizing, & Engineering

As noted above, a prompt received from a user can be preconditioned and/or parsed to extract certain content therefrom. The extracted content can be used to inform selection of a particular engineered prompt template from a database of engineered prompt templates including predetermined query prompt text or predetermined prompt text. Once the selected prompt template is selected, the extracted content can be inserted into the template to generate a populated engineered prompt template that, in turn, can be provided as input to a generative output engine as described herein. Content extraction, prompt configuration, and prompt selection may be performed by a processing plugin that is registered or otherwise available to a generative service.

In many cases, a particular engineered prompt template can be selected based on a desired task for which output of the generative output engine may be useful to assist. For example, if a user requires a summary of a particular document, the user input prompt may be a text string comprising the phrase "generate a summary of this page." A software instance configured for prompt preconditioning—which may be referred to as a "preconditioning software instance," "prompt preconditioning software instance," "processing plugin," or "plugin"—may perform one or more substitutions of terms or words in this input phrase, such as replacing the demonstrative pronoun phrase "this page" with an unambiguous unique page ID. In this example, preconditioning software instance can provide an output of "generate a summary of the page with id 123456" which in turn can be provided as input to a generative output engine.

In an extension of this example, the preconditioning software instance can be further configured to insert one or more additional contextual terms or phrases into the user input. In some cases, the inserted content can be inserted at a grammatically appropriate location within the input phrase or, in other cases, may be appended or prepended as separate sentences.

For example, in an embodiment, the preconditioning software instance can insert a phrase that adds contextual information describing the user making the initial input and request. In this example, output of the prompt preconditioning instance may be "generate a summary of the page with id 123456 with phrasing and detail appropriate for the role of user 76543." In this example, if the user requesting the summary is an engineer, a different summary may be provided than if the user requesting the summary is a manager or executive.

In yet other examples, prompt preconditioning may be further contextualized before a given prompt is provided as input to a generative output engine. Additional information that can be added to a prompt (sometimes referred to as "contextual information" or "prompt context" or "supplemental prompt information") can include but may not be limited to: user names; user roles; user tenure (e.g., new users may benefit from more detailed summaries or other generative content than long-term users); user projects; user groups; user teams; user tasks; user reports; tasks, assignments, or projects of a user's reports, and so on. For example, in some embodiments, a user-input prompt may be "generate a table of all my tasks for the next two weeks, and insert the table into my home page in my personal space." In this example, a preconditioning instance can replace "my" with a reference to the user's ID or another unambiguous identifier associated with the user. Similarly, the "home page in my personal space" can be replaced, contextually, with a page identifier that corresponds to that user's personal space and the page that serves as the homepage thereof. Additionally, the preconditioning instance can replace the referenced time window in the raw input prompt based on the current date and based on a calculated date two weeks in the future. With these two modifications, the modified input prompt may be "generate a table of the tasks assigned to User 1234 dating from Jan. 1, 2023-Jan. 14, 2023 (inclusive), and insert the generated table into page 567." In these embodiments, the preconditioning instance may be configured to access session information to determine the user ID.

In other cases, the preconditioning service may be configured to structure and submit a query to an active directory service or user graph service to determine user information and/or relationships to other users. For example, a prompt of "summarize the edits to this page made by my team since I last visited this page" could determine the user's ID, team members with close connections to that user based on a user graph, determine that the user last visited the page three weeks prior, and filter attribution of edits within the last three weeks to the current page ID based on those team members. With these modifications, the prompt provided to the generative output engine may be:

```
{
    "raw_prompt" : summarize the edits to this page made by
    my team since I last visited this page",
    "modified_prompt" : "Generate a summary of each
    paragraph tagged with an editId attribute matching editId=1,
    editId=51, editId=165, editId=99 within the following HTML-
    formatted content: [HTML-formatted content of the page]."
}
```

Similarly, the preconditioning service may utilize a project graph, issue graph, or other data structure that is generated using edges or relationships between system objects that are determined based on express object dependencies, user event histories of interactions with related objects, or other system activity indicating relationships between system objects. The graphs may also associate system objects with particular users or user identifiers based on interaction logs or event histories.

Generally, a preconditioning service, as described herein, can be configured to access and append significant contextual information describing a user and/or users associated with the user submitting a particular request, the user's role in a particular organization, the user's technical expertise, the user's computing hardware (e.g., different response formats may be suitable and/or selectable based on user equipment), and so on.

In further implementations of this example, a snippet of prompt text can be selected from a snippet dictionary or table that further defines how the requested table should be formatted as output by the generative output engine. For example, a snippet selected from a database and appended to the modified prompt may be:

```
{
    "snippet123_table_from_tasks" : "The table should be
formatted as a three-column table with multiple rows. The leftmost
column should be titled 'Title' and the corresponding content of each
row of this column should be the title attribute of a task. The middle
column should be titled 'Created Date' and the corresponding
content of each row of this column should be the creation date of the
task. The rightmost column should be titled 'Status' and the
corresponding content of each row of this column should be the
status attribute of the selected task."
}
```

The foregoing examples of modifications and supplements to user input prompt are not exhaustive. Other modifications are possible. In one embodiment, the user input of "generate a table of all my tasks for the next two weeks" may be converted, supplemented, modified, and/or otherwise preconditioned to:

```
{
    "modified_prompt" : "Find all tasks assigned to User 1234
dating from Jan 01, 2023 - Jan 14, 2023 (inclusive). Create a table
in which each found task corresponds to a respective row of that
table. The table should be formatted as a markdown table, in plain
text, with three columns. The leftmost column should be titled 'Title'
and the corresponding content of each row of this column should be
the title attribute of a respective task. The middle column should be
titled 'Created Date' and the corresponding content of each row of
this column should be the creation date of the respective task. The
rightmost column should be titled 'Status' and the corresponding
content of each row of this column should be the status attribute of
the respective task."
}
```

The operations of modifying a user input into a descriptive paragraph or set of paragraphs that further contextualize the input may be referred to as "prompt engineering." In many embodiments, a preconditioning software instance may serve as a portion of a prompt engineering service configured to receive user input and to enrich, supplement, and/or otherwise hydrate a raw user input into a detailed prompt that may be provided as input to a generative output engine as described herein.

In other embodiments, a prompt engineering service may be configured to append bulk text to a prompt, such as document content in need of summarization or contextualization.

In other cases, a prompt engineering service can be configured to recursively and/or iteratively leverage output from a generative output engine in a chain of prompts and responses. For example, a prompt may call for a summary of all documents related to a particular project. In this case, a prompt engineering service may coordinate and/or orchestrate several requests to a generative output engine to summarize a first document, a second document, and a third document, and then generate an aggregate response of each of the three summarized documents.

In yet other examples, staging of requests may be useful for other purposes.

Authentication & Authorization

Still further embodiments reference systems and methods for maintaining compliance with permissions, authentication, and authorization within a software environment. For example, in some embodiments, a prompt engineering service can be configured to append to a prompt one or more contextualizing phrases that direct a generative output engine to draw insight from only a particular subset of content to which the requesting user has authorization to access.

In other cases, a prompt engineering service may be configured to proactively determine what data or database calls may be required by a particular user input. If data required to service the user's request is not authorized to be accessed by the user, that data and/or references to it may be restricted/redacted/removed from the prompt before the prompt is submitted as input to a generative output engine. The prompt engineering service may access a user profile of the respective user and identify content having access permissions that are consistent with a role, permissions profile, or other aspect of the user profile.

In other embodiments, a prompt engineering service may be configured to request that the generative output engine append citations (e.g., back links) to each page or source from which information in a generative response was based. In these examples, the prompt engineering service or another software instance can be configured to iterate through each link to determine (1) whether the link is valid, and (2) whether the requesting user has permission and authorization to view content at the link. If either test fails, the response from the generative output engine may be rejected and/or a new prompt may be generated specifically including an exclusion request such as "Exclude and ignore all content at XYZ.url".

In yet other examples, a prompt engineering service may be configured to classify a user input into one of a number of classes of request. Different classes of request may be associated with different permissions handling techniques. For example, a class of request that requires a generative output engine to resource from multiple pages may have different authorization enforcement mechanisms or workflows than a class of request that requires a generative output engine to resource from only a single location.

These foregoing examples are not exhaustive. Many suitable techniques for managing permissions in a prompt engineering service and generative output engine system may be possible in view of the embodiments described herein. More generally, as noted above, a generative output engine may be a portion of a larger network and communications architecture as described herein. This network can include input queues, prompt constructors, engine selection logical elements, request routing appliances, authentication handlers and so on.

Collaboration Platforms Integrated with Generative Output Systems

In particular, embodiments described herein are focused to leveraging generative output engines to produce content in a software platform used for collaboration between multiple users, such as documentation tools, issue tracking systems, project management systems, information technology service management systems, ticketing systems, repository systems, telecommunications systems, messaging systems, and the like, each of which may define different environments in which content can be generated by users of those systems. For example, a documentation system may define an environment in which users of the documentation system can leverage a user interface of a frontend of the system to generate documentation in respect of a project, product, process, or goal. For example, a software development team may use a documentation system to document features and functionality of the software product. In other cases, the development team may use the documentation system to capture meeting notes, track project goals, and outline internal best practices.

Other software platforms store, collect, and present different information in different ways. For example, an issue tracking system may be used to assign work within an organization and/or to track completion of work, a ticketing system may be used to track compliance with service level agreements, and so on. Any one of these software platforms or platform types can be communicably coupled to a generative output engine, as described herein, in order to automatically generate structured or unstructured content within environments defined by those systems. For example, a documentation system can leverage a generative output engine to, without limitation: summarize individual documents; summarize portions of documents; summarize multiple selected documents; generate document templates; generate document section templates; generate suggestions for cross-links to other documents or platforms; generate suggestions for adding detail or improving conciseness for particular document sections; and so on.

More broadly, it may be appreciated that a single organization may be a tenant of multiple software platforms, of different software platform types. Generally and broadly, regardless of configuration or purpose, a software platform that can serve as source information for operation of a generative output engine as described herein may include a frontend and a backend configured to communicably couple over a computing network (which may include the open Internet) to exchange computer-readable structured data.

The frontend may be a first instance of software executing on a client device, such as a desktop computer, laptop computer, tablet computer, or handheld computer (e.g., mobile phone). The backend may be a second instance of software executing over a processor allocation and memory allocation of a virtual or physical computer architecture. In many cases, although not required, the backend may support multiple tenancies. In such examples, a software platform may be referred to as a multitenant software platform.

For simplicity of description, the multitenant embodiments presented herein reference software platforms from the perspective of a single common tenant. For example, an organization may secure a tenancy of multiple discrete software platforms, providing access for one or more employees to each of the software platforms. Although other organizations may have also secured tenancies of the same software platforms which may instantiate one or more backends that serve multiple tenants, it is appreciated that data of each organization is siloed, encrypted, and inaccessible to, other tenants of the same platform.

In many embodiments, the frontend and backend of a software platform—multitenant or otherwise—as described herein are not collocated, and communicate over a large area and/or wide area network by leveraging one or more networking protocols, but this is not required of all implementations.

A frontend of a software platform as described herein may be configured to render a graphical user interface at a client device that instantiates frontend software. As a result of this architecture, the graphical user interface of the frontend can receive inputs from a user of the client device, which, in turn, can be formatted by the frontend into computer-readable structured data suitable for transmission to the backend for storage, transformation, and later retrieval. One example architecture includes a graphical user interface rendered in a browser executing on the client device. In other cases, a frontend may be a native application executing on a client device. Regardless of architecture, it may be appreciated that generally and broadly a frontend of a software platform as described herein is configured to render a graphical user interface to receive inputs from a user of the software platform and to provide outputs to the user of the software platform.

Input to a frontend of a software platform by a user of a client device within an organization may be referred to herein as "organization-owned" content. With respect to a particular software platform, such input may be referred to as "tenant-owned" or "platform-specific" content. In this manner, a single organization's owned content can include multiple buckets of platform-specific content.

Herein, the phrases "tenant-owned content" and "platform-specific content" may be used to refer to any and all content, data, metadata, or other information regardless of form or format that is authored, developed, created, or otherwise added by, edited by, or otherwise provided for the benefit of, a user or tenant of a multitenant software platform. In many embodiments, as noted above, tenant-owned content may be stored, transmitted, and/or formatted for display by a frontend of a software platform as structured data. In particular structured data that includes tenant-owned content may be referred to herein as a "data object" or a "tenant-specific data object."

In a more simple, non-limiting phrasing, any software platform described herein can be configured to store one or more data objects in any form or format unique to that platform. Any data object of any platform may include one or more attributes and/or properties or individual data items that, in turn, include tenant-owned content input by a user.

Example tenant-owned content can include personal data, private data, health information, personally-identifying information, business information, trade secret content, copyrighted content or information, restricted access information, research and development information, classified information, mutually-owned information (e.g., with a third-party or government entity), or any other information, multi-media, or data. In many examples, although not required, tenant-owned content or, more generally, organization-owned content may include information that is classified in some manner, according to some procedure, protocol, or jurisdiction-specific regulation.

In particular, the embodiments and architectures described herein can be leveraged by a provider of multitenant software and, in particular, by a provider of suites of multitenant software platforms, each platform being configured for a different particular purpose. Herein, providers of systems or suites of multitenant software platforms are referred to as "multiplatform service providers." Generally, customers/clients of a multiplatform service provider are typically tenants of multiple platforms provided by a given multiplatform service provider. For example, a single organization (a client of a multiplatform service provider) may be a tenant of a messaging platform and, separately, a tenant of a project management platform.

The organization can create and/or purchase user accounts for its employees so that each employee has access to both messaging and project management functionality. In some cases, the organization may limit seats in each tenancy of each platform so that only certain users have access to messaging functionality and only certain users have access to project management functionality; the organization can exercise discretion as to which users have access to either or both tenancies.

In another example, a multiplatform service provider can host a suite of collaboration tools. For example, a multiplatform service provider may host, for its clients, a multitenant issue tracking system, a multitenant code repository service, and a multitenant documentation service. In this example, an organization that is a customer/client of the service provider may be a tenant of each of the issue tracking system, the code repository service, and the documentation service.

As with preceding examples, the organization can create and/or purchase user accounts for its employees, so that certain selected employees have access to one or more of issue tracking functionality, documentation functionality, and code repository functionality.

In this example and others, a system may leverage multiple collaboration tools to advance individual projects or goals. For example, for a single software development project, a software development team may use (1) a code repository to store project code, executables, and/or static assets, (2) a documentation service to maintain documentation related to the software development project, (3) an issue tracking system to track assignment and progression of work, and (4) a messaging service to exchange information directly between team members.

However, as organizations grow, as project teams become larger, and/or as software platforms mature and add features or adjust user interaction paradigms over time, using multiple software platforms can become inefficient for both individuals and organizations. To counteract these effects, many organizations define internal policies that employees are required to follow to maintain data freshness across the various platforms used by an organization.

For example, when a developer submits a new pull request to a repository service, that developer may also be required by the organization to (1) update a description of the pull request in a documentation service, (2) change a project status in a project management application, and/or (3) close a ticket in a ticketing or issue tracking system relating to the pull request. In many cases, updating and interacting with multiple platforms on a regular and repeating basis is both frustrating and time consuming for both individuals and organizations, especially if the completion of work of one user is dependent upon completion of work of another user.

Some solutions to these and related problems often introduce further issues and complexity. For example, many software platforms include an in-built automation engine that can expedite performance of work within that software platform. In many cases, however, users of a software platform with an in-built automation engine may not be familiar with the features of the automation engine, nor may those users understand how to access, much less efficiently utilize, that automation engine. For example, in many cases, accessing in-built automation engines of a software platform requires diving deep into a settings or options menu, which may be difficult to find.

Other solutions involve an inter-platform bridge software that allows data from one platform to be accessed by another platform. Typically, such bridging software is referred to as an "integration" between platforms. An integration between different platforms may allow content, features, and/or functionality of one platform to be used in another platform.

For example, a multiplatform service provider may host an issue tracking system and a documentation system. The provider may also supply an integration that allows issue tracking information and data objects to be shown, accessed, and/or displayed from within the documentation system. In this example, the integration itself needs to be separately maintained in order to be compliant with an organization's data sharing and/or permissions policies. More specifically, an integration must ensure that authenticated users of the documentation system that view a page that references information stored by the issue tracking system are also authorized to view that information by the issue tracking system.

Phrased in a more general way, an architecture that includes one or more integrations between tenancies of different software platforms requires multiple permissions requests that may be forwarded to different systems, each of which may exhibit different latencies, and have different response formats, and so on. More broadly, some system architectures with integrations between software platforms necessarily require numerous network calls and requests, occupying bandwidth and computational resources at both software platforms and at the integration itself, to simply share and request information and service requests for information by and between the different software platforms. This architectural complexity necessitates careful management to prevent inadvertent information disclosure.

Furthermore, the foregoing problem(s) with maintaining integrations' compliance with an organization's policies and organization-owned content access policies may be exacerbated as a provider's platform suite grows. For example, a provider that maintains three separate platforms may choose to provide three separate integrations interconnecting all three platforms. (e.g., 3 choose 2). In this example, the provider is also tasked with maintaining policy compliance associated with those three platforms and three integrations. If the provider on-boards yet another platform, a total of six integrations may be required (e.g., 4 choose 2). If the provider on-boards a fifth platform, a total of ten integrations may be required (e.g., 5 choose 2). Generally, difficulties of maintaining integrations between different software platforms (in a permissions policy compliant manner) scales exponentially with the number of platforms provided.

Further to the inadvertent disclosure risk and maintenance obligations associated with inter-platform integrations, each integration is still only configured for information sharing, and not automation of tasks. Although context switching to copy data between two integrated platforms may be reduced, the quantity of tasks required of individual users may not be substantially reduced.

Further solutions involve creating and deploying dedicated automation platforms that may be configured to operate with one, and/or perform automations of, or more platforms of a multiplatform system. These, however, much like automation engines in-built to individual platforms, may be difficult to use, access, or understand. Similarly, much like integrations described above, dedicated automation platforms require separate maintenance and employee training, in addition to licensing costs and physical or virtual infrastructure allocations to support the automation platform(s).

In still further other circumstances, many automations may take longer for a user to create than the time saved by automating that particular task. In these examples, individual users may avoid defining automations altogether, despite that, in aggregate, automation of a given task may save an organization substantial time and cost.

These foregoing and other embodiments are discussed below with reference to FIGS. 1-13. However, the detailed description given herein with respect to these figures is for explanation only and should not be construed as limiting. FIG. 1 depicts system diagram that includes multiple platforms that can include and/or may receive input from a generative output engine, as described herein. The system 100 can be used to produce generative responses, which may include summaries or brief descriptions of content items, as described herein. The system 100 of FIG. 1 depicts an example of how multiple platforms 108, 110 may utilize a centralized summary generation service 112 (also referred to as a centralized content generation service 112), which may produce the summaries or brief descriptions or other generative content using a generative output engine of a generative output service 116.

The system 100 is depicted as implemented in a client-server architecture, but it may be appreciated that this is merely one example and that other communications architectures are possible. In particular the system 100 includes a set of host servers 102 which may be one or more virtual or physical computing resources (collectively referred in many cases as a "cloud platform"). In some cases, the set of host servers 102 can be physically collocated or in other cases, each may be positioned in a geographically unique location.

The set of host servers 102 can be communicably coupled to one or more client devices; two example devices are shown as the client device 104 and the client device 106. The client devices 104, 106 can be implemented as any suitable electronic device. In many embodiments, the client devices 104, 106 are personal computing devices such as desktop computers, laptop computers, or mobile phones.

The set of host servers 102 can support infrastructure for one or more backend applications, each of which may be associated with a particular software platform, such as a documentation platform or an issue tracking platform. Other example include information technology system management (ITSM) systems, chat platforms, messaging platforms, and the like. These backends can be communicably coupled to a generative output engine that can be leveraged to provide unique intelligent functionality to each respective backend. For example, the generative output engine can be configured to receive user prompts, such as described above, to modify, create, or otherwise perform operations against content stored by each respective software platform.

By centralizing access to the generative output engine in this manner, the generative output platform can also serve as an integration between multiple platforms. For example, one platform may be a documentation platform and the other platform may be an issue tracking system. In these examples, a user of the documentation platform may input a prompt requesting a summary of the status of a particular project documented in a particular page of the documentation platform. A comprehensive continuation/response to this summary request may pull data or information from the issue tracking system as well.

A user of the client devices may trigger production of generative output in a number of suitable ways. The examples described herein include the triggering of a centralized summary generation service 112 (also referred to as a generative service or generative system) in response to a synchronous or scheduled processing of a set of content items that satisfy a content criteria. The generation service 112 may also be triggered in response to user input provided to a frontend application corresponding to a respective one of the platform backends 108, 110. A variety of implementations and examples are described in the following figures.

Turning to FIG. 1, a portion of the set of host servers 102 can be allocated as physical infrastructure supporting a first platform backend 108 and a different portion of the set of host servers 102 can be allocated as physical infrastructure supporting a second platform backend 110. The two different platforms maybe instantiated over physical resources provided by the set of host servers 102. Once instantiated, the first platform backend 108 and the second platform backend 110 can each communicably couple to a centralized summary generation service 112.

The centralized summary generation service 112 can be configured to cause generation and display of generative content within respective frontends of each of the first platform backend 108 and the second platform backend 110. In this manner, and as a result of this construction, each of the first platform and the second platform can be provided with a consistent or uniform user experience with respect to the generation of generative content.

More specifically, the centralized summary generation service 112 may provide a mechanism to request and obtain summaries of content through selectable graphical objects and other elements from various platforms in the multiplatform environment, and communicate with the generative output engine to fulfill the summary requests and provide responses from the generative output engine back within the selectable graphical objects. As a result of this centralized architecture, multiple platforms in a multiplatform environment can leverage the features of the generative output engine via the selectable graphical object, regardless of the platform of the system 100 in which the selectable graphical object resides. This provides a consistent experience to users across platforms while simplifying processes of updating or otherwise modifying the service to the generative output engine.

For example, in one embodiment, a user in a multiplatform environment may use and operate a documentation platform and an issue tracking platform. In this example, both the issue tracking platform and the documentation platform may be associated with a respective frontend and a respective backend. Each platform may be additionally communicably and/or operably coupled to a centralized summary generation service 112 that can be called by each respective frontend whenever it is required to present the user of that respective frontend with an interface to edit text.

For example, the documentation platform's frontend or the issue tracking platform's fronted may call upon the centralized summary generation service 112 to interact with a generative output engine to obtain and provide a generative content in accordance with a scheduled or synchronous processing of a set of content items. The generation service 112 may also be utilized to summarize or process target content referenced by a selectable graphical object when a user of the documentation platform or issue tracking platform requests the summary via a button or other input of the selectable graphical object.

Similarly, the documentation platform's frontend or the issue tracking platform's frontend may call upon the centralized summary generation service 112 to interact with a generative output engine to obtain and provide a response to a question or query regarding the target content referenced by a selectable graphical object when a user of the documentation platform provides a question or query regarding the target content via an input of the selectable graphical object.

In these examples, the centralized summary generation service 112 can parse text input provided by users of the documentation platform and/or the issue tracking platform, monitoring for summary request inputs or questions provided via selectable graphical objects. In addition, as a result of the architectures described herein, services supporting the centralized summary generation service 112 can be extended to include additional features and functionality that can automatically be leveraged by any further platform that incorporates selectable graphical objects, and/or otherwise integrates with the centralized summary generation service 112 itself.

The generative output engine service may be hosted over the host servers 102 or, in other cases, may be a software instance instantiated over separate hardware. In some cases, the generative engine service may be a third party service that serves an API interface to which one or more of the host services and/or preconditioning service can communicably couple. The generative output engine can be configured as described above to provide any suitable output, in any suitable form or format. Examples include content to be added to user-generated content, API request bodies, replacing user-generated content, and so on.

More generally and broadly, the embodiments described herein refence systems and methods for generating a summary of target content within selectable graphical objects sharing user interface elements rendered by a centralized summary generation service 112 and features thereof, between different software platforms in an authenticated and secure manner.

The first platform backend 108 can be configured to communicably couple to a first platform frontend instantiated by cooperation of a memory and a processor of the client device 104. Once instantiated, the first platform frontend can be configured to leverage a display of the client device 104 to render a graphical user interface so as to present information to a user of the client device 104 and so as to collect information from a user of the client device 104. Collectively, the processor, memory, and display of the client device 104 are identified in FIG. 1 as the client devices resources 104a-104c, respectively.

As with many embodiments described herein, the first platform frontend can be configured to communicate with the first platform backend 108 and/or the centralized summary generation service 112. Information can be transacted by and between the frontend, the first platform backend 108 and the centralized summary generation service 112 in any suitable manner or form or format. In many embodiments, as noted above, the client device 104 and in particular the first platform frontend can be configured to send an authentication token 120 along with each request transmitted to any of the first platform backend 108 or the centralized summary generation service 112 or the preconditioning service or the generative output engine.

Similarly, the second platform backend 110 can be configured to communicably couple to a second platform frontend instantiated by cooperation of a memory and a processor of the client device 106. Once instantiated, the second platform frontend can be configured to leverage a display of the client device 106 to render a graphical user interface so as to present information to a user of the client device 106 and so as to collect information from a user of the client device 106. Collectively, the processor, memory, and display of the client device 106 are identified in FIG. 1 as the client devices resources 106a-106c, respectively.

As with many embodiments described herein, the second platform frontend can be configured to communicate with the second platform backend 110 and/or the centralized summary generation service 112. Information can be transacted by and between the frontend, the second platform backend 110 and the centralized summary generation service 112 in any suitable manner or form or format. In many embodiments, as noted above, the client device 106 and in particular the second platform frontend can be configured to send an authentication token 122 along with each request transmitted to any of the second platform backend 110 or the centralized summary generation service 112.

As a result of these constructions, the centralized summary generation service 112 can provide uniform feature sets to users of either the client device 104 or the client device 106. As noted above, the centralized summary generation service 112 ensures that common features are available to frontends of different platforms. One such class of features provided by the centralized summary generation service 112 invokes output of a generative output engine of a service such as the generative output service 116. For example, as noted above, the generative output service 116 can be used to generate content, supplement content, and/or generate API requests or API request bodies that cause one or both of the first platform backend 108 or the second platform backend 110 to perform a task. In some cases, an API request generated at least in part by the generative output service 116 can be directed to another system not depicted in FIG. 1. For example, the API request can be directed to a third-party service (e.g., referencing a callback, as one example, to either backend platform) or an integration software instance. The integration may facilitate data exchange between the second platform backend 110 and the first platform backend 108 or may be configured for another purpose.

As with other embodiments described herein, the prompt management service 114 can be configured to receive user input (provided via a graphical user interface of the client device 104 or the client device 106) from the centralized summary generation service 112. The user input may include a prompt to be continued by the generative output service 116.

The prompt management service 114 can be configured to modify the user input, to supplement the user input, select a prompt from a database (e.g., the database 118) based on the user input, insert the user input into a template prompt, replace words within the user input, preform searches of databases (such as user graphs, team graphs, and so on) of either the first platform backend 108 or the second platform backend 110, change grammar or spelling of the user input, change a language of the user input, and so on. The prompt management service 114 may also be referred to herein as herein as an "editor assistant service" or a "prompt constructor." In some cases, the prompt management service 114 is also referred to as a "content creation and modification service."

Output of the prompt management service 114 can be referred to as a modified prompt or a preconditioned prompt. This modified prompt can be provided to the generative output service 116 as an input. More particularly, the prompt management service 114 is configured to structure an API request to the generative output service 116. The API request can include the modified prompt as an attribute of a structured data object that serves as a body of the API request. Other attributes of the body of the API request can include, but are not limited to: an identifier of a particular LLM or generative engine to receive and continue the modified prompt; a user authentication token; a tenant authentication token; an API authorization token; a priority level at which the generative output service 116 should process the request; an output format or encryption identifier; and so on. One example of such an API request is a POST request to a Restful API endpoint served by the generative output service 116. In other cases, the prompt management service 114 may transmit data and/or communicate data to the generative output service 116 in another manner (e.g., referencing a text file at a shared file location, the text file including a prompt, referencing a prompt identifier, referencing a callback that can serve a prompt to the generative output service 116, initiating a stream comprising a prompt, referencing an index in a queue including multiple prompts, and so on; many configurations are possible).

In response to receiving a modified prompt as input, the generative output service 116 can execute an instance of a generative output engine, such as an LLM. As noted above, in some cases, the prompt management service 114 can be configured to specify what engine, engine version, language, language model or other data should be used to continue a particular modified prompt.

The selected LLM or other generative engine continues the input prompt and returns that continuation to the caller, which in many cases may be the prompt management service 114. In other cases, output of the generative output service 116 can be provided to the centralized summary generation service 112 to return to a suitable backend application, to in turn return to or perform a task for the benefit of a client device such as the client device 104 or the client device 106. More particularly, it may be appreciate that although FIG. 1 is illustrated with only the prompt management service 114 communicably coupled to the generative output service 116, this is merely one example and that in other cases the generative output service 116 can be communicably coupled to any of the client device 106, the client device 104, the first platform backend 108, the second platform backend 110, the centralized summary generation service 112, or the prompt management service 114.

In some cases, output of the generative output service 116 can be provided to an output processor or gateway configured to route the response to an appropriate destination. For example, in an embodiment, output of the generative engine may be intended to be prepended to an existing document of a documentation system. In this example, it may be appropriate for the output processor to direct the output of the generative output service 116 to the frontend (e.g., rendered on the client device 104, as one example) so that a user of the client device 104 can approve the content before it is prepended to the document. In another example, output of the generative output service 116 can be inserted into an API request directly to a backend associated with the documentation system. The API request can cause the backend of the documentation system to update an internal object representing the document to be updated. On an update of the document by the backend, a frontend may be updated so that a user of the client device can review and consume the updated content.

In other cases, the output processor/gateway can be configured to determine whether an output of the generative output service 116 is an API request that should be directed to a particular endpoint. Upon identifying an intended or specified endpoint, the output processor can transmit the output, as an API request to that endpoint. The gateway may receive a response to the API request which in some examples, may be directed to yet another system (e.g., a notification that an object has been modified successfully in one system may be transmitted to another system).

More generally, the embodiments described herein and with particular reference to FIG. 1 relate to systems for collecting user input, modifying that user input into a particularly engineered prompt, and submitting that prompt as input to a trained large language model. Output of the LLM can be used in a number of suitable ways.

In some embodiments, user input can be provided by text input that can be provided by a user typing a word or phrase into an editable dialog box such as a rich text editing frame rendered within a user interface of a frontend application on a display of a client device. For example, the user can type a particular character or phrase in order to instruct the frontend to enter a command receptive mode. In some cases, the frontend may render an overlay user interface that provides a visual indication that the frontend is ready to receive a command from the user. As the user continues to type, one or more suggestions may be shown in a modal UI window.

These suggestions can include and/or may be associated with one or more "preconfigured prompts" that are engineered to cause an LLM to provide particular output. More specifically, a preconfigured prompt may include a static string of characters, symbols and words, that causes—deterministically or pseudo-deterministically—the LLM to provide consistent output. For example, a preconfigured prompt may be "generate a summary of changes made to all documents in the last two weeks." Preconfigured prompts can be associated with an identifier or a title shown to the user, such as "Summarize Recent System Changes." In this example, a button with the title "Summarize Recent System Changes" can be rendered for a user in a UI as described herein. Upon interaction with the button by the user, the prompt string "generate a summary of changes made to all documents in the last two weeks" can be retrieved from a database or other memory, and provided as input to the generative output service 116.

Suggestions rendered in a UI can also include and/or may be associated with one or more configurable or "templatized prompts" that are engineered with one or more fields that can be populated with data or information before being provided as input to an LLM. A templatized prompt may include static language that may also be referred to as "predetermined query prompt text" and may be combined with current context or content in order to construct or generate a prompt. An example of a templatized prompt may be "summarize all tasks assigned to $ {user} with a due date in the next 2 days." In this example, the token/field/variable $ {user} can be replaced with a user identifier corresponding to the user currently operating a client device.

This insertion of an unambiguous user identifier can be performed by the client device, the platform backend, the centralized summary generation service, the prompt management service, or any other suitable software instance. As with preconfigured prompts, templatized prompts can be associated with an identifier or a title shown to the user, such as "Show My Tasks Due Soon." In this example, a button with the title "Show My Tasks Due Soon" can be rendered for a user in a UI as described herein. Upon interaction with the button by the user, the prompt string "summarize all tasks assigned to user123 with a due date in the next 2 days" can be retrieved from a database or other memory, and provided as input to the generative output service 116.

Suggestions rendered in UI can also include and/or may be associated with one or more "engineered template prompts" that are configured to add context to a given user input. The context may be an instruction describing how particular output of the LLM/engine should be formatted, how a particular data item can be retrieved by the engine, or the like. As one example, an engineered template prompt may be "$ {user prompt} provide output of any table in the form of a tab delimited table formatted according to the markdown specification." In this example, the variable $ {user prompt} may be replaced with the user prompt such that the entire prompt received by the generative output service 116 can include the user prompt and the example sentence describing how a table should be formatted.

In yet other embodiments, a suggestion may be generated by the generative output service 116. For example, in some embodiments, a system as described herein can be configured to assist a user in overcoming a cold start/blank page problem when interacting with a new document, new issue, or new board for the first time. For example, an example backend system may be Kanban board system for organizing work associated with particular milestones of a particular project. In these examples, a user needing to create a new board from scratch (e.g., for a new project) may be unsure how to begin, causing delay, confusion, and frustration.

In these examples, a system as described herein can be configured to automatically suggest one or more prompts configured to obtain output from an LLM that programmatically creates a template board with a set of template cards. Specifically, the prompt may be a preconfigured prompt as described above such as "generate a JSON document representation of a Kanban board with a set of cards each representing a different suggested task in a project for creating a new iced cream flavor." In response to this prompt, the generative output service 116 may generate a set of JSON objects that, when received by the Kanban platform, are rendered as a set of cards in a Kanban board, each card including a different title and description corresponding to different tasks that may be associated with steps for creating a new ice cream flavor. In this manner, the user can quickly be presented with an example set of initial tasks for a new project.

In yet other examples, suggestions can be configured to select or modify prompts that cause the generative output service 116 to interact with multiple systems. For example, a suggestion in a documentation system may be to create a new document content section that summarizes a history of agent interactions in an ITSM system. In some cases, the generative output service 116 can be called more than once (and/or) it may be configured to generate its own follow-up prompts or prompt templates which can be populated with appropriate information and re-submitted to the generative output service 116 to obtain further generative output. More simply, in some embodiments, generative output may be recursive, iterative, or otherwise multi-step in some embodiments.

These foregoing embodiments depicted in FIG. 1 and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

For example, it may be appreciated that all software instances described above are supported by and instantiated over physical hardware and/or allocations of processing/memory capacity of physical processing and memory hardware. For example, the first platform backend 108 may be instantiated by cooperation of a processor and memory collectively represented in the figure as the resource allocations 108a.

Similarly, the second platform backend 110 may be instantiated over the resource allocations 110a (including processors, memory, storage, network communications systems, and so on). Likewise, the centralized summary generation service 112 is supported by a processor and memory and network connection (and/or database connections) collectively represented for simplicity as the resource allocations 112a.

The prompt management service 114 can be supported by its own resources including processors, memory, network connections, displays (optionally), and the like represented in the figure as the resource allocations 114a. In many cases, the generative output service 116 may be an external system, instantiated over external and/or third-party hardware which may include processors, network connections, memory, databases, and the like. In some embodiments, the generative output service 116 may be instantiated over physical hardware associated with the host servers 102. Regardless of the physical location at which (and/or the physical hardware over which) the generative output service 116 is instantiated, the underlying physical hardware including processors, memory, storage, network connections, and the like are represented in the figure as the resource allocations 116a.

Further, although many examples are provided above, it may be appreciated that in many embodiments, user permissions and authentication operations are performed at each communication between different systems described above. Phrased in another manner, each request/response transmitted as described above or elsewhere herein may be accompanied by user authentication tokens, user session tokens, API tokens, or other authentication or authorization credentials.

Generally, generative output systems, as described herein, should not be usable to obtain information from an organizations datasets that a user is otherwise not permitted to obtain. For example, a prompt of "generate a table of social security numbers of all employees" should not be executable. In many cases, underlying training data may be siloed based on user roles or authentication profiles. In other cases, underlying training data can be preconditioned/scrubbed/tagged for particularly sensitive datatypes, such as personally identifying information. As a result of tagging, prompts may be engineered to prevent any tagged data from being returned in response to any request. More particularly, in some configurations, all prompts output from the prompt management service 114 may include a phrase directing an LLM to never return particular data, or to only return data from particular sources, and the like.

In some embodiments, the system 100 can include a prompt context analysis instance configured to determine whether a user issuing a request has permission to access the resources required to service that request. For example, a prompt from a user may be "Generate a text summary in Document123 of all changes to Kanban board 456 that do not have a corresponding issue tagged in the issue tracking system." In respect of this example, the prompt context analysis instance may determine whether the requesting user has permission to access Document123, whether the requesting user has written permission to modify Document123, whether the requesting user has read access to Kanban board 456, and whether the requesting user has read access to referenced issue tracking system. In some embodiments, the request may be modified to accommodate a user's limited permissions. In other cases, the request may be rejected outright before providing any input to the generative output service 116.

Furthermore, the system can include a prompt context analysis instance or other service that monitors user input and/or generative output for compliance with a set of policies or content guidelines associated with the tenant or organization. For instance, the service may monitor the content of a user input and block potential ethical violations including hate speech, derogatory language, or other content that may violate a set of policies or content guidelines. The service may also monitor output of the generative engine to ensure the generative content or response is also in compliance with policies or guidelines. To perform these monitoring activities, the system may perform natural language processing on the monitored content in order to detect key words or phrases that indicate potential content violations. A trained model may also be used that has been trained using content known to be in violation of the content guidelines or policies.

Further to these foregoing embodiments, it may be appreciated that a user can provide input to a frontend of a system in a number of suitable ways, including by providing input as described above to a frame rendered with support of a centralized summary generation service 112. As further described herein, the system 100 supports content summary generation within a content collaboration system. In one or more embodiments, as further described herein, the system 100 utilizes selectable graphical objects or other elements within a graphical user interface (GUI) that is displayed at a client device. The selectable graphical objects or other elements may contain a portion of content obtained from target content, and other selectable elements and graphics including, for example a title, author or content creating user, or other content. A user may be provided, via the GUI, with an input to use to request a summary of the target content. The request may be provided via a designated user input like a cursor hover input or may be a selection of a selectable control (e.g., a button). The system, for example by the centralized summary generation service 112, may generate a prompt and provide to the generative output engine (e.g., via the generative output service 116) that prepares and outputs a generative response. The generative response may include a textual, natural language summary. The summary may be, for example, a textual summary of a page, set of messages, list of actions, key decisions, or items and summaries related to the target content. Subsequent processing of the summary may include identifying textual portions associated with system-specific items, and populating the summary with system-specific mentions, links, tables, video, audio, and so on. In some cases, the system-specific mentions are populated based on permissions that are specific to the user.

Further, as described herein and more specifically with respect to the system of FIGS. 2 and 3 below, the system may utilize the centralized summary generation service 112 prior to a respective user interaction with an element in a graphical user interface. The system may generate summaries or brief descriptions of content items or target content in accordance with a synchronous or scheduled set of operations and store the results in a knowledge graph or other similar content store. Subsequent to generation of the content summaries, a respective summary can be identified and used to display a summary or other content in a graphical user interface of a frontend application.

Figure 2:
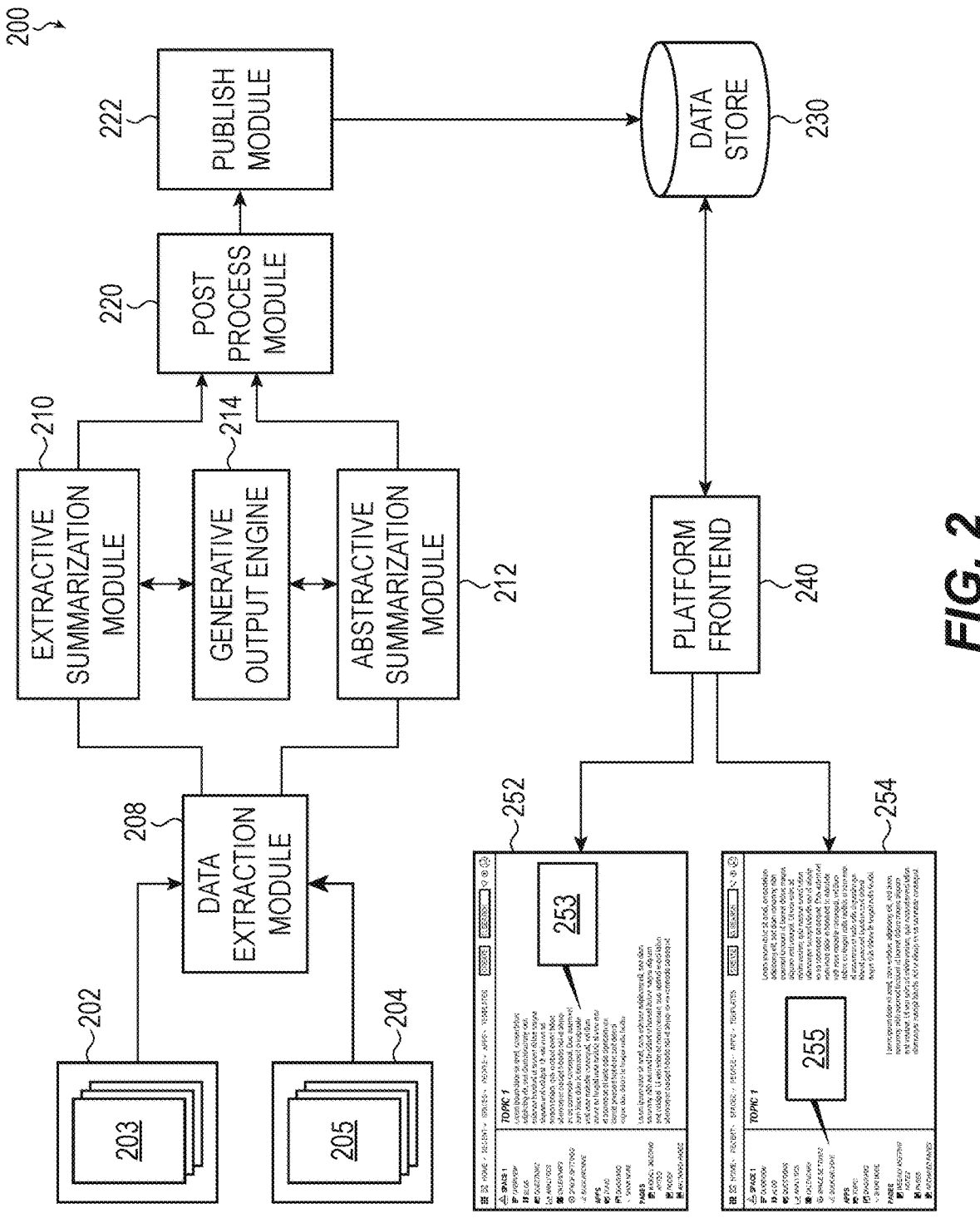
FIG. 2 depicts an example system and process flow for content generation, in accordance with aspects described herein.

FIG. 2 depicts an example system and process flow for content generation. Specifically, FIG. 2 depicts an example system 200 that includes various process modules or operations that may be implemented using hardware and networked computer components described herein. While each of the modules or processes may be described with respect to a particular software implementation, the system 200 includes the use of hardware elements including networked electronic devices, such as servers, client devices, and backend components described elsewhere in this description. A description of the hardware is not repeated with respect to FIG. 2 to reduce redundancy and improve clarity.

FIG. 2 depicts a system 200 that can be used to generate content summaries or brief descriptions asynchronously or in accordance with a predetermined schedule. As discussed previously, generating content before a user interaction with a graphical user interface occurs may improve the performance and responsiveness of the interface. Further, by performing the operations in accordance with a predetermined schedule or predetermined timing, the computational load on computing systems may be performed during off-peak or non-critical times, which may improve overall system utilization and reduce the possibility of the operations interfering with user-system interactions. While the following description generally applies to operations performed in accordance with schedule or predetermined timing, many of the same operations may be performed in real time in response to a user interaction with a graphical user interface. In implementations in which performance is less critical or when computing resources may be less constrained, a real-time summary generation process may be feasible and may provide other benefits including reduced content storage and potential efficiencies since only content that is being actively viewed needs to be processed.

In one example implementation, the process 200 may be used to access one or more platform monoliths 202, 204 or other content storage systems in order to process content that is either new or has been sufficiently modified since a previous processing pass. Specifically, in the system 200 of FIG. 2, operations 208, 210 (and/or 212), 220, and 222 may be performed in accordance with a predetermined timing criteria. In other words, the operations may not be performed in response to a real time user interaction with a respective interface of a frontend application. As mentioned previously above, alternatively, the operations may be performed in real time, and may be initiated or triggered by a user interaction with the frontend application.

As shown in FIG. 2, the system 200 may include a data extraction module or service 208, which is adapted to identify content items 203, 205 in one or more platforms 202, 204, respectively, and extract content for further processing. In one example implementation, the data extraction module 208 identifies content items that satisfy a content criteria, which may include a content timeliness criteria or content freshness criteria indicating whether content has been changed a substantial amount (e.g., a threshold amount) since a previous content summary operation. The content criteria is used to reduce the amount of processing that the system 200 may need to perform on a given pass of the platform content by suppressing processing of content that is static or is predicted to include relatively current content.

In one example implementation, the content criteria is evaluated by determining an amount of content that was created over a particular time period. The time period may be a predetermined interval or may be determined based on a timestamp of previous summary that was created and stored in the graph store 230. For example, each summary or brief description may be published to the graph store 230 with a timestamp that corresponds to a time of previous processing or previous data extraction for a particular content item. The timestamp may be used to assess an amount of new content or content modifications that have occurred between the timestamp and the current evaluation time. If the amount of new content or content modifications exceeds a threshold criteria, then the content item may be identified for further processing. In some instances, each content item may be associated with a modifications flag or significant updates flag, which is toggled in response to a threshold amount of modifications or updates being made. This may simplify the evaluation process and content having a flag that indicates a substantial or threshold amount of content has been modified or added may be selected for processing and the flag may then be reset. The flag may also include timestamp information indicating when the modifications to the content item were made, which may be used when evaluating the timestamp data of the previously processed item published to the graph store 230. Other techniques for evaluating data timeliness or freshness may also be performed in order to identify content for processing by the data extraction module 208.

In some implementations, the content criteria may also include an evaluation of a threshold amount of content contained in each respective content item. Content items having an amount of content that is below the threshold criteria may be excluded from processing. This may further reduce the processing load by excluding content items that are too small to accurately summarize or may be predicted to have low information content. In some cases, content items must have 50 words or more in order to satisfy the threshold criteria. In some cases the content items must have 75 words or more in order to satisfy the threshold criteria. In some cases the content items must have 100 words or more in order to satisfy the threshold criteria. In some cases the content items must have 150 words or more in order to satisfy the threshold criteria. In some cases the content items must have 200 words or more in order to satisfy the threshold criteria.

Once a set of content items having a content criteria are identified, the data extraction module 208 may extract respective content from each of the set of content items. If the platform 202 is a native platform, the content may be extracted may directly access the content database or data monolith to obtain text content. If the platform 204 is, for example, a second or third party platform that is external to the current platform, the data extraction module 208 may access the content using an application programming interface call or endpoint. In order to access the content, the module 208 may assume a permission profile of a designated account on the platform 204, which provides access to designated content but may otherwise be restricted with respect to edit, delete, or creating new content. In some instances, the content may be made available via an intermediary service or platform that provides access to the content without providing direct access to the respective platform 204. As described with respect to some of the examples herein, the first or native platform 202 may be a documentation platform and the second or external platform 204 may be an issue tracking platform, codebase platform, project management platform, project or user directory platform, or other type of platform or system.

The data extraction module 208 generally extracts text content for the set of content items identified or designated for processing. The module 208 may also extract rich text that is formatted in accordance with a platform-specific or editor-specific schema. In some cases, the rich text includes markup language or platform-specific objects that are designated with respective tags or marked text. The module 208 may also extract metadata or other attributes of the content item, which may also be processed or associated with the content published to the data graph 230.

Generally, the content extraction module 208 is configured to access the content 203, 205 of the respective platforms 202, 204 using a permissions profile that may be designated by the system for asynchronous operations. The permissions profile may be configured for high-level content access and may grant the ability to read or access content across user groups, teams, and content stores. The permissions profile may be distinct from a typical system user profile, which may be configured to grant access to information that the user needs for their particular role or job description. The permissions profile used by the module 208 may be more restrictive with respect to the ability to modify or delete content 203, 205 of the respective platforms 202, 204. This may help ensure that the content 203, 205 of the respective platforms 202, 204 is preserved or unaltered as a result of the process 200 being performed. As described in more detail below with respect to FIG. 4, individual system user permissions profiles may be used to restrict or suppress the display of content for which the user does not have at least view permissions. Accordingly, the system 200 may preserve content permissions with respect to extracted content so that downstream frontend applications or other operations may reference the content permissions to ensure data policies are in compliance and content is not displayed to users not having appropriate access or permissions in the system.

The content extraction module 208 may also be adapted to access content managed by external platforms using access granted between the two systems or platforms. For example, the module 208 may be configured to access content 205, which may be managed by an external platform 204 using an application programming interface call or endpoint. The external platform 204 may authenticate credentials or other authentication information provided by the extraction module 208 before executing such an application programming interface call or other similar operation. Similar to the permissions granted with respect to on-platform or native content, the permissions may grant broad read or access-level permissions but have narrower edit or delete permissions in order to maintain content 205 and ensure that application programming interface calls for content summary purposes do not alter content 205 or other platform data. In contrast, other portions of the system or other operations that are configured to execute content creation operations may have broader content creation or content modification permissions with respect to content 205. Platform 204 is described as being an external platform for purposes of this explanation but this is not limiting and, in some implementations, platform 204 may be an internal or native platform.

The content extracted using the data extraction module 208 may then be further processed by one of the content processing modules 210, 212 in order to generate a respective summary or brief description of each respective content item identified by the module 208. The particular content processing module 210, 212 that is used may depend on the particular implementation and, in some cases, a hybrid of the two processing modules 210, 212 may be used. In some cases, a particular content processing module 210, 212 may be selected based on a type of content item or the type of content contained within the content item. The system 300 of FIG. 3 depicts one example technique for evaluating or classifying content that may be used for this purpose.

In the current example, a first processing module is an extractive summarization module 210. The extractive summarization module 210 may use a topic analysis on processed versions of the extracted content and then select text segments as the summaries or for summarization by a generative output engine 214 in accordance with a relevance criteria. In one implementation, the extractive summarization module 210 vectorizes the extracted content (e.g., the text content) using a vectorization and embedding technique. An example vectorization technique includes performing a natural language processing technique in order to transform words, phrases, or content segments into a numerical representation that captures the sematic meaning and/or contextual relationships of the content. Example vectorization techniques include bag-of-words (BoW), term frequency inverse document frequency (TF-IDF), and other vectorization techniques. Additionally, one or more embedding techniques may be used to expand the representation to include words or phrases having similar meanings, which may improve the accuracy and performance of the extractive summarization module 210. The vectorized content may be analyzed to identify central words or phrases that may indicate the topic or subject matter of the extracted content. Text segments (e.g., sentences or phrases) containing these central or topic-indicating words may satisfy the relevance criteria and, thus, may be selected by the extractive summarization module 210 for further processing. These text segments may, in some cases, be referred to as top-ranking or topic-indicating text segments. The top-ranking text segments, in some cases may be limited to a threshold number of sentences (e.g., no more than 3, no more than 4, no more than 5 sentences) and/or a threshold number or characters or words (e.g., no more than 15 words, no more than 20 words, no more than 30 words).

In some cases, the extractive summarization module 210 may construct a graph data structure representation of the document text or of the vectorized content. Nodes of the data graph may represent words, phrases, vectors, or other content portions and edges or dependencies to other nodes may indicate the relationship of a particular node with respect to other nodes of the content. A node having a sufficient number of edges or having the most edges with respect to other nodes of the content may indicate centrality of the corresponding content portion. The extractive summarization module 210 may use this evaluation of centrality to identify a topic or subject matter of the content. Text segments associated with the content of the respective node may then be selected by the extractive summarization module 210 as satisfying the relevance criteria and selected for further processing. Similar to the example described above, the identified text segments may be ranked and selected in accordance with a sentence threshold, word threshold, and/or character threshold.

In one example implementation, the text segments identified by the extractive summarization module 210 are used as the summary or brief description for the content item and passed along to modules 220 and 222 for publication to the data graph 230. That is, the selected text segments may be published to the data graph 230 in substantially the same or a very similar form and format as they existed in the original content item. In another example implementation, the text segments identified by the extractive summarization module 210 are used to construct a prompt, which is provided to the generative output engine 214. The prompt may include the identified or top-ranking segments and predetermined query prompt text that is selected for use with the extractive summarization module 210. The predetermined query prompt text may include commands or instructions for how to summarize the segments including summary length, tone, level of detail, anticipated reader comprehension level, and other similar constraints. In some cases, the predetermined query prompt text is selected based on an analysis of the extracted content and may provide different instructions for different predicted classification types. Similarly, the prompt text may be selected based on aspects of a user profile (e.g., a role, job description, subject matter expertise) associated with an anticipated user of the summary or brief description. An example of these and other implementations is described in more detail below with respect to FIG. 3. Once the prompt has been constructed, a generative response may be obtained from a generative output engine 214 similar to as described in other examples provided herein. The generative response may be passed along to processes 220 and 222 and published to the data graph 230.

In the example system 200 of FIG. 2, an abstractive summarization module 212 may also be used in combination with or as an alternative to the extractive summarization module 210. Similar to the extractive summarization module 210, the abstractive summarization module 212 may process the extracted content from the data extraction module 208. The extracted content may be provided to the generative output engine 214 along with predetermined query prompt text in a prompt, similar to as described above. In one example implementation, if the extracted content is below a threshold amount, a substantial entirety of the extracted content is provided to the generative output engine 214 in the formulated prompt. In another example implementation, the extracted content is further processed to select or identify a set of text segments that satisfy a relevance criteria (e.g., a relevance threshold). Selection of the text segments may be performed by generating or obtaining vectorized representations of the content and selecting top ranking segments using a topic analysis, as described above with respect to extractive summarization module 210. The top ranking text segments found to satisfy a relevance criteria using the topic analysis may be used to construct a prompt along with predetermined query prompt text, which may be designated use with the abstractive summarization module 212 or selected in accordance with an analysis of the content or an anticipated user. The prompt may be provided to the generative output engine 214 and the generative response may be passed along to processes 220 and 220 and published to the data graph 230.

In the example system 200, the module or process 220 may be used to post-process the generated or selected content produced by the extractive summarization module 210 and/or the abstractive summarization module 212. The module 220 may analyze the response for compliance with quality and other content policy criteria including potentially inappropriate subject matter, incomplete responses, or other potential issues. The module 220 may also process raw or plain text and convert the text back into rich text or the platform-specific or editor-specific format. In one example implementation, special characters or other rich text are identified by the content extraction module 208 and replaced with text or segments that are preserved by the extractive summarization module 210 and/or abstractive summarization module 212 processing. The replaced text may be designated or marked between one or more special characters that indicate the placeholder text or segment is to be ignored or maintained. Any placeholder text or segments that are produced as a result of the processing of the extractive summarization module 210 and/or the abstractive summarization module 212 may be identified by the module 220. The placeholder text or segment may then be restored to the original special characters or rich text element by the module 220 so that the content can be reproduced similar to other content native to the platform or editor.

In some instances, the module 222 or another service associated with the system 200 may identify selectable graphical objects that are linked to other content items (in the same platform or in a different platform). The selectable graphical objects may include or display metadata or other content that extracted from the linked content item and, when displayed in the graphical user interface, are selectable to cause redirection of the interface to the respective content item and respective platform. As described in more detail below with respect to FIG. 5A, the selectable graphical objects may be identified and then preserved for display in the summary window either within the summary content or below the summary in a separate region. Additionally or alternatively, selectable graphical objects or other embedded content may be evaluated using a relevance criteria with respect to the topical analysis performed for the content item. Objects satisfying the relevance criteria may be preserved or tagged so that the objects may be displayed within a content window or other similar interface element. For example, if a particular topic or set of topics are identified using one of the modules (e.g., 210, 212), further processing may be performed to evaluate the topic or subject matter of the content associated with the selectable graphical object or embedded object. In some cases, the content associated with the selectable graphical objects or other embedded objects may be evaluated as part of the graph data structure representation of the document text or of the vectorized content. Content of the respective objects may be obtained from external platforms using one or more application programming interface calls If the topic of the content has a sufficient similarity to or is sufficiently related to the topic of the content item, the respective objects may be tagged, and/or preserved for display in a content window along with the content summary. Examples of preserved selectable graphical objects or other embedded objects are described in more detail below with respect to FIGS. 5A-5C.

Process or module 222 then publishes post-processed content to the data graph 230 or other similar data store. The module 222 may associate the content with a content identifier of the underlying content item, a platform identifier, and a summary version identifier. The publication module 224 may also publish one or more of the selectable graphical objects or other preserved content in a respective node of the data graph along with the summary content and the respective identifiers. The summary version identifier may be used to identify different versions of a summary for use with different anticipated users and/or for use with different types of elements (e.g., selectable graphical objects, hierarchical tree elements, feed items, cards, content tiles) within a graphical user interface. In one example, a predicted role or other attribute of a user profile may be associated with the content, which may be used to query the data graph 230 for use with a particular user having a corresponding role or other user-profile attribute. The publication module may also associate a timestamp with the content for use by the content extraction module 208 when determining timeliness or freshness of respective content. Other metadata or identifiers may also be associated with the content by module 222 as it is published to the data graph 230 or other similar data store.

The data graph 230 may include a plurality of content nodes that are interconnected or interrelated by respective edges that define dependencies or relationships between the nodes. Each node of the data graph 230 may correspond to a particular summary or version of a summary, which may be accessed in response to a user input provided to a respective graphical user interface 252, 254 of a respective platform frontend 240. Alternative summary nodes may have a particular relationship or edge connecting them, which allows the nodes to queried and retrieved in an efficient manner in response to an input detected by the platform frontend 240. Similarly, content may be related by platform, content creator, group, space, project, or other attribute of the original content item allowing for efficient and accurate query results. In some cases, the graph-based storage structure of the data graph 230 may be referred to as a knowledge graph and may include nodes having a variety of types of stored content and may correspond to a variety of different entities, platforms, or other abstractions. The graph-based data storage structure of the data graph 230 may also allow for the expansion of nodes or related content to allow the system to utilize different versions of the summaries, which may be deployed in different contexts or use cases. While a data graph 230 is depicted in the particular example system 200, other types of data stores may be used including relational database data stores, tables, and other types of data structures.

The content stored in respective nodes (or other storage elements) of the data graph 230 may be accessed in response to a user input provided to a respective graphical user interface 252, 254 of a platform frontend 240. As shown in the current example, the same system may be used to provide a first content summary or snippet 253 for a first type of object (e.g., a selectable graphical object) in response to a user input provided to a first graphical user interface 252 and a second content summary or snippet 255 also for a second type of object (e.g., a hierarchical tree element) in response to a user input provided to a second graphical user interface 254. If the underlying content item is the same for both types of objects, in some cases, the same summary may be provided for both use cases. In other cases, different summaries may be used for the same underlying content item, each summary configured for use with respect to a particular type of element. For example, a summary or snippet 253 for a selectable graphical object in GUI 252 may include more detail and may be longer in length as compared to a summary or snippet 255 for a hierarchical tree element in GUI 254. Further, as described above the type of user, as indicated by an attribute of the user's profile (e.g., role, job description, subject matter expertise) may be used to query the data graph 230 and content of a respective node may be provided for that particular user. Various specific user interface examples are provided below with respect to FIGS. 4, 5A-5D and other figures.

Figure 3:
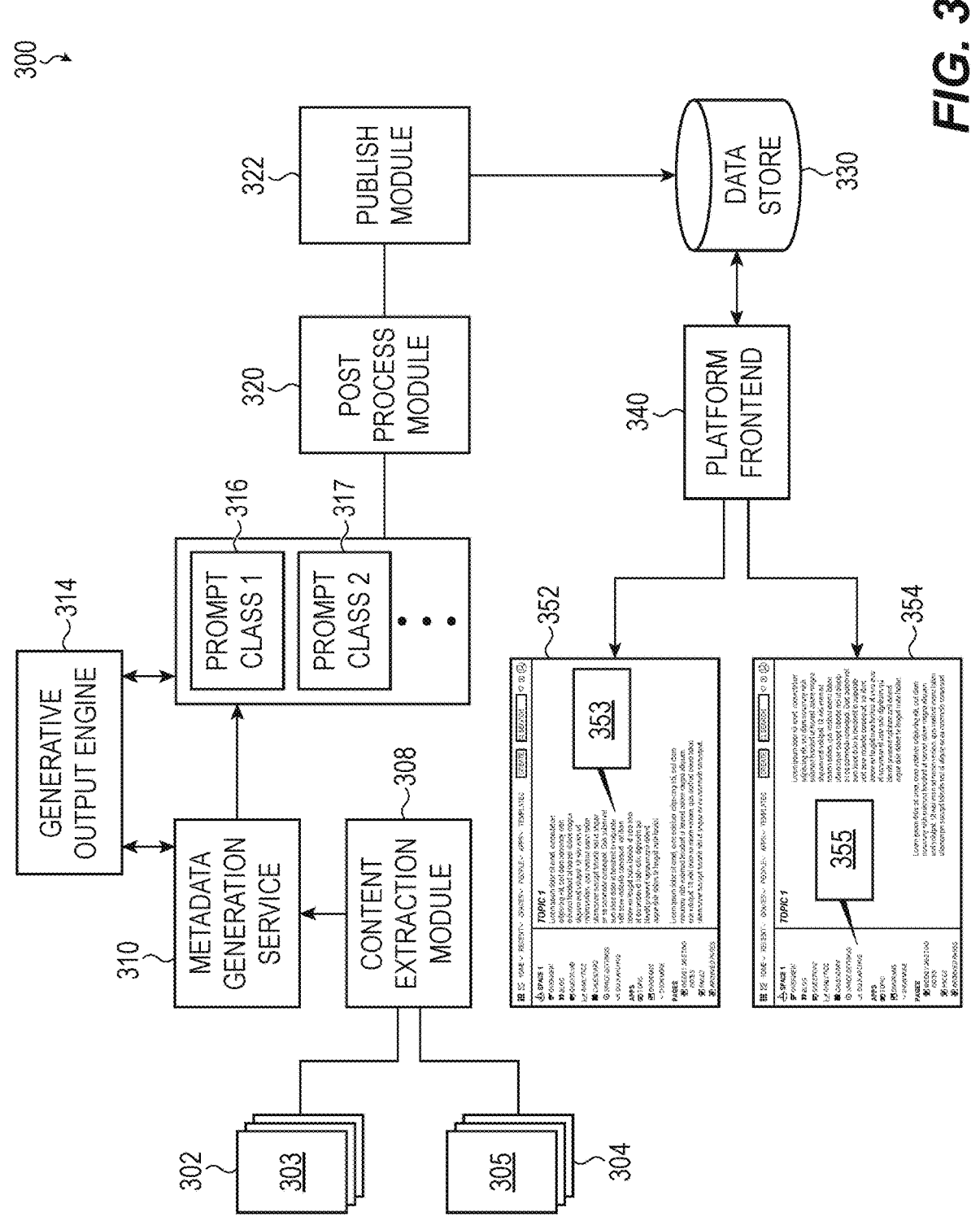
FIG. 3 depicts another example system and process flow for content generation, in accordance with aspects described herein.

FIG. 3 depicts another example system and process flow for content generation. Specifically, FIG. 3 depicts an example system 300 that includes various process modules or operations that may be implemented using hardware and networked computer components described herein. While each of the modules or processes may be described with respect to a particular software implementation, the system 300 includes the use of hardware elements including networked electronic devices, such as servers, client devices, and backend components described elsewhere in this description. A description of the hardware is not repeated with respect to FIG. 3 to reduce redundancy and improve clarity. Further, the system 300 of FIG. 3 is a variation of the system 200 described above with respect to FIG. 2. A description of shared or similar components may not be repeated or may be abbreviated to improve clarity and reduce redundancy.

The system 300 of FIG. 3 may be used to analyze content so that different summaries or descriptions can be generated for different types of content and/or use cases. As described previously, the content summaries or snippets 353, 355 that are produced in respective graphical user interfaces 352, 354 may be specially adapted for a particular element, requesting user, or other aspect of the context. Further, the content summaries or snippets 353, 355 may also be customized or determined based on a classification or characterization of the underlying content. The system 300 of FIG. 3 may be used to perform a variety of summary customization based on many of factors including current context, content classification, anticipated use case, anticipated user, and other factors.

Similar to the previous example, the system 300 includes a content extraction module 308, which may identify content 303, 305 of respective platforms 302, 304. The identification and extraction of the content may be substantially similar to the processes described above with respect to FIG. 2, which is not repeated here to reduce redundancy. In the example system 300, the extracted content is provided from the content extraction module 308 to a metadata analysis and generation service 310. The service 310 may be configured to generate a prompt using all or portions of the extracted content and predetermined query prompt text. The predetermined query prompt text used by the service 310 may include instructions for analyzing the extracted content including a set of example classification types and a brief explanation and/or example for each classification type. The prompt generated by the service 310 is provided to a generative output engine 314, which produces a corresponding generative response. The generative response may include a predicted classification type, which corresponds to one of the example classification types provided in the corresponding prompt.

In response to receiving the prompt, the service 310 may select one of a set of predetermined prompts 316, 317 or templates based on the predicted classification type. In some cases, the predetermined prompts 316, 317 are or include predetermined query prompt text that is adapted for a particular classification type. Each prompt 316, 317 may be configured to produce a differently formatted or differently composed summary in accordance with the predicted classification type. In one example, the predicted classification type is a structured data type, comparative data type, categorical data type, matrix data type, or hierarchical data type, a particular prompt (316, 317) including instructions to generate a list or table of matrix elements or elemental components may be selected. For example, the content may include highly structured content that is arranged in columns or rows of content and may be classified as structured content. As another example, the content may include comparative data, categories, or numerical values that may be organized in a way that lends itself for display as a table or matrix of content. As a result of such a classification or determination, when the summary or brief description is generated, instructions from that particular prompt may be included in a new prompt, along with some or all of the content extracted using the content extraction module 308. The resulting summary may be a table of content that is generated in accordance with the selected predetermined query prompt language (316, 317). In another example, if the predicted classification type is knowledge base documentation content type, predetermined query prompt text that includes instructions to generate a short bulleted list may be selected.

A similar prompt selection technique may be used for a variety of other scenarios. For example, to generate a summary in accordance with a predicted user attribute (e.g., a user role, level of technical background, job description) a particular prompt (316, 317) or particular predetermined query prompt text may be selected which includes instructions for tailoring the summary to correspond to the predicted user attribute. In one example, multiple summaries may be generated for a particular content item, each summary may be tailored or adapted in accordance with a particular predicted user attribute, like a user role. Each of the summaries may be published to a data graph of the data store 330 and associated with the particular user attribute so that when a user having that attribute causes generation of a respective summary (353, 355), the respective or corresponding summary can be retrieved from the data store 330.

Similar to the examples described above, a post-processing service 320 may perform policy compliance checks and also modify or adapt the content for use with a particular editor or platform. Also similar to the example described above, the post-processed content may be published to the data store 330. The data store 330 may include one or more data graphs including a knowledge graph having interrelated nodes similar to as described above with respect to other examples. Importantly, if there are different versions of a summary for the same content item, each summary may be stored as a respective node and related to other summaries using an edge or other relationship that indicates the common source or content item. As discussed previously, this allows for efficient and accurate queries that can be performed by the system in response to a respective input detected by the platform frontend 340. Extracted summaries or brief descriptions can be obtained from the data graph of the data store 330 and used to generate the summaries or snippets (353, 355) in the respective graphical user interfaces (352, 354). As described previously, content permissions may be stored in the data store 330 and/or the system may be configured to reference or access permissions of the respective content items before accessing and/or displaying content for a particular system user.

Further, as described in more detail below with respect to some interface examples, a summary window may include an input region configured to receive user input, which may include instructions or a query with respect to the content summary that is displayed. In response to the user input, the system may query the data store 330 and/or the platform content 303, 305 and also leverage the generative output engine 314 (or a centralized content generation service 112) in order to provide responsive or generative output. This allows a user to conduct additional content inquiries to further explore the content without navigating away from the current context or interface.

Figure 4:
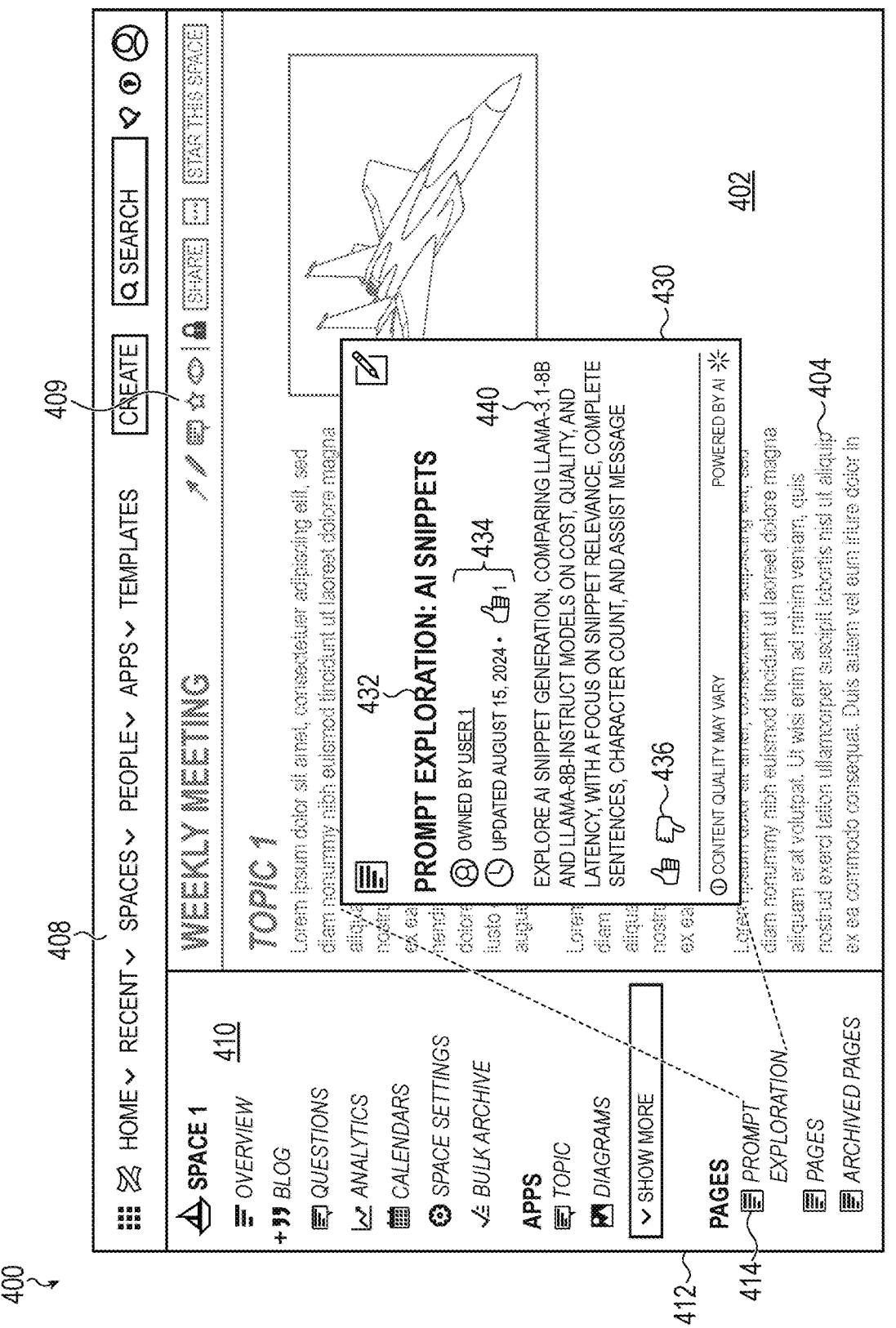
FIG. 4 depicts an example frontend interface that supports content generation in a content collaboration platform, in accordance with aspects described herein.

FIG. 4 depicts an example frontend interface that supports content generation in a content collaboration platform. In particular, FIG. 4 depicts a graphical user interface 400 of a documentation platform rendered on a client device by a frontend application. The graphical user interface 400 includes a floating window object 430 also referred to herein as a "content window" or "window object," which includes a content summary or snippet 440, as described herein. As described with respect to FIGS. 2 and 3, the content summary 440 may be generated prior to a user interaction with the frontend application in order to improve performance and responsiveness of the graphical user interface and also help manage processing load on the system.

In the present example, the content summary 440 is displayed in response to a user selection of a particular element 414 associated with a respective content item. Specifically, the content summary 440 is displayed in response to a user hover input with respect to a hierarchical tree element or tree element 414 of a hierarchical element tree 412 in a navigational panel or region 410 of the graphical user interface. Each tree element of the hierarchical element tree 412 may correspond to an electronic document or page managed by the documentation platform and may be selectable to cause display of the respective document or page. As shown in other examples, herein, a similar content summary may be displayed in response to a similar input provided to a selectable graphical object, a feed item, a card, a content tile or another element of the graphical user interface that is associated with a respective content item.

In the present example, the window 430 includes other elements or data that may be associated with the content item but is separate from, or in addition to, the summary 440. Specifically, the window 430 includes a title and header information 432 and may also include a graphical icon or element corresponding to a content type or platform. The window also includes content information 432, which may include metadata or information extracted from the content item. In this particular example, the content information 432 includes author or content creator information and a last edited date, which may be derived from a timestamp associated with a recent content modification event. In some implementations, while the summary 440 may be generated in advance using a synchronous or scheduled set of operations, the other content 432, 434 may be obtained directly in response to the user input provided to the graphical user interface 400. This ensures that metadata or content that is predicted to be less static or more frequently updated is accurate and up-to-date when the user input is provided. Because this information can be directly obtained from the content item, the processing load on the system may be relatively low, as compared to the processing load required to generate the summary or snippet. Furthermore, the other content 432, 434 may reflect specific information that is consistently displayed for all content items, regardless of content.

In some cases, where the corresponding content item is an external content item hosted by an external platform, the other content 432, 434 may be obtained by executing an application programming call to the external platform. The application programming call may include an identifier of the respective content item, one or more identifiers of the content being requested, and an authentication token or other data used to authenticate the request with respect to the external platform. In contrast, summary content 440 that is derived from a similar external content item may be retrieved from a platform or integrated data store (e.g., data graph 230, data store 330 of FIGS. 2 and 3, respectively) as the content retrieval from the external platform may have been previously been performed by the respective content extraction module (e.g., module 208, 308 of FIGS. 2 and 3, respectively). The respective content extraction module may use a different or separate authentication scheme, which may be based on a system-to-system integration set of permissions and authentication process. This may be different than the authentication and permission scheme performed in order to extract the other content 432, 434 at the time of use by the user. In order to reconcile a potential difference in the permissions levels or access granted to the particular content, the frontend application may be configured to perform a separate permissions and authentication process before displaying any of the content in the window 430. The system may also use a most-restricted permissions scheme and suppress display of any or all of the content in response to any of the authentications or permissions schemes indicating that the current user is not authorized to view content or is not able to be currently authenticated with respect to the external platform.

As shown in the present example, the window 430 may also include additional controls 436, which may be used to provide feedback with respect to the summary 440 or provide other user input with respect to the respective content item. The feedback may be used to improve or modify the summary generation process (e.g., the processes 200 and 300 of FIGS. 2 and 3, respectively) and, in some implementations, may cause the summary 440 to be discarded or re-generated using different prompt language or other modified generation parameters. In some implementations, the window 430 may include a control allowing a user to edit the summary 440, which may be saved in the respective content store for subsequent recall and use in other graphical user interfaces. As described in more detail below with respect to other examples, other controls may also be displayed in the window 430 including regions for receiving user input, performing actions with respect to the content item, or performing other operations.

In the present example, the graphical user interface 400 is generated by a frontend application, which is a browser application operably coupled to a web-based backend application or platform. The interface 400 can be rendered by a client device (e.g., client device 104, 106 of FIG. 1), which may be a personal electronic device such as a laptop, desktop computer, tablet and the like. The client device can include a display with an active display area in which the user interface 400 can be rendered. The user interface can be rendered by operation of an instance of a frontend application associated with a backend application that collectively define a software platform as described herein. In some examples described herein, the graphical user interface 400 may be displayed subsequent to, or in response to, an authentication of a user of the content collaboration platform.

The graphical user interface 400 include a content panel or region 402, which displays content 404 of a respective electronic document or page. The content 404 may include text content, selectable graphical objects, rich text content, images, videos, and other content. The content panel 402 may include or operate an editor that is configured to receive user-generated content, which is used to generate or modify the content of the document. Generally, the graphical user interface 400 is used to generate and display user-generated content 404. As shown in FIG. 4, the user-generated content may include what is referred to as rich text content, which may be formatted in accordance with a formatting scheme, such as HTML, XML, Atlassian Document Format (ADF), or other similar scheme or language. The particular schema may also be referred to as a platform-specific or editor-specific formatting schema. In some examples, the text content can also be displayed in line with hypertext, graphical elements and other content that is enabled by the editor instantiated by the frontend application within the content panel 402.

The graphical user interface 400 also includes a navigational panel 410, which includes selectable elements that are selectable to cause display of respective content items or navigate to other aspects of a document space. In this example, the navigational panel 410 includes a hierarchical element tree 412 also referred to as a page tree, which includes an array of selectable tree elements that are hierarchically arranged in accordance with parent-child relationships between respective documents of the document space. The elements may include a short title and/or graphical elements that indicate the subject matter and type of content item associated with each respective element. Many of the elements may also be selected and moved within the hierarchical element tree 412 in order to redefine a parent-child relationship between the respective elements. The collection of elements depicted in the navigational panel 410 maybe associated with a respective space, also referred to herein as a content space, page space, or document space. A space defines a collection of content items for which the space creator is the default administrator having default read, write, view, and control permissions with respect to all items within the space. Content and navigational panels 402, 410 may also be referred to herein as "panes," "regions," or "areas" of the graphical user interface.

The graphical user interface 400 also includes a control bar 408 that includes an array of selectable controls for navigating to different spaces, documents, applications, or modules. The interface 400 also includes controls 409 for managing the content and interface modes of the graphical user interface 400. Generally, the graphical user interface 400 provided by the frontend or client application may operate in one of a number of different modes. In a first mode, a user may create, edit or modify page or other digital content. This mode or state of the graphical user interface 400 may be referred to as an editor user interface, content-edit user interface, a page-edit user interface, or document-edit user interface. In a second or other mode, the user may view, search, comment on, or share the electronic document, page, or digital content. This mode or state of the graphical user interface may be referred to as a viewer user interface, content-view user interface, a page-view user interface, or document-view user interface. The graphical user interface may be implemented in a web browser client application using HTML, JavaScript, or other web-enabled protocol.

The graphical user interface 400 may allow the user to create, edit, or otherwise modify user-generated content that is stored as an electronic page. The electronic page or other digital content may be rendered on a client device by the content collaboration service upon authorization/authentication of the user by the authentication/authorization service, and based on permissions granted to the user as validated according to a user profile associated with the user. Further, the content that is rendered in the content panel 402 may contain content extracted from or obtained from other content items having their own respective permissions profiles.

FIGS. 5A-5D depict example portions of a graphical user interface, in accordance with aspects described herein. In particular, the examples are directed to different content windows that may be displayed in response to a user input to a graphical user interface. Each of the content windows include a content summary, brief description, or snippet, which may be generated using the techniques described above with respect to FIGS. 1-4. The examples include additional content, controls, and other features that may be included in the content window.

The following content windows may be displayed in response to a user input (e.g., a hover input) provided to a respective element of a graphical user interface that is associated with a content item. As described herein, the respective element may be a hierarchically arranged tree element of a hierarchical element tree, a selectable graphical object (e.g., an embedded linked object), a feed item, a card, a content tile, or other element associated with a content item. Further, as described previously, the content window may be displayed differently and/or may include different content depending on the type of element that is subject to the user input (e.g., to which a hover input is provided). Further, the content window, the summary, and/or the elements displayed in the content window may vary depending on the classification type of a content item, one or more attributes of a user profile of a predicted user, or other factors.

Figure 5A:
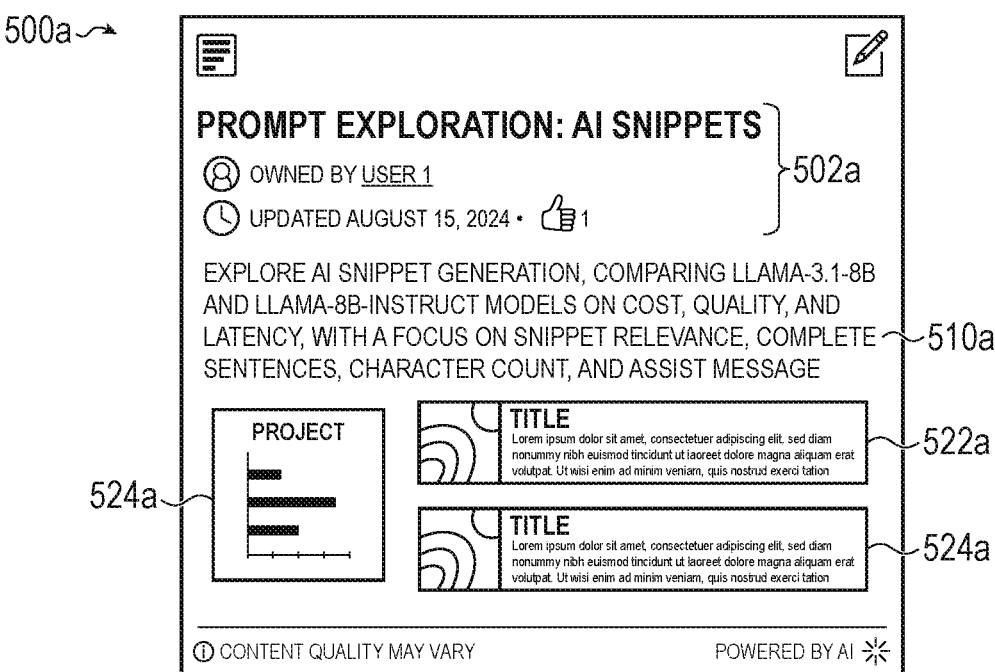

FIG. 5A depicts one example content window 500a that includes a content summary 510a that may be generated in accordance with the embodiments described herein. Specifically, the content summary 510a may be generated using one of the processes described above with respect to FIGS. 2 and 3 and may be customized for a particular classification type of the content item, a profile attribute or other property associated with a user, or other context or factors. The content window 500a may also include additional content or controls that are similarly customized or selected based on the same or similar factors. Also similar to other examples described herein, the content window 500a includes additional content 502a, which may be extracted directly from the respective content item near real time or near the time of rendering the content window 500a. The additional content 502a may include metadata and/or content extracted from the respective content item.

In this specific example, the content window 500a includes two selectable graphical objects 522a, 524a, and an embedded object 524a. Similar to as discussed previously, selectable graphical objects, embedded objects, and other platform-specific or editor-specific content may be identified by a module or aspect of the system (e.g., the data extraction modules 208, 308 of FIGS. 2 and 3, respectively) and preserved by the summary generation operations. Identified content may be replaced with placeholder content or items during processing and marked with designated characters or tags so that the placeholders are preserved during processing. Additionally or alternatively, objects having content that satisfies a relevance criteria (e.g., a relevance threshold) with respect to the topical analysis performed with respect to the content item may be tagged or identified and stored in a respective node or other element of the content store so that they can be recalled and displayed in the content window 500a.

Each of the selectable graphical objects 522a, 524a may be associated with a respective content item that is either native to the current platform or associated with an external content item hosted by an external platform. Selection of one of the selectable graphical objects 522a, 524a may cause the current graphical user interface to be redirected to display the respective content item associated with the respective selectable graphical object as viewed within its respective platform or native client application. This allows for direct navigation to respective content items directly from the content window 500a. Further, each selectable graphical object 522a, 524a includes metadata and/or content extracted from the respective content item to help provide the user with information about the associated content item without having to select them or navigate away from the current interface.

Similarly, the embedded object 524a may be associated with a content item (native or external) and may display content that is extracted from the content item as embedded content. While it is not necessary, the embedded content it typically graphical in nature. In some instances, the graphical content is stored as an image file or image object that is recalled and used to display the embedded object 524a. This may be the case if network connectivity or other resources do not permit the transmission of embedded content, at least momentarily. In other cases, the graphical content is obtained directly from the content item near the time of display (e.g., shortly before display) so that the embedded content accurately reflects the current state of the corresponding content item. While this may require a threshold level of connectivity to the respective platform, the displayed content may be more accurate and, therefore, more useful within the context of the content window 500a.

Figure 5B:
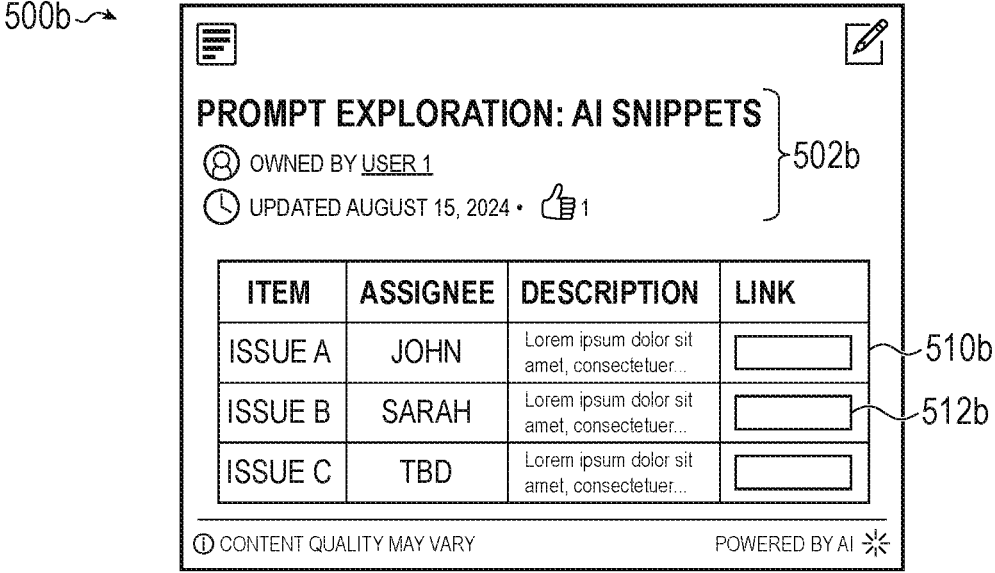

FIG. 5B depicts another example content window 500b that includes a content summary 510b that may be generated in accordance with the embodiments described herein. Specifically, the content summary 510b may be generated using one of the processes described above with respect to FIGS. 2 and 3 and may be customized for a particular classification type of the content item, a profile attribute or other property associated with a user, or other context or factors. Also similar to other examples described herein, the content window 500b includes additional content 502b, which may be extracted directly from the respective content item near real time or near the time of rendering the content window 500b. The additional content 502b may include metadata and/or content extracted from the respective content item.

In the current example, the content summary 510b is displayed as a table of content. As described previously with respect to FIGS. 2 and 3, the content of the content item may be analyzed to determine a classification type or other characteristic of the content. In accordance with a determination that the content corresponds to a respective classification type associated with table content, the system may generate the content summary in the form of a table in which content is inserted in respective cells. As discussed previously, example content may be classified or characterized as being structured content, comparative content, categorical content, and/or numerical content. In accordance with a determination or classification of the content as being a type that may be displayed as a table or matrix, the system may cause generation of the summary in a table format. In some cases, the user may be able to toggle between a narrative summary and a table-based summary. This functionality may require that at least two different summaries by generated and stored in the respective content store for later recall and use.

In the example of FIG. 5B, the content window 500b also includes selectable graphical objects 512b that may be displayed within respective cells of the table of the content summary 510b. As discussed previously, the selectable graphical objects 512b may be identified within the content and preserved and/or tagged so that they may be recalled and displayed within the content summary 512b. Also as described previously, the selectable graphical objects 512b may be selectable to cause the interface to be redirected to a display of the respective content item within the respective platform or client application.

Figure 5C:
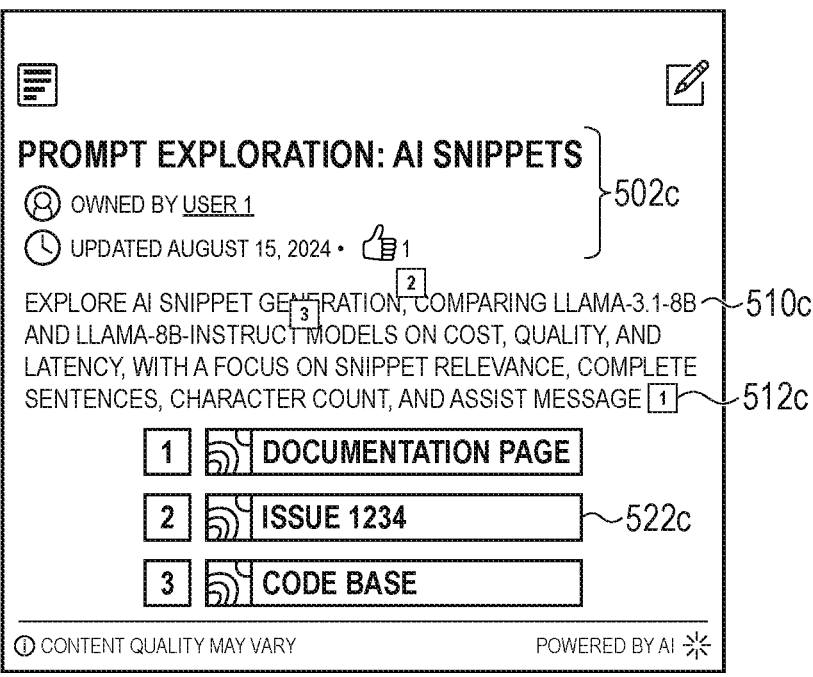

FIG. 5C depicts another example content window 500c that includes a content summary 510c that may be generated in accordance with the embodiments described herein. Specifically, the content summary 510c may be generated using one of the processes described above with respect to FIGS. 2 and 3 and may be customized for a particular classification type of the content item, a profile attribute or other property associated with a user, or other context or factors. Also similar to other examples described herein, the content window 500c includes additional content 502c, which may be extracted directly from the respective content item near real time or near the time of rendering the content window 500c. The additional content 502c may include metadata and/or content extracted from the respective content item.

In the current example, the content summary 510c is annotated with reference to particular content items that were used to generate the content summary 510c. In the current example, the content summary 510c is generated using multiple content items that are either contained as links within the main or parent content item, include content that is embedded in the main or parent content item, or are otherwise related to the main or parent content item within the platform. During the analysis and summary generation process, content may be extracted from the additional content items and used to generate the content summary 510c. The respective prompt may include instructions to tag content used to generate the content with a respective identifier corresponding to the source. The system may then generate annotations or symbols to indicate which segments or portions of the summary are associated with the respective source. As shown in the present example, selectable graphical objects 522c associated with the respective sources are displayed within the content window 500c. The selectable graphical objects 522c may operate similar to other examples described herein.

FIG. 5D depicts another example content window 500d that includes a content summary 510d that may be generated in accordance with the embodiments described herein. Specifically, the content summary 510d may be generated using one of the processes described above with respect to FIGS. 2 and 3 and may be customized for a particular classification type of the content item, a profile attribute or other property associated with a user, or other context or factors. Also similar to other examples described herein, the content window 500d includes additional content 502d, which may be extracted directly from the respective content item near real time or near the time of rendering the content window 500d. The additional content 502d may include metadata and/or content extracted from the respective content item.

In the current example, the content window 500d includes additional items that may be included in combination or alone with the content summary 510d. Specifically, the content window 500d includes a key takeaway 520d, which may be generated as part of the summary generation process. The key takeaway 520d may include a more abbreviated snippet that describes the main point, core insight, or essential subject matter of the respective content item. In some cases, the takeaway 520d includes an actionable insight or suggested action that can be derived from the content of the content item. The takeaway 520d may be generated using specific instructions or predetermined query prompt text that is added to the prompt that is provided to the generative output engine. In some cases, a separate prompt is used to generate the content of the takeaway 520d.

In the current example, the content window 500d also includes an input field or region 530d that is adapted to receive text user input. In response to a user input provided to the region 530d, the system may cause generation of a prompt that includes the user input and at least a portion of the content summary 510*d* or content extracted from the associated content item and provide the prompt to a generative output engine. The generative response from the generative output engine may be displayed within the content window 500*d* or within another graphical element in the graphical user interface. This allows the user to provide further inquiries with respect to the content item to obtain further information about the content item without having to navigate away from the current context. For example, the user may input, "does the article mention XYZ subject matter or include a reference to @username?" In response, the system may generate a generative response that is based on the user query and the content summary or the content of the content item. In some cases, the user input may include a command or instruction to perform one or more operations based on the content item or content summary 510*d*. For example, the user may enter an instruction "generate a new page or document including a 200 word summary of this content item." In response, the system may generate a new generative response (using a generative output engine) and use the generative response to perform the requested operation or operations. Additional examples of interactions between a user and the window using an input field or region are described below with respect to FIGS. 6A-6E and FIG. 7.

FIGS. 6A-6E depict further examples of graphical user interfaces having content summary functionality. Specifically, the examples depict how a content summary, generated using one or more of the techniques described above, can be displayed in a graphical user interface with respect to selectable graphical objects or other embedded content. The examples of FIGS. 6A-6E also display content summaries and other data associated with or generated using an associated content item or target content item. However, instead of automatically displaying a content summary, the interface may include one or more controls which may trigger the display of the summary or other content. The content summaries may be generated in accordance with the examples described above. Further, the interface examples described above may include similar controls or other elements described below with respect to FIGS. 6A-6E.

Figure 6A:
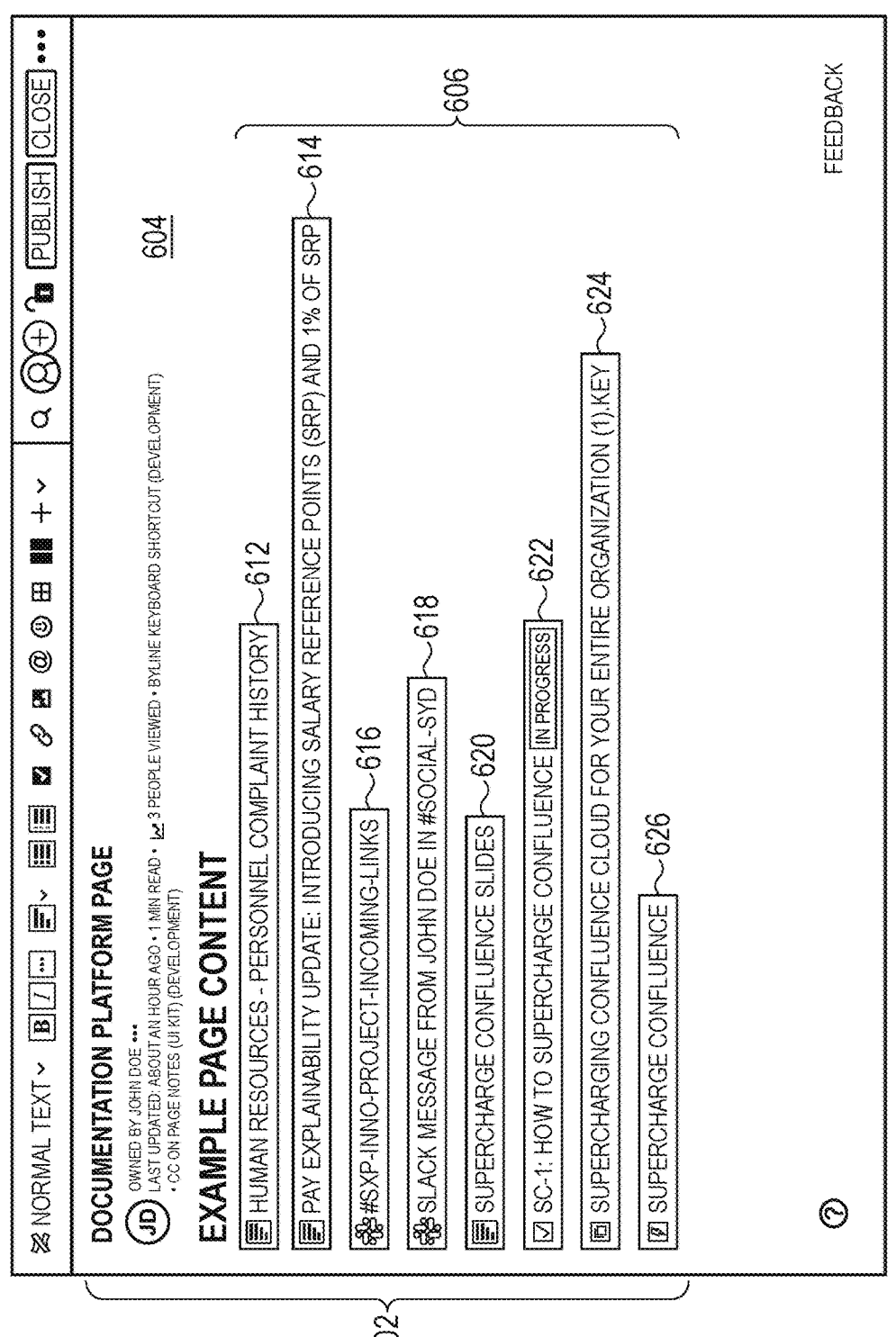
FIG. 6A depicts an example frontend interface that supports content generation in content collaboration platforms, in accordance with aspects described herein.

FIG. 6A depicts an example graphical user interface 600*a* that supports content summary generation for collaboration platforms, in accordance with aspects described herein. Frontend interface 600*a* may also be referred to as a UI or GUI. The frontend interface 600*a* can be rendered by a client device 104 or a client device 106, which may be a personal electronic device such as a laptop, desktop computer, tablet and the like. The client device can include a display with an active display area in which a user interface, e.g., frontend interface 600*a* can be rendered. The user interface can be rendered by operation of an instance of a frontend application associated with a backend application that collectively define a software platform as described herein. In some examples described herein, the graphical user interface 600*a* may be displayed subsequent to or in response to an authentication of a user of the content collaboration platform.

The example graphical user interface 600*a* includes a page having user-generated content 600*b* displayed in a content panel 604 of the graphical user interface. Similar to as previously described, the graphical user interface 600*a* provided by the frontend or client application may operate in one of a number of different modes. In a first mode, a user may create, edit or modify page or other digital content. This mode or state of the graphical user interface may be referred to as an editor user interface, content-edit user interface, a page-edit user interface, or document-edit user interface. In a second or other mode, the user may view, search, comment on, or share the electronic document, page, or digital content. This mode or state of the graphical user interface may be referred to as an viewer user interface, content-view user interface, a page-view user interface, or document-view user interface. The graphical user interface may be implemented in a web browser client application using HTML, JavaScript, or other web-enabled protocol.

The graphical user interface 600*a* may allow the user to create, edit, or otherwise modify user-generated content that is stored as an electronic page. The electronic page or other digital content may be rendered on a client device by the content collaboration service upon authorization/authentication of the user by the authentication/authorization service, and based on permissions granted to the user as validated according to a user profile associated with the user. Further, the content that is rendered in the content panel, including the selectable graphical objects 606, which may contain content extracted from or obtained from other content items having their own respective permissions profiles.

Similar to previous examples described above, the graphical user interface 600*a* may have various panels, partitions, sections, or panels displaying different content. For example, the graphical user interface 600*a* includes a navigational panel 608, a toolbar 605, and a content panel 604. The navigational panel 608 displays a hierarchical element tree 610 also referred to herein as a page tree. The hierarchical element tree 610 includes a hierarchically arranged set of elements, each element selectable to cause display of a respective content item in the content panel 604. The elements may include a short title and/or graphical elements that indicate the subject matter and type of content item associated with each respective element. Many of the elements may also be selected and moved within the hierarchical element tree 610 in order to redefine a parent-child relationship between the respective elements. The collection of elements depicted in the navigational panel 608 maybe associated with a respective space, also referred to herein as a content space, page space, or document space. As discussed previously, a space defines a collection of content items for which the space creator is the default administrator having default read, write, view, and control permissions with respect to all items within the space.

Generally, the graphical user interface 600*a* is used to generate and display user-generated content 606. As shown in FIG. 6A, the user-generated content includes text content 612, which may be formatted in accordance with a formatting scheme, such as HTML, XML, Atlassian Document Format (ADF), or other similar scheme or language. In some examples, the text content can also be displayed in line with hypertext, graphical elements and other content that is enabled by the editor instantiated by the frontend application within the content panel 604.

The user-generated content also includes other elements that may be generated by respective sets of macro instructions that are associated with the page. Example macro-enabled content include the selectable graphical objects 606, which include embedded content extracted from respective target content items that are linked to the objects. For example, the selectable graphical objects 606 may include an extracted title, brief description embedded graphics, and other content extracted from the respective content item. The selectable graphical objects 606 may also include selectable elements or virtual buttons that allow the user to modify the target content item directly from the selectable graphical objects 606. The selectable graphical objects 606 may also include graphics indicating the type of content that is linked and the respective platform that is hosting the content. Examples of selectable graphical objects 606 are illustrated.

A first selectable graphical object 614 and a fourth selectable graphical object 620 are examples of a selectable graphical objects that share a common graphic indicating that the selectable graphical object is associated with a first type of platform, such as a documentation platform. The graphical user interface 600a is shown as an example of a documentation platform consistent with the disclosure here, and the navigational panel 608, the toolbar 605, and the content panel 604 are of such documentation platform. In some embodiments, the documentation platform is a part of the content collaboration system as the documentation platform associated with the first selectable graphical object 614 and the fourth selectable graphical object 620. However, in other embodiments, the selectable graphical objects can be a documentation platform different from the documentation platform shown for the graphical user interface 600a, for example a different type of documents platform within the same content collaboration system. In still other embodiments, the selectable graphical objects can be a documentation platform different from the documentation platform shown for the graphical user interface 600a, and the documentation platform may also be external to the content collaboration system, for example operated by a third party.

A second selectable graphical object 616 and a third selectable graphical object 618 are examples of selectable graphical objects that share another common graphic indicating that the selectable graphical object is associated with a second type of platform, such as a communication platform, which may a part of or external to the content collaboration system.

A fifth selectable graphical object 622 is an example of a selectable graphical object that may be associated with a third type of platform, such as an issue tracking platform. A sixth selectable graphical object 624 is an example of a selectable graphical object that may be associated with a fourth type of platform, such as a file hosting and sharing platform. A seventh selectable graphical object 626 is an example of a selectable graphical object that may be associated with a fifth type of platform, such as a third-party content collaboration platform that includes a multiplicity of different types of platforms or sub-platforms, such as document creation and collaboration and file hosting and sharing.

In some embodiments, other macro-enabled content may be in the content panel 604, includes graphical items which includes graphics (e.g., diagrams, charts, or other graphics) that are extracted from another content item, which may also be referred to as embedded content. In some cases, the graphical items are extracted from content items provided by a separate platform and are updated in response to a page refresh or load operation. Other macro-enabled content may include in-line comments, embedded viewports such as iframe elements, tables generated using linked content, and other similar items. As described herein, the system may reconcile an authenticated user's permissions with permissions profiles for each of the embedded or macro-enabled content of the page before rendering the respective items. This prevents disclosure of potentially sensitive content to users that do not have the appropriate access or permissions.

In some embodiments, a user may control public access to a page by accessing a control panel (also referred to as a floating window element) by selecting a corresponding control of the toolbar 605 and configuring the page to allow for secure (limited) access, or public access. In some cases, the public access version may be a reduced or restricted version of the secure version. For example, the public access version may omit certain sensitive information, such as internal IDs or addresses, so that such information is not shared externally to the content collaboration system.

In some embodiments, before a control element may be enabled or before the page may be made publicly available, the system may need to resolve a hierarchical permission scheme in which multiple levels of control must allow for public sharing of content for the specific page, for the respective space, at a respective site or platform level, and for a particular tenant or cross-platform level. In some implementations, in accordance with one or more of the levels prohibiting or restricting public access, one or more of the controls the controls may be grayed out or inoperable. In some implementations, operation of one or more of the controls is not permitted by one or more levels of the control scheme may cause display of an informational window with a brief description indicating which level of control is prohibiting public sharing of the page and a brief explanation of why content may not be shared publicly.

In one or more embodiments, the graphical user interface 600a is an example of a graphical user interface that is caused to be generated in the content collaboration system. In some examples, the graphical user interface 600a may be displayed subsequent to or in response to an authentication of a user of the content collaboration platform.

Figure 6B:
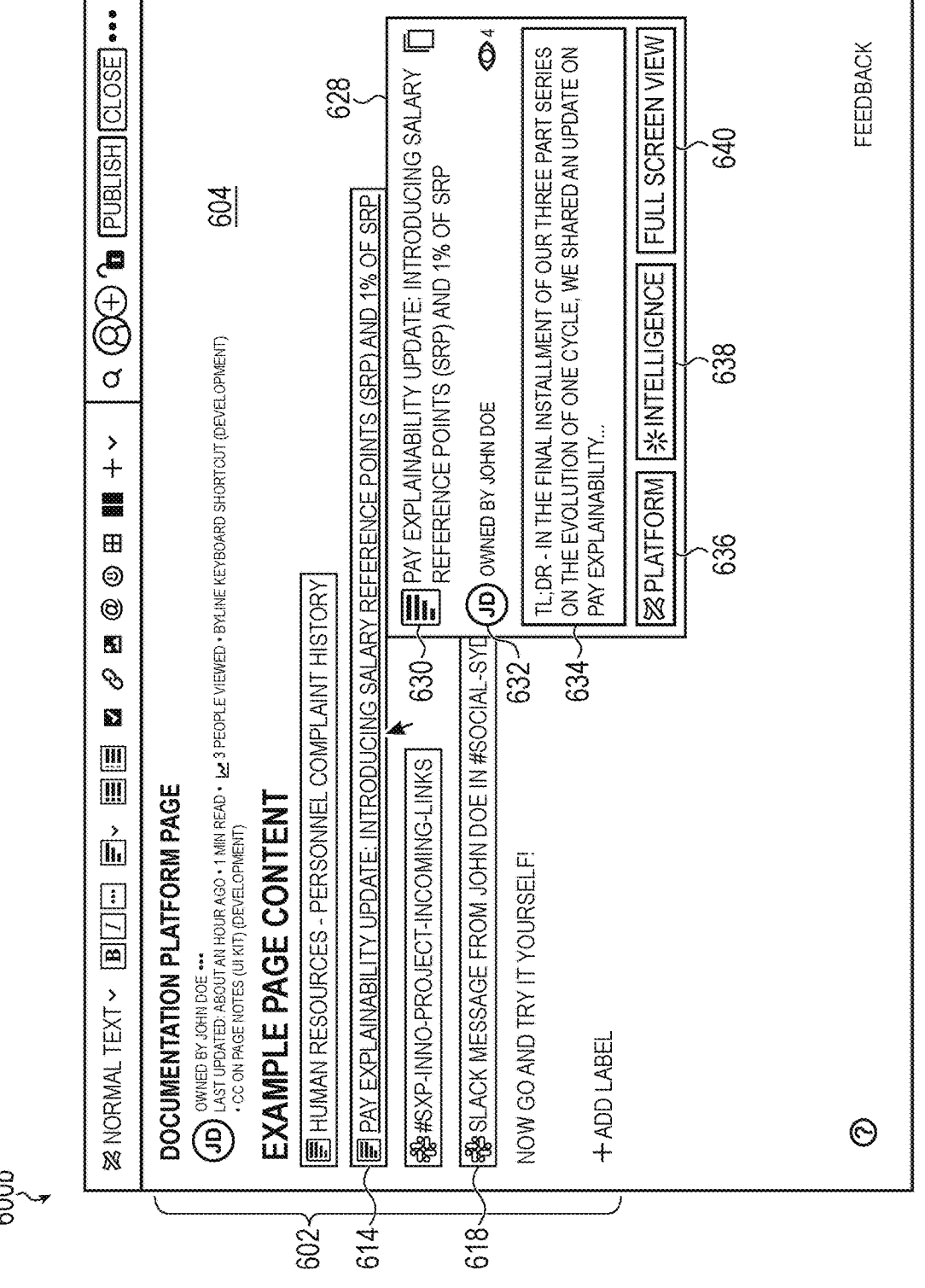
FIG. 6B depicts an example frontend interface that supports content generation in content collaboration platforms, in accordance with aspects described herein.

FIG. 6B depicts an example of a graphical user interface 600b that supports content summary generation for collaboration platforms, in accordance with aspects described herein. A user provides input (e.g., a hover input) with respect to one of the selectable graphical objects 606, for example using a user input device (e.g., mouse, stylus, trackpad, etc.). In the example of graphical user interface 600a, the user provides the input with respect to the selectable graphical object 614, resulting in the graphical user interface 600b.

In response to receiving the user input with respect to the selectable graphical object 614, the system provides a request for content to a content store or content graph, the request for content associated with the selectable graphical object 614. The request for content may be formatted as a databased call or other structured data query.

In the case that the selectable graphical object 614 is for a platform external to the system 100, such for the selectable graphical object 618 when the selectable graphical object 618 is for a third-party messaging platform, the request for content may be a call to a different database, for example via an API call requesting the content from a third party platform.

The data store then provides at least a portion of the content. The content may include textual content, images, graphics, videos, charts, data, structured data, links to other content of the system, links to targets external to the system, metadata regarding the content, or any other suitable content stored within the content store of the system. In some examples, the metadata includes one or more of an author, owner, group, or team associated with content, a creation, modification, due, or expiration date, a viewing or editing history, or the like. As described previously, a portion of the data may be extracted from the content item itself and another portion of the content (e.g., the content summary) may be obtained from a content store or content graph, as described above with respect to FIGS. 2 and 3.

At least a portion of the content and metadata can then be displayed within the graphical user interface 600b. In one or more embodiments, a window 628 (also referred to herein as a "content window" or "summary window") is generated in the graphical user interface 600b. The window 628 may be also referred to as a hover or hover card, popup, callout, or other term indicating a sub-display within the graphical user interface 600*b*. In one or more embodiments, window 628 may be moveable (e.g., draggable), or otherwise able to be repositioned by a user within the graphical user interface 600*b*.

In the example of window 628 generated for the selectable graphical object 614, a heading 630 (e.g., a title or other text of the selectable graphical object 614) is displayed as well as metadata 632 associated with the content (the target content), which is illustrated as an owner and a number of views of the content. A content portion is also displayed in a content frame 634. Where the content is short (e.g., for text) or small (e.g., for a graphic, image, or table), the full content may be displayed within content frame 634. However, in some cases, the retrieved content exceeds a size of the content frame, such that a portion of the content is displayed, for example a first portion of the content (e.g., for text), or a top portion or reduced size or resolution version of the content (e.g., for a graphic, image, or table).

In addition, window 628 includes a platform indication 636, a user input 638 for a generative output engine, and a full screen button 640. The full screen button 640 allows a user to switch from window 628 to view aspects of the target content associated with the selectable graphical object 614, to the target content itself. In the case that the user selects the full screen button 640, the page having user-generated content 602 may be replaced with a new page having user-generated content in graphical user interface 600*b*, where the user-generated content is the target content of selectable graphical object 614. As further discussed herein, the user input 638 accepts user input for the generative output engine.

In one or more examples, the user input or control 638 of window 628 is a virtual button that when selected is an indication that the user requests a particular operation of the generative output engine, such as creating and providing a summary of the target content associated with the selectable graphical object 614. In other examples, the user input 638 of window 628 accepts user input in text form, including natural language text. For example, a user may indicate, via a text request, that the generative output engine create and provide a summary of the target content associated with the selectable graphical object 614.

In the example of graphical user interface 600*b*, the user has previously selected the first selectable graphical object 614, though the selection of other selectable graphical objects 606 may result in a similar set of actions and display within a window 628 at the graphical user interface 600*b*. In some examples, the content frame 634 may be tailored according to the platform associated with the selectable graphical object 614. For example, a text preview may be displayed in the content frame 634 for a document platform. In another example, a first message of a message string may be displayed in the content frame 634 for a messaging platform. In another example, a set of image and/or video preview thumbnails may be displayed in the content frame 634 for a media sharing platform.

A user input is provided to the user input or control 638, providing an indication of a request by a user for a summary of the content, a portion of the content being displayed in content frame 634. In response to receiving the user input requesting a summary of the content, the system may obtain a content summary from a content store or content graph, which stores pre-generated summaries and other content. Alternatively, the system may compute the summary in real time and generate a summary-generation prompt for the generative output engine. In particular, the summary-prompt includes at least a portion of the content. The summary-generation prompt may further include one or more exemplary content-summary pairs, for example to demonstrate for the generative output engine example input content and correct example output summaries associated with each input content. In some cases, the content-summary pairs are selected by the centralized summary generation service 112 according to a type of the content, for example depending on the platform that the content is associated with. For selectable graphical object 614, which is associated with target content of a documentation platform the content-summary pairs may be bodies of source text paired with exemplary textual summaries of that source text.

The summary-generation prompt that is generated by the centralized summary generation service 112 is then provided to the generative output engine using an application program interface call, for example via prompt management service 114 and generative output service(s) 116 according to the techniques described further herein. Following processing by the natural language engine, the system 100 (e.g., at centralized summary generation service 112) obtains a generative response from the generative output engine. Based on at least a portion of the generative response, the system 100 then causes the generation of a natural language summary string within the window 628.

Figure 6C:
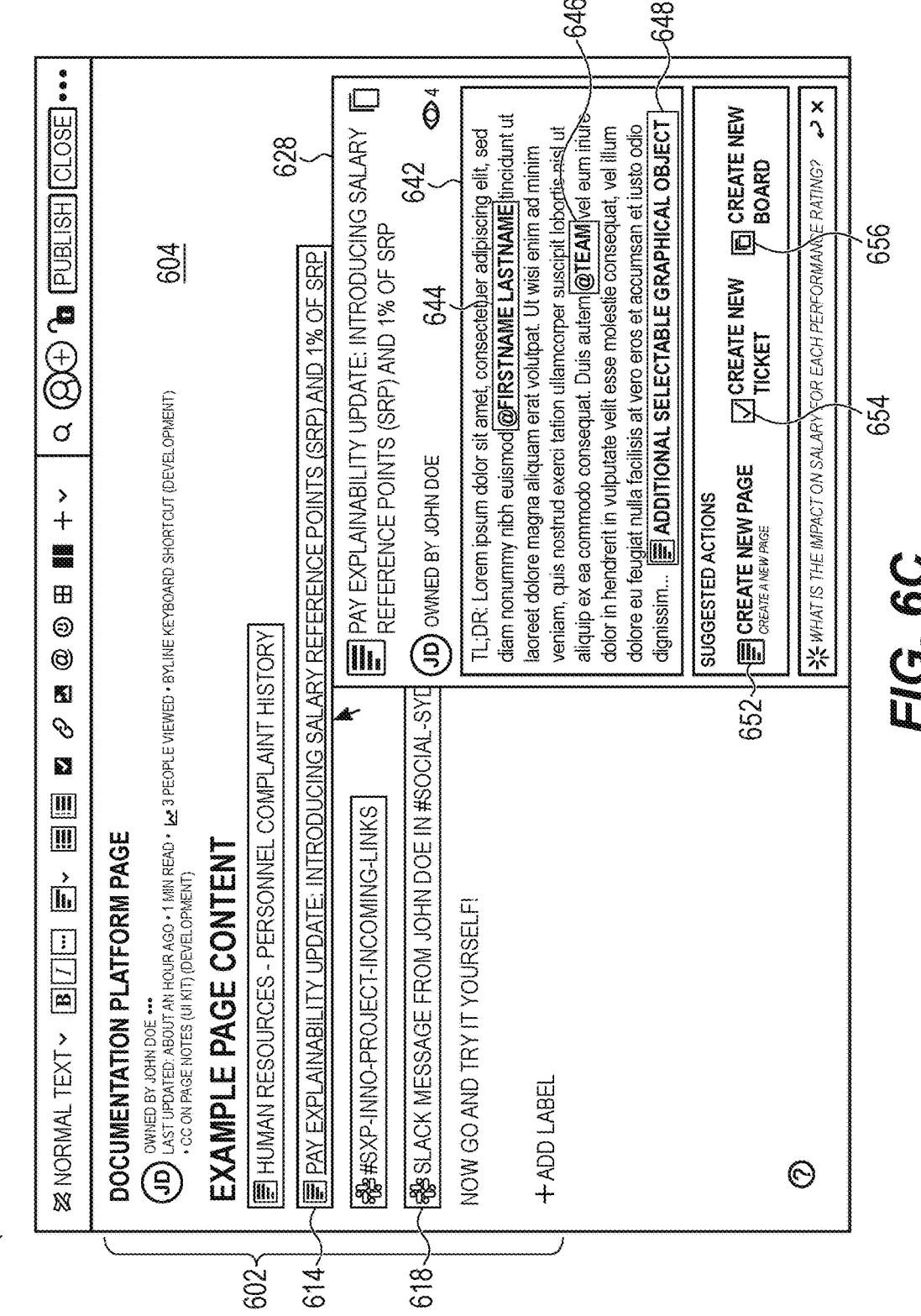
FIG. 6C depicts an example frontend interface that supports content generation in content collaboration platforms, in accordance with aspects described herein.

FIG. 6C depicts an example of the graphical user interface 600*c* that supports content summary generation for collaboration platforms, in accordance with aspects described herein. The graphical user interface 600*c* illustrates the window 628 of graphical user interface 600*b* after the generation of a natural language summary string within the window 628.

In the window 628 of graphical user interface 600*b*, the text or other content of the content frame 634 is replaced with a natural language summary string 642. In one or more examples, the natural language summary string 642 is at least a portion of the output of the generative response. In some examples, post-processing of the returned generative response and/or natural language summary string 642 may be performed to replace (e.g., populate, insert, hydrate, etc.) text of the natural language summary string 642 with a reference of the system. In some cases the reference of the system may be specific to the system, or a particular platform of the system. A non-exhaustive list of example references of the content collaboration system includes a person name, a team name, a page, a ticket, a board, a card, or a selectable graphical object.

In one example, the system may analyze the natural language summary string 642 to identify names of users of the system, and replace a simple text name with a personal mention 644 (e.g., "@FirstnameLastname") or team mention 646 ("@Team"). A mention (also known as "@mentions") may be used to draw a user's or team's attention to a page, comment, task, or other content. A set of one or more people may be associated with a team mention 646. For example, the creation of a personal mention 644 or team mention 646 can be used as a trigger for a notification to the person(s) associated with the personal mention 644 or team mention 646.

In another example, the system may analyze the natural language summary string 642 to identify content elsewhere in the system, for example a page, issue, message, board, and so on, that are referred to in the natural language summary string 642. The system can then replace text of the natural language summary string 642 with an additional selectable graphical object 648, or insert the additional selectable graphical object 648 into the natural language summary string 642.

In additional examples, further context is obtained as a result of the analysis of the content, or based on the metadata associated with the content. The context may be generated in window 628 with the natural language summary string 642. In one or more examples, the context includes one or more of additional messages of a messaging platform, a transcript from a video conferencing platform, referenced and/or linked content, or content in a page tree, and so on. In some examples, the context is identified using a link-content graph. For system 100, a link content graph is a representation of the link profile between pages, issues, cards, tasks, and so on, on platforms of the system 100. The link-content graph includes the different connections, including the direction of the connection, and may be used to map out the structure of the system 100 and/or the various platforms. From the content, the link-content graph can used to determine context to generate in window 628. For example, window 628 may display a selectable graphical object for each content that is connected to the selectable graphical object 614 via a single reference or link in the link-content graph. In other examples, the target content of the selectable graphical object is directly in the window 628.

In some examples, one or more suggested actions 650 are generated in the graphical user interface 600c. The one or more suggested actions 650 generally take at least a part of the natural language summary string and perform an action in the same platform or a different platform (e.g., a platform within the system 100, or a third-party platform external to the system 100). Additionally, or alternatively, the one or more suggested actions 650 take one or more pieces of metadata associated with the generated natural language summary string as an input to the one or more suggested actions 650. Additionally, or alternatively, the one or more suggested actions 650 take one or more of the information specific to the system 100 that was inserted into the generated natural language summary string as an input to the one or more suggested actions 650. For example, one or more of the personal mention 644, the team mention 646, or the additional selectable graphical object 648 may be used as an input to the one or more suggested actions 650.

Examples of suggested actions include a first suggested action 652 to create a new page, for example in a documentation platform of the system 100. Another example suggested action is a second suggested action 654 to create a new ticket, for example in a issue tracking platform of the system 100. Another example suggested action is a third suggested action 656 to create a new board, for example in a project management platform of the system 100.

In some cases, the suggested actions may be generated in the graphical user interface 600c dependent upon the platform associated with the selectable graphical object 614. For example the selectable graphical object 614 may be a page of a documentation platform, and the set of suggest actions are the first suggested action 652, second suggested action 654, and third suggested action 656. In other examples, the selectable graphical object may be a ticket of an issue tracking platform, and the set of suggested actions are the first suggested action 652, the third suggested action 656, a suggest action to create and populate a message of a third-party messaging platform.

The window 628 of graphical user interface 600b may further have an input field 658 that may be used to receive a natural language query string. Based on the natural language query string, the centralized summary generation service 112 generates a query prompt that is provided to the generative output engine using an API call. In some examples, the query prompt includes the natural language query string and at least a portion of the natural language summary string. The centralized summary generation service 112 obtains a generative response from the generative output engine in response. The system 100 (e.g., the centralized summary generation service 112) then causes a response (which may be or be referred to as a natural language query response string) that is based on at least a portion of the obtained generative response to be displayed for a user.

Figure 6D:
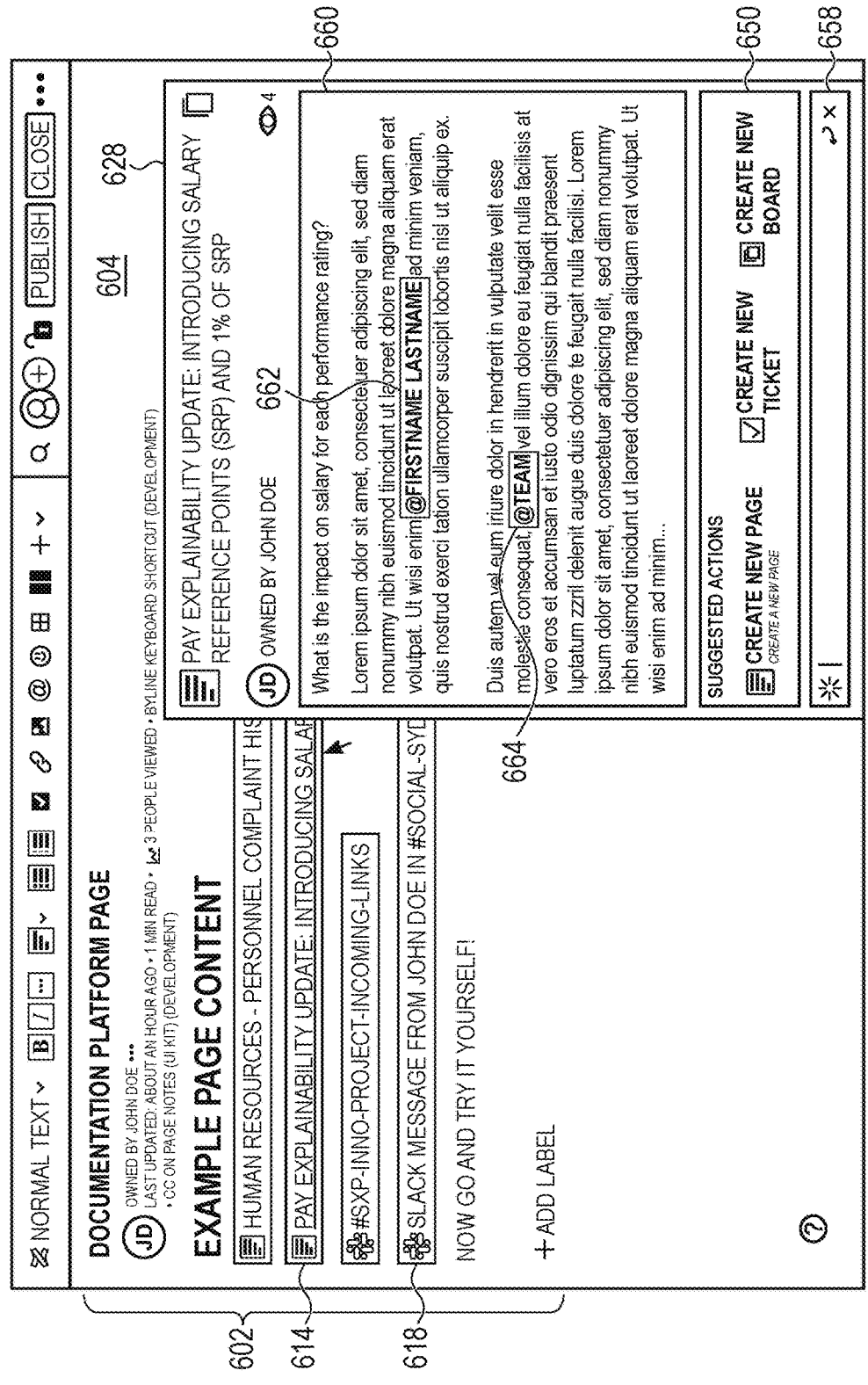
FIG. 6D depicts an example frontend interface that supports content generation in content collaboration platforms, in accordance with aspects described herein.

FIG. 6D depicts an example of the graphical user interface 600d that supports content summary generation for collaboration platforms, in accordance with aspects described herein. The graphical user interface 600c illustrates the window 628 of graphical user interface 600b after the generation of a natural language summary string within the window 628. The natural language query response string 660 is responsive to a natural language query string provided to the system 100 via input field 658. Similarly as for the natural language summary string 642 discussed herein, post-processing of the returned generative response and/or natural language query response string 660 may be performed to replace (e.g., populate, insert, hydrate, etc.) text of the natural language summary string 642 with one or more references of the system 100. Here, as an example, such references include a personal mention 662 and team mention 663, though other types of references may be inserted, including for different platforms.

In some cases, user input 638 of graphical user interface 600b may be used to receive a natural language query string, for example prior to the generation of the summary (e.g., natural language summary string 642).

Figure 6E:
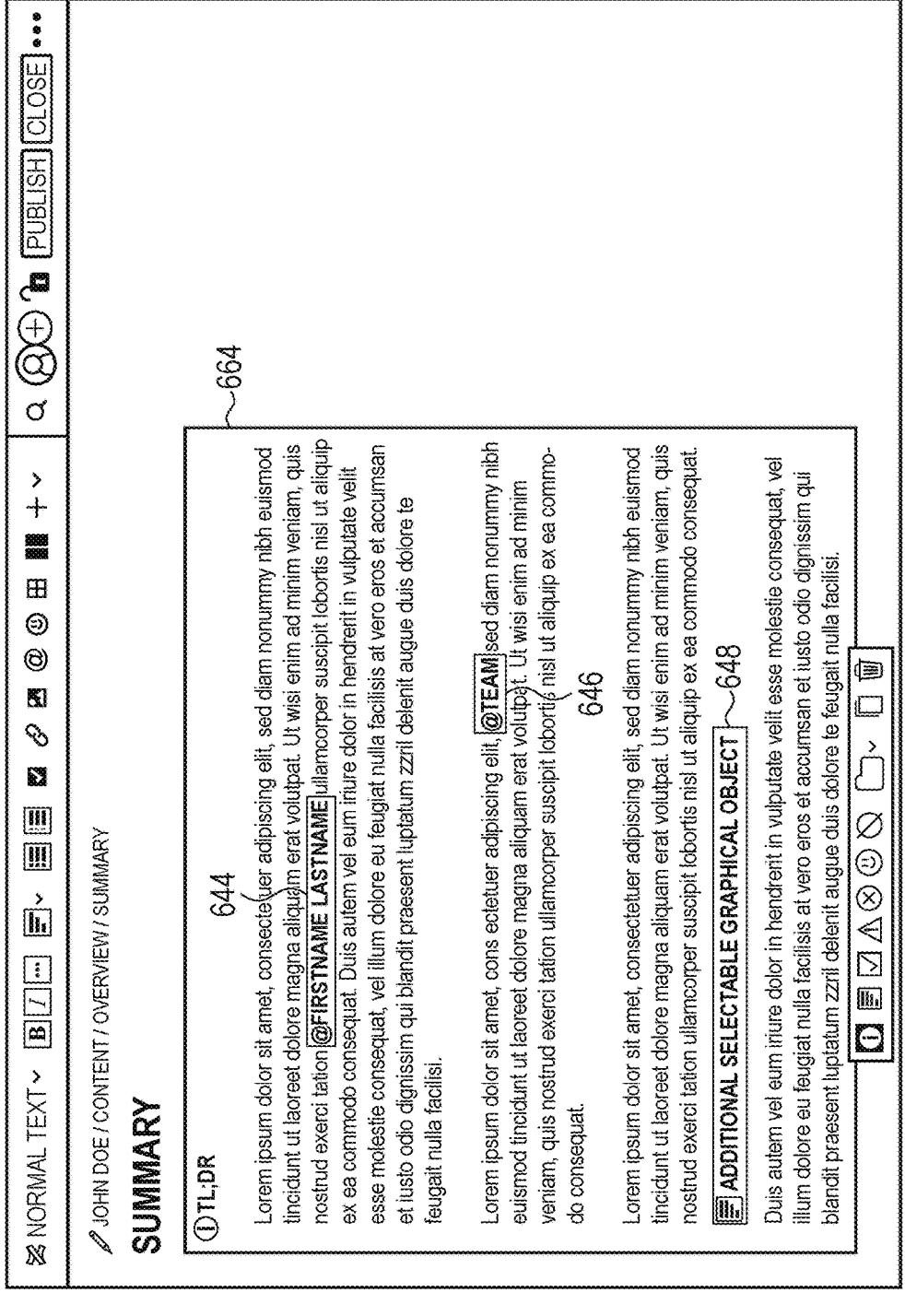
FIG. 6E depicts an example frontend interface that supports content generation in content collaboration platforms, in accordance with aspects described herein.

FIG. 6E depicts an example of the graphical user interface 600e that supports content summary generation for collaboration platforms, in accordance with aspects described herein. The graphical user interface 600e illustrates a result of a user selecting one of the suggested actions 650 illustrated with reference to the graphical user interface 600c, in particular the first suggested action 652. Graphical user interface 600e includes a new content window 664 generated in a documentation platform of the system 100. The documentation platform (e.g., centralized summary generation service 112), responsive to the user selecting the first suggested action 652 has prepared a new, draft page of the documentation platform, and populated a body of the new content window 664 with the natural language summary string generated using the generative output engine. In some cases, where applicable, the one or more references of the natural language summary string 642 (e.g., the post-processed version of the natural language summary string 642) are also included in the draft page. For example, the body of the new content window 664 may include one or more of the personal mention 644, team mention 646, or additional selectable graphical object 648.

In some examples, metadata associated with the creation are also generated for the draft page, for example a creation date, a user, or an indication of the source for the summary (e.g., the target content indicated by the selectable graphical object 614). The draft in new content window 664 may be further modified by a user, then published, saved as a draft, discarded, or shared.

Although illustrated with reference to the creation of a new page as the action, for example by user selection of the first suggested action 652, the system 100 would similarly respond for a different platform (or different suggested action of the same platform) for a different suggested action. Examples of different suggested actions include the second suggested action 654 and the third suggested action 656.

Figure 7:
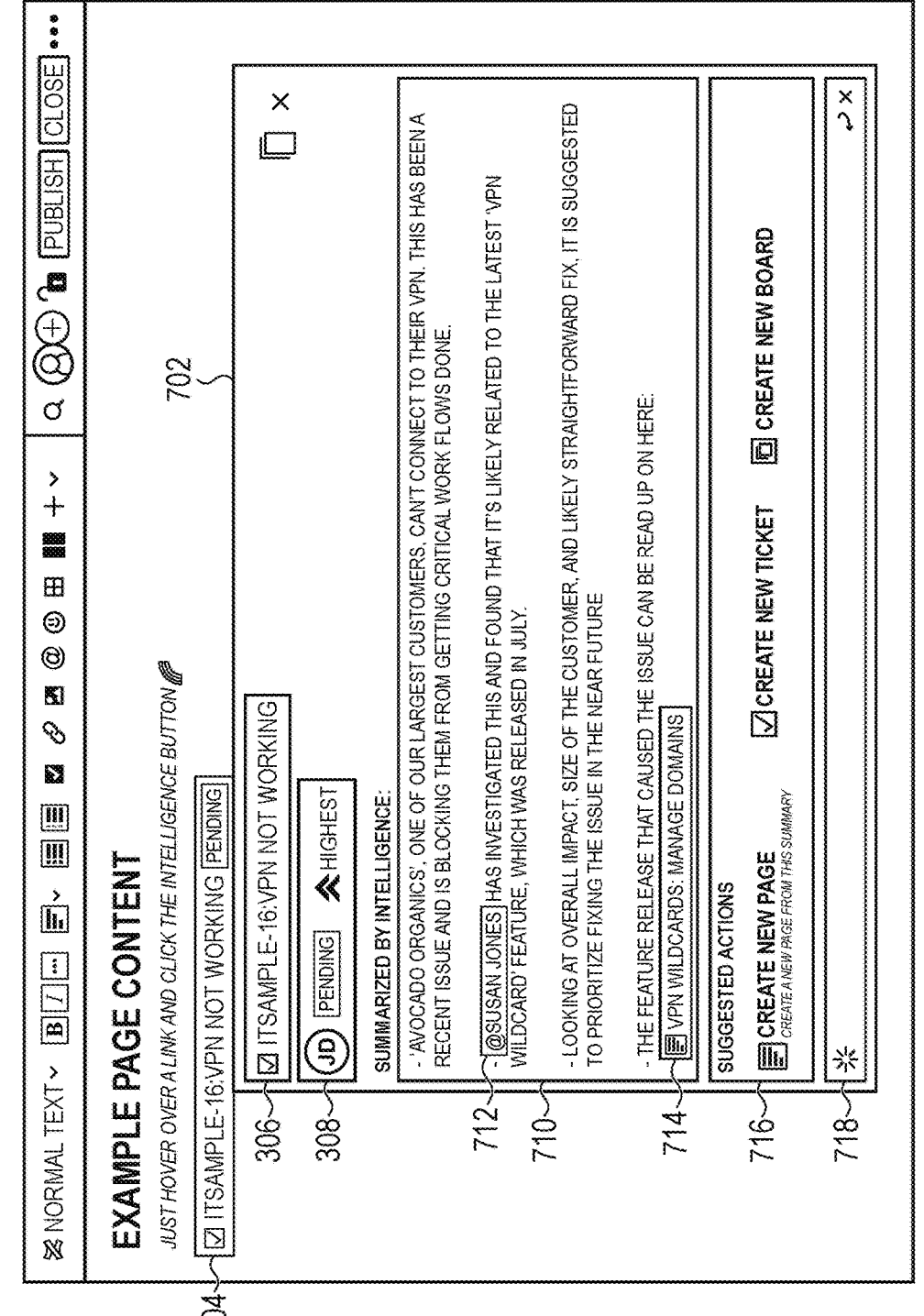
FIG. 7 depicts an example frontend interface that supports content generation in content collaboration platforms, in accordance with aspects described herein.

FIG. 7 depicts an example of a graphical user interface 700 that supports content summary generation for collaboration platforms, in accordance with aspects described herein. The graphical user interface 700 illustrates an example of a window 702, which may be also referred to as a hover or hover card, popup, callout, or other term indicating a sub-display within the graphical user interface 700. Window 702 includes a title 706, metadata 708, a content window 710, one or more suggest actions 716, and an input field 718 that may be used to receive a natural language query string or request for summary of content to a generative output engine.

The generation of the window 702 within user interface 700 is responsive to the selection of or other user input with respect to the selectable graphical object 704, and/or a user has selected for the target content previously displayed in the content window 710 to be summarized. For example, the user may have indicated via a user input (e.g., similar to user input 638 of graphical user interface 600b) for the generative output engine to provide a summary of the target content associated with the selectable graphical object 704, resulting in the content displayed in content window 710. In this example, the content of content window 710 includes a first reference 712 (e.g., a name reference) and a second refence 714 (e.g., as selectable graphical object) that have been inserted.

In the example of graphical user interface 700, the selectable graphical object 704 is associated with a different platform type than the selectable graphical object 614 discussed herein. As such, a schema for display of the summarized content (e.g., the natural language summary string, including with zero or more reference inserted or populated) within window 710 may be different than the schema for the window 228. For example, the summary-prompt generated by the centralized summary generation service 112 as a result of the user input indicating for a summary to be prepared, can include a different schema to provide to the generative output engine together with the content from the target content for the selectable graphical object 214.

Figure 8:
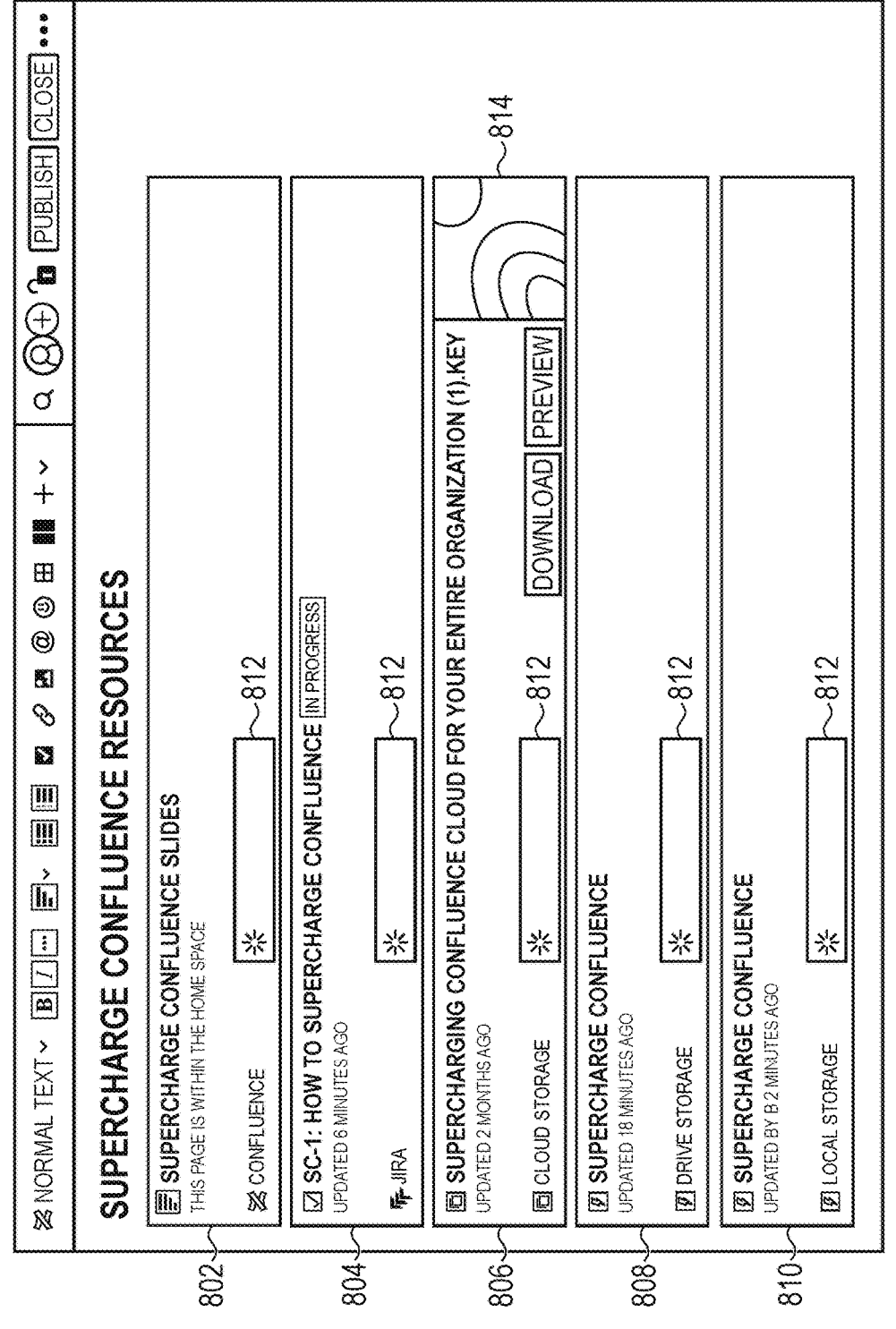
FIG. 8 depicts an example frontend interface that supports content generation in content collaboration platforms, in accordance with aspects described herein.

FIG. 8 depicts an example of a set of selectable graphical objects 800 that supports content summary generation for collaboration platforms, in accordance with aspects described herein. Each of selectable graphical objects 800 (which may be referred to as being in a card view) are formatted, generated, and displayed different from the selectable graphical objects 206 (which may be referred to as being in an inline view). For example, a first selectable graphical object 802 may be associated with a documentation platform, a second selectable graphical object 804 may be associated with an issue tracking platform, a third selectable graphical object 806 may be associated with a file sharing platform, a fourth selectable graphical object 808 may be associated with a first type of third-party document management and content collaboration platform, and a fifth selectable graphical object 810 may be associated with a second type of third-party document management and collaboration platform. In some cases, the selectable graphical object may include a preview (e.g., thumbnail image), a portion of text content, metadata, or other information extracted or otherwise obtained from the target content for the associated selectable graphical object. For example, the target content for the third selectable graphical object 806 includes a presentation document, and a thumbnail image

814 extracted from the target presentation document is included in the third selectable graphical object 806.

Each of the selectable graphical objects 800 include an input field 812 that may be used to receive a natural language query string or request for summary of content to a generative output engine. Selecting the input field 812 of one of the selectable graphical objects 800 can result in the generation of a hover window similar to window 242 discussed with reference to graphical user interface 200-c, which includes a summary string generated as a result of a generative output of the generative output engine for target content from the associated selectable graphical object.

Selecting a selectable graphical object can result in a hover window similar to window 628 discussed with reference to graphical user interface 600b, and the hover window may also include an input field 812 with aspects similar to those of input field 638 discussed with reference to graphical user interface 600b.

Figure 9:
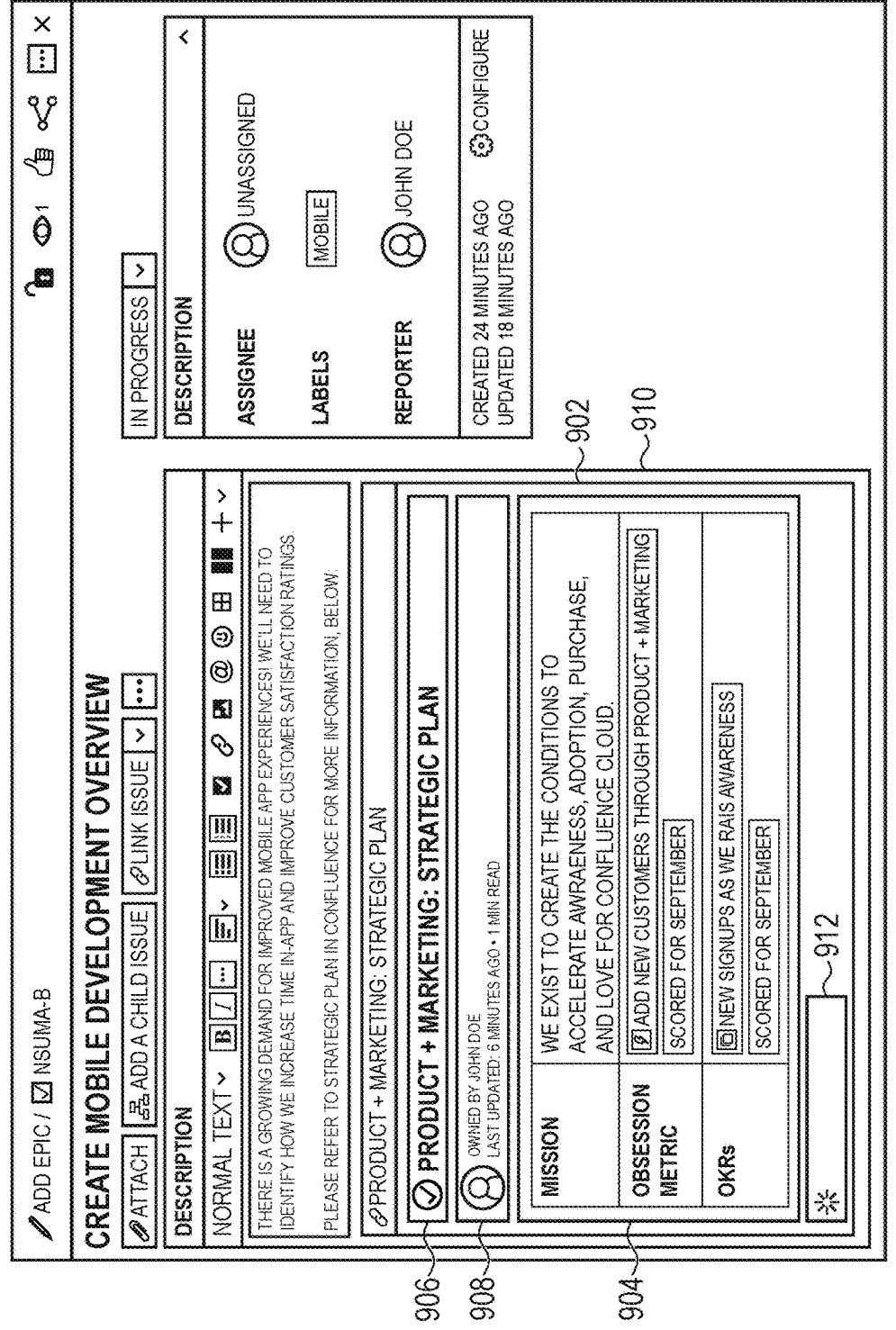
FIG. 9 depicts an example frontend interface that supports content generation in content collaboration platforms, in accordance with aspects described herein.

FIG. 9 depicts an example of a graphical user interface 900 that supports content summary generation for collaboration platforms, in accordance with aspects described herein. In particular, graphical user interface 900 illustrates a selectable graphical object 902 in an embedded view, within a page 910 of a documentation platform. In some examples, the embedded view allows for a full view of the target content 904, within the context of the page 910, including a title 906 and metadata 908 for the target content.

Also within the embedded view of the selectable graphical object 902 is an input field 912, described herein. As further described herein, selecting the input field 412 can generate a hover window similar to window 642 discussed with reference to graphical user interface 600c. Additionally, or alternatively, selecting the input field 912 can generate a hover window similar to window 628, which itself includes an input field 912.

Figure 10:
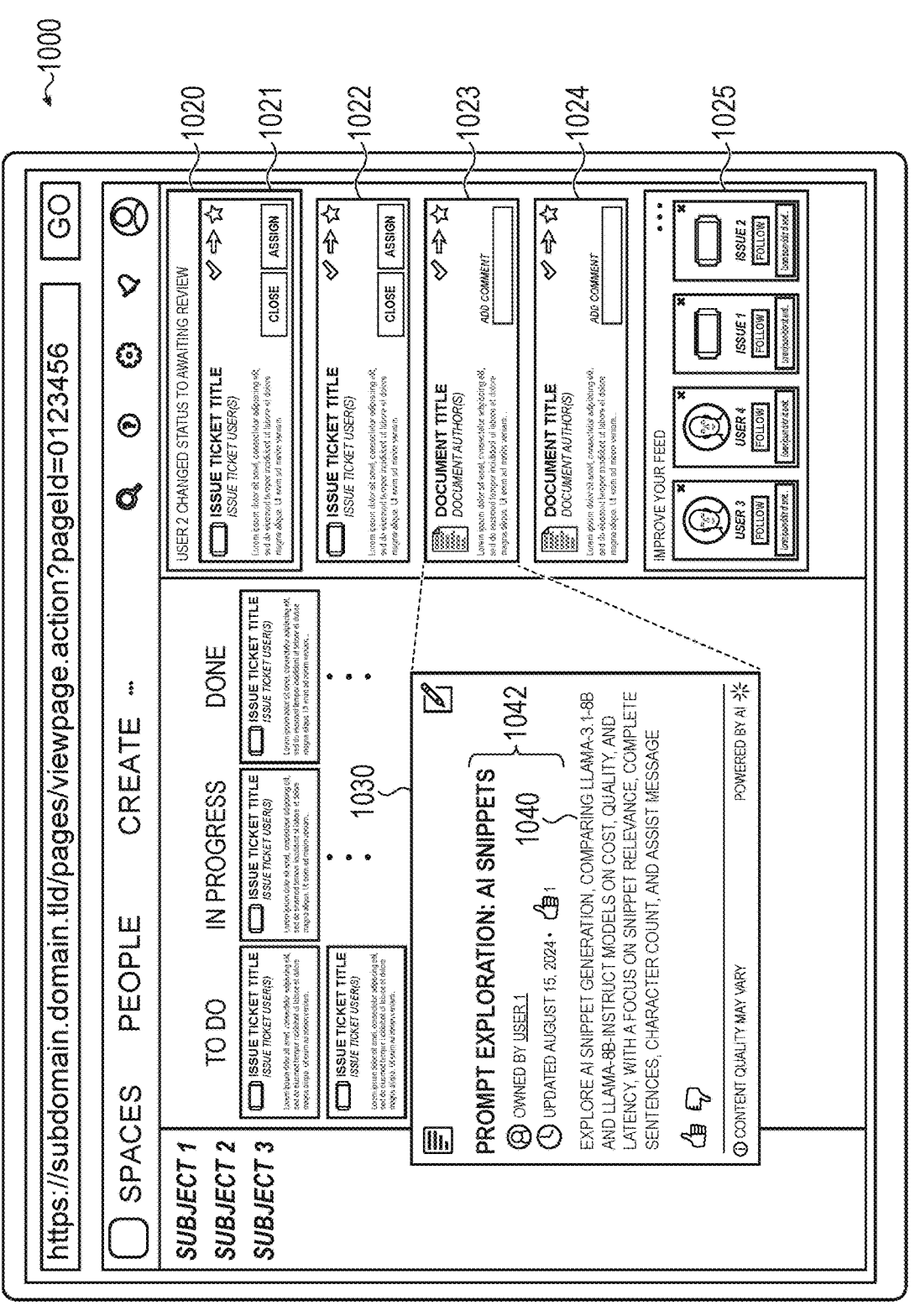
FIG. 10 depicts an example graphical user interface including a feed having a set of feed items and a content summary, in accordance with aspects described herein.

FIG. 10 depicts another example user interface 1000 that can leverage the content summaries and generative content, described herein. In particular, the graphical user interface 1000 includes a content feed 1020, which includes a set or array of content feed items 1021, 1022, 1023, 1024. Each of the content feed items 1021-1024 may be generated in response to an event occurring with respect to a respective content item hosted by a respective platform. The content feed 1020 may include feed items from multiple different platforms, which may generate feed events or notifications in response to a variety of events that are performed with respect to a respective content item. Example events include content generation events, user interaction events, content item state or status change events, content modification events, and other activities or operations that may be performed with respect to content items. In this example, each of the content feed items 1021-1024 includes data that has been extracted from an associated content item including content and metadata of the content item. The extracted content may be obtained by the platform hosting the feed or the content may be obtained from a respective notification generated by the originating platform. In this example, the content feed 1020 also includes a recommendation tile or item 1025, which includes content items, users, spaces, or other items that are recommended to be followed by the user of the interface 1000.

Similar to previous examples, an input provided to a respective content feed item (e.g., item 1023 in this example), a content window 1030 may be generated including a content summary 1040 and other content 1042, which may be extracted from the respective content item. Similar to previous examples, the content window 1030 may be displayed in response to a hover input with respect to a feed item. The content summary 1040 may be obtained from a content store or data graph, which was generated in response to a process such as process 200 or 300 of FIGS. 2 and 3, respectively. Also similar to previous examples, the other content 1042 may be extracted at near real time directly from the respective content item. The content window 1030 may include any of the information, controls, or other elements described above with respect to other example content windows and graphical objects described herein, which are not repeated with respect to this example to reduce redundancy.

These foregoing embodiments depicted in FIGS. 2-10 and the various alternatives thereof and variations thereto are presented, generally, for purposes of explanation, and to facilitate an understanding of various configurations and constructions of a system and related user interfaces and methods of interacting with those interfaces, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings. For example, it may be appreciated that a common editor frame is only one method of providing input to, and receiving output from, a generative output engine as described herein.

Figure 11A:
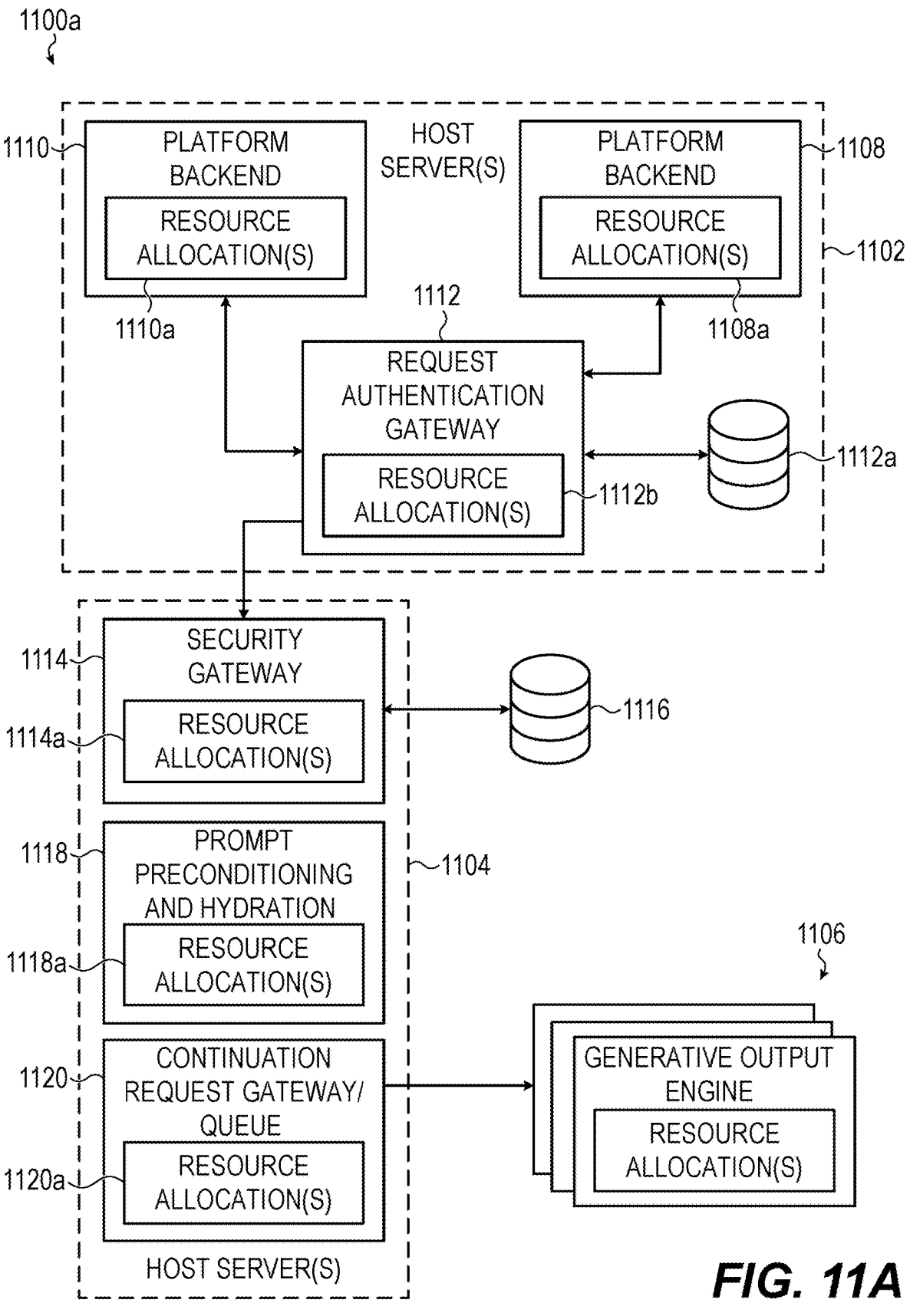
FIG. 11A depicts a simplified diagram of a system, such as described herein that can include and/or may receive input from a generative output engine.
Figure 11B:
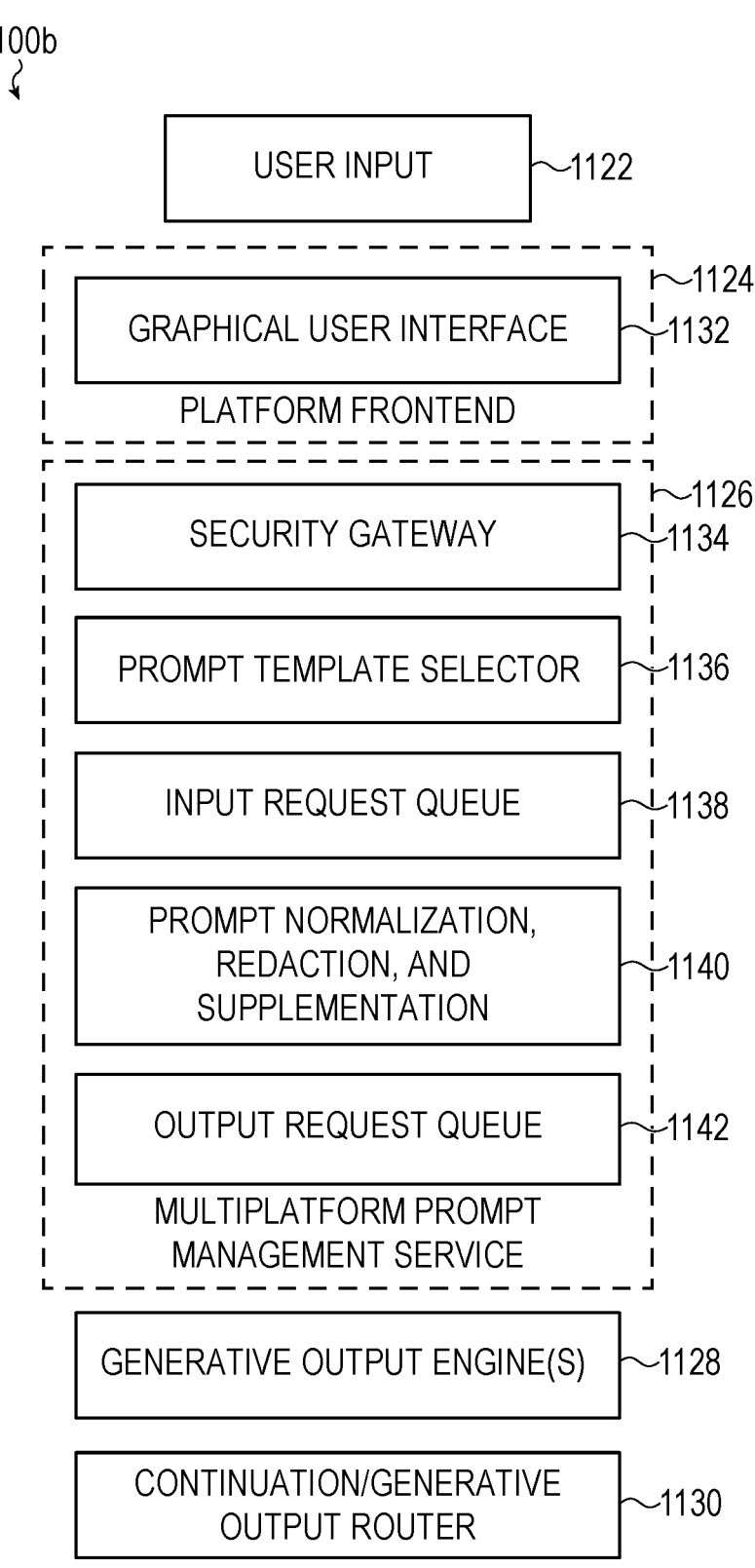
FIG. 11B depicts a functional system diagram of a system that can be used to implement a multiplatform prompt management service.

FIGS. 11A-11B depicts system diagrams and network/communication architectures that may support a system as described herein. Referring to FIG. 11A, the system 1100*a* includes a first set of host servers 1102 associated with one or more software platform backends. These software platform backends can be communicably coupled to a second set of host servers 1104 purpose configured to process requests and responses to and from one or more generative output engines 1106.

Specifically, the first set of host servers 1102 (which, as described above can include processors, memory, storage, network communications, and any other suitable physical hardware cooperating to instantiate software) can allocate certain resources to instantiate a first and second platform backend, such as a first platform backend 1108 and a second platform backend 1110. Each of these respective backends can be instantiated by cooperation of processing and memory resources associated to each respective backend. As illustrated, such dedicated resources are identified as the resource allocations 1108*a* and the resource allocations 1110*a*.

Each of these platform backends can be communicably coupled to an authentication gateway 1112 configured to verify, by querying a permissions table, directory service, or other authentication system (represented by the database 1112*a*) whether a particular request for generative output from a particular user is authorized. Specifically, the second platform backend 1110 may be a documentation platform used by a user operating a frontend thereof.

The user may not have access to information stored in an issue tracking system. In this example, if the user submits a request through the frontend of the documentation platform to the backend of the documentation platform that in any way references the issue tracking system, the authentication gateway 1112 can deny the request for insufficient permissions. This example is merely one and is not intended to be limiting; many possible authorization and authentication operations can be performed by the authentication gateway 1112. The authentication gateway 1112 may be supported by physical hardware resources, such as a processor and memory, represented by the resource allocations 1112*b*.

Once the authentication gateway 1112 determines that a request from a user of either platform is authorized to access data or resources implicated in service that request, the request may be passed to a security gateway 1114, which may be a software instance supported by physical hardware identified in FIG. 11A as the resource allocations 1114*a*. The security gateway 1114 may be configured to determine whether the request itself conforms to one or more policies or rules (data and/or executable representations of which may be stored in a database 1116) established by the organization. For example, the organization may prohibit executing prompts for offensive content, value-incompatible content, personally identifying information, health information, trade secret information, unreleased product information, secret project information, and the like. In other cases, a request may be denied by the security gateway 1114 if the prompt requests beyond a threshold quantity of data.

Once a particular user-initiated prompt has been sufficiently authorized and cleared against organization-specific generative output rules, the request/prompt can be passed to a preconditioning and hydration service 1118 configured to populate request-contextualizing data (e.g., user ID, page ID, project ID, URLs, addresses, times, dates, date ranges, and so on), insert the user's request into a larger engineered template prompt and so on. Example operations of a preconditioning instance are described elsewhere herein; this description is not repeated. The preconditioning and hydration service 1118 can be a software instance supported by physical hardware represented by the resource allocations 1118*a*. In some implementations, the hydration service 1118 may also be used to rehydrate personally identifiable information (PII) or other potentially sensitive data that has been extracted from a request or data exchange in the system.

One a prompt has been modified, replaced, or hydrated by the preconditioning and hydration service 1118, it may be passed to an output gateway 1120 (also referred to as a continuation gateway or an output queue). The output gateway 1120 may be responsible for enqueuing and/or ordering different requests from different users or different software platforms based on priority, time order, or other metrics. The output gateway 1120 can also serve to meter requests to the generative output engines 1106.

FIG. 11B depicts a functional system diagram of the system 1100*a* depicted in FIG. 11A. In particular, the system 1100*b* is configured to operate as a multiplatform prompt management service supporting and ordering requests from multiple users across multiple platforms. In particular, a user input 1122 may be received at a platform frontend 1124. The platform frontend 1124 passes the input to a prompt management service 1126 that formalizes a prompt suitable for input to a generative output engine 1128, which in turn can provide its output to an output router 1160 that may direct generative output to a suitable destination. For example, the output router 1160 may execute API requests generated by the generative output engine 1128, may submit text responses back to the platform frontend 1124, may wrap a text output of the generative output engine 1128 in an API request to update a backend of the platform associated with the platform frontend 1124, or may perform other operations.

Specifically, the user input 1122 (which may be an engagement with a button, typed text input, spoken input, chat box input, and the like) can be provided to a graphical user interface 1132 of the platform frontend 1124. The graphical user interface 1132 can be communicably coupled to a security gateway 1134 of the prompt management service 1126 that may be configured to determine whether the user input 1122 is authorized to execute and/or complies with organization-specific rules.

The security gateway 1134 may provide output to a prompt selector 1136 which can be configured to select a prompt template from a database of preconfigured prompts, templatized prompts, or engineered templatized prompts. Once the raw user input is transformed into a string prompt, the prompt may be provided as input to a request queue 1138 that orders different user request for input from the generative output engine 1128. Output of the request queue 1138 can be provided as input to a prompt hydrator 1140 configured to populate template fields, add context identifiers, supplement the prompt, and perform other normalization operations described herein. In other cases, the prompt hydrator 1140 can be configured to segment a single prompt into multiple discrete requests, which may be interdependent or may be independent.

Thereafter, the modified prompt(s) can be provided as input to an output queue at 1142 that may serve to meter inputs provided to the generative output engine 1128.

These foregoing embodiments depicted in FIGS. 11A-11B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

Figure 12A:
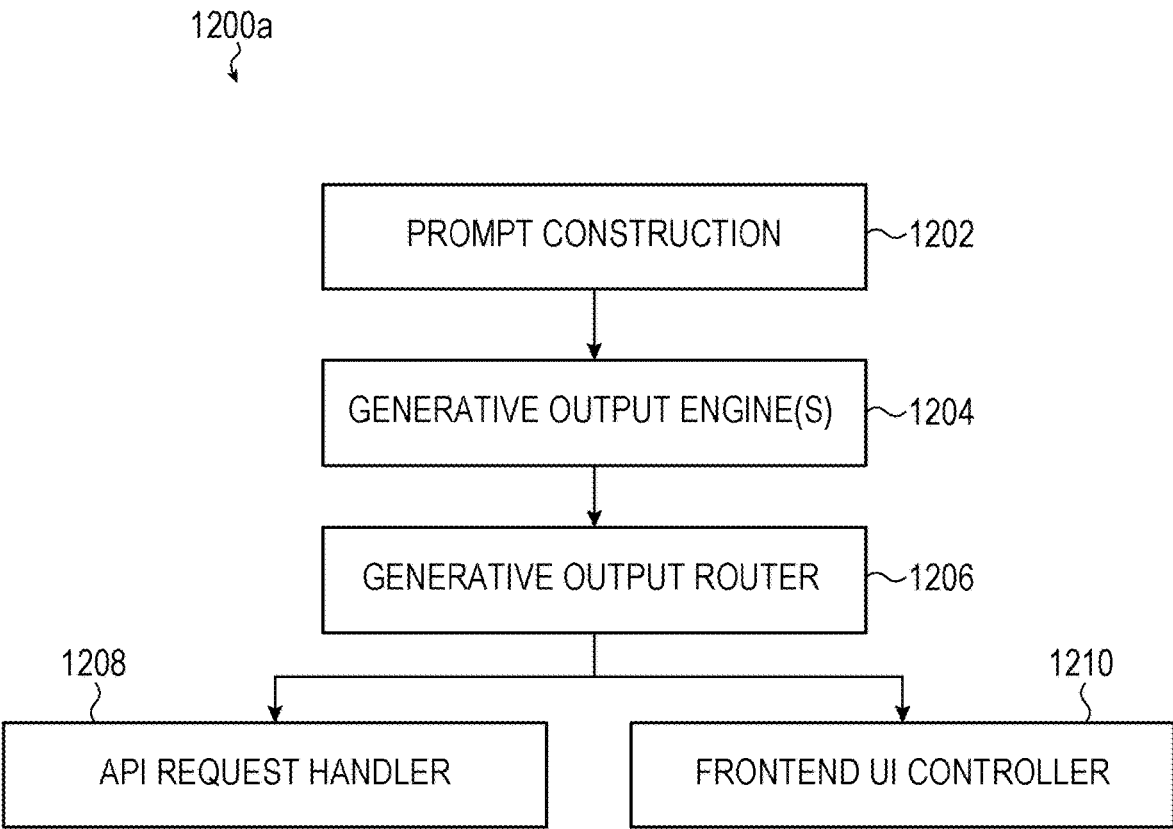
FIG. 12A depicts a simplified system diagram and data processing pipeline.

For example, although many constructions are possible, FIG. 12A depicts a simplified system diagram and data processing pipeline as described herein. The system 1200*a* receives user input, and constructs a prompt therefrom at operation 1202. After constructing a suitable prompt, and populating template fields, selecting appropriate instructions and examples for an LLM to continue, the modified constructed prompt is provided as input to a generative output engine 1204. A continuation from the generative output engine 1204 is provided as input to a router 1206 configured to classify the output of the generative output engine 1204 as being directed to one or more destinations. For example, the router 1206 may determine that a particular generative output is an API request that should be executed against a particular API (e.g., such as an API of a system or platform as described herein). In this example, the router 1206 may direct the output to an API request handler 1208. In another example, the router 1206 may determine that the generative output may be suitably directed to a graphical user interface/frontend. For example, a generative output may include suggestions to be shown to a user below a user's partial input, for example for an input as shown in FIGS. 2-10.

Figure 12B:
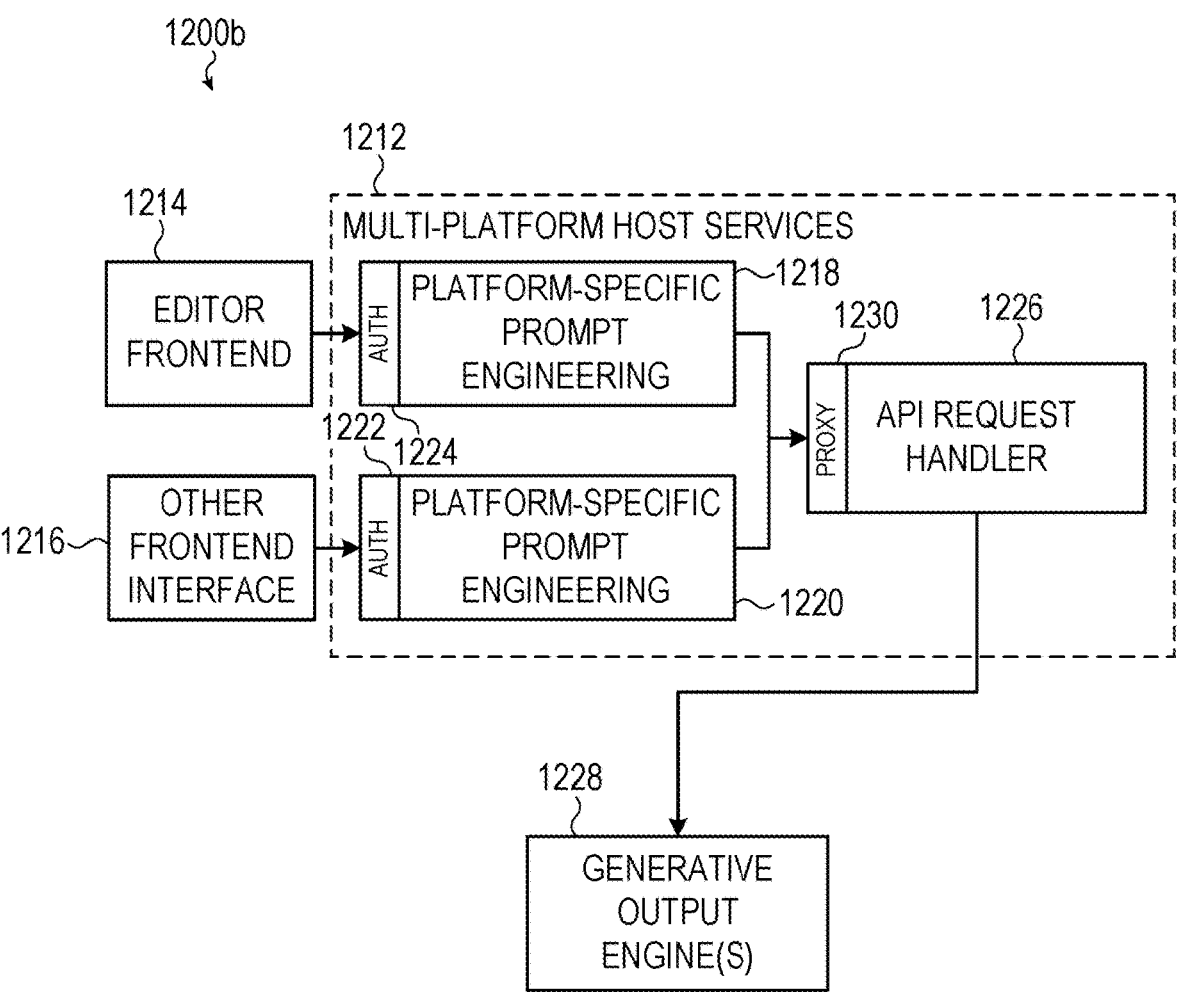
FIG. 12B depicts a system providing multiplatform prompt management as a service.

Another example architecture is shown in FIG. 12B, illustrating a system providing prompt management, and in particular multiplatform prompt management as a service. The system 1200*b* is instantiated over cloud resources, which may be provisioned from a pool of resources in one or more locations (e.g., datacenters). In the illustrated embodiment, the provisioned resources are identified as the multi-platform host services 1212.

The multi-platform host services 1212 can receive input from one or more users in a variety of ways. For example, some users may provide input via an editor region 1214 of a frontend, such as described above. Other users may provide input by engaging with other user interface elements 1216 unrelated to common or shared features across multiple platforms. Specifically, the second user may provide input to the multi-platform host services 1212 by engaging with one or more platform-specific user interface elements. In yet further examples, one or more frontends or backends can be configured to automatically generate one or more prompts for continuation by generative output engines as described herein. More generally, in many cases, user input may not be required and prompts may be requested and/or engineered automatically.

The multi-platform host services 1212 can include multiple software instances or microservices each configured to receive user inputs and/or proposed prompts and configured to provide, as output, an engineered prompt. In many cases, these instances—shown in the figure as the platform-specific prompt engineering services 1218, 1220—can be configured to wrap proposed prompts within engineered prompts retrieved from a database such as described above.

In many cases, the platform-specific prompt engineering services 1218, 1220 can be each configured to authenticate requests received from various sources. In other cases, requests from editor regions or other user interface elements of particular frontends can be first received by one or more authenticator instances, such as the authentication instances 1222, 1224. In other cases, a single centralized authentication service can provide authentication as a service to each request before it is forwarded to the platform-specific prompt engineering services 1218, 1220.

Once a prompt has been engineered/supplemented by one of the platform-specific prompt engineering services 1218, 1220, it may be passed to a request queue/API request handler 1226 configured to generate an API request directed to a generative output engine 1228 including appropriate API tokens and the engineered prompt as a portion of the body of the API request. In some cases, a service proxy 1230 can interpose the platform-specific prompt engineering services 1218, 1220 and the request queue/API request handler 1226, so as to further modify or validate prompts prior to wrapping those prompts in an API call to the generative output engine 1228 by the request queue/API request handler 1226 although this is not required of all embodiments.

These foregoing embodiments depicted in FIGS. 11A-11B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

More generally, it may be appreciated that a system as described herein can be used for a variety of purposes and functions to enhance functionality of collaboration tools.

Detailed examples follow. Similarly, it may be appreciated that systems as described herein can be configured to operate in a number of ways, which may be implementation specific.

For example, it may be appreciated that information security and privacy can be protected and secured in a number of suitable ways. For example, in some cases, a single generative output engine or system may be used by a multiplatform collaboration system as described herein. In this architecture, authentication, validation, and authorization decisions in respect of business rules regarding requests to the generative output engine can be centralized, ensuring auditable control over input to a generative output engine or service and auditable control over output from the generative output engine. In some constructions, authentication to the generative output engine's services may be checked multiple times, by multiple services or service proxies. In some cases, a generative output engine can be configured to leverage different training data in response to differently-authenticated requests. In other cases, unauthorized requests for information or generative output may be denied before the request is forwarded to a generative output engine, thereby protecting tenant-owned information within a secure internal system. It may be appreciated that many constructions are possible.

Additionally, some generative output engines can be configured to discard input and output one a request has been serviced, thereby retaining zero data. Such constructions may be useful to generate output in respect of confidential or otherwise sensitive information. In other cases, such a configuration can enable multi-tenant use of the same generative output engine or service, without risking that prior requests by one tenant inform future training that in turn informs a generative output provided to a second tenant. Broadly, some generative output engines and systems can retain data and leverage that data for training and functionality improvement purposes, whereas other systems can be configured for zero data retention.

In some cases, requests may be limited in frequency, total number, or in scope of information requestable within a threshold period of time. These limitations (which may be applied on the user level, role level, tenant level, product level, and so on) can prevent monopolization of a generative output engine (especially when accessed in a centralized manner) by a single requester. Many constructions are possible.

Figure 13:
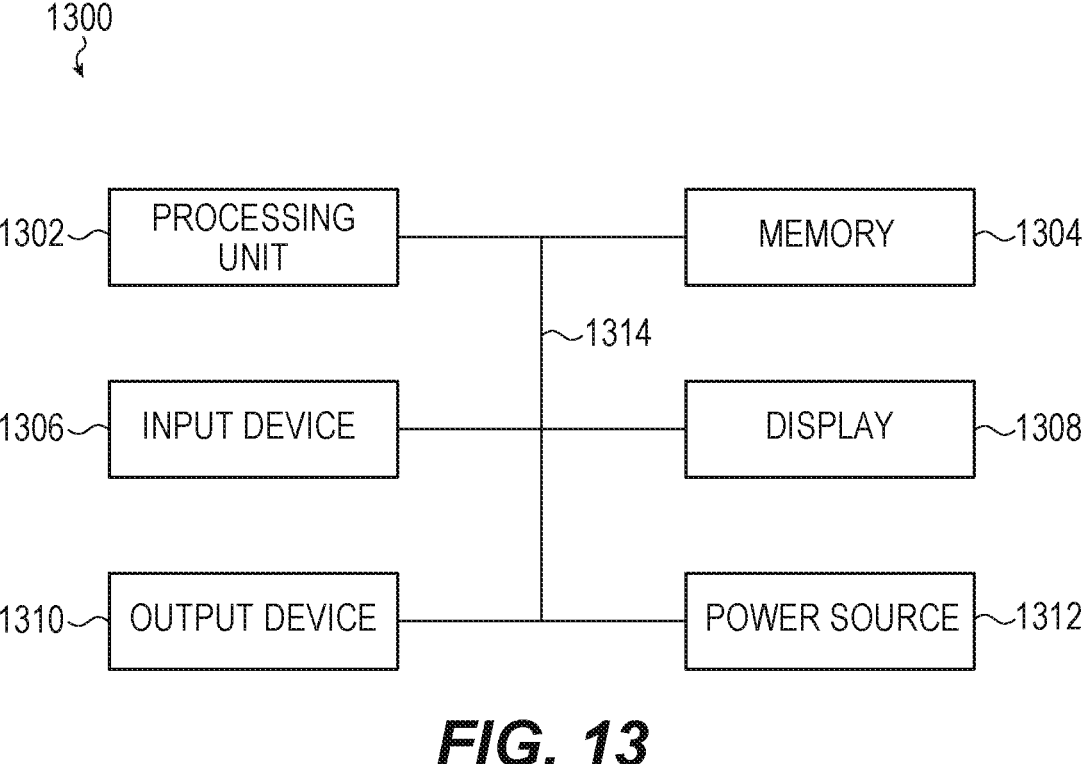
FIG. 13 shows a sample electrical block diagram of an electronic device that may perform the operations described herein.

FIG. 13 shows a sample electrical block diagram of an electronic device 1300 that may perform the operations described herein. The electronic device 1300 may in some cases take the form of any of the electronic devices described with reference to FIGS. 1-12B, including client devices, and/or servers or other computing devices associated with the system 100. The electronic device 1300 can include one or more of a processing unit 1302, a memory 1304 or storage device, input devices 1306, a display 1308, output devices 1310, and a power source 1312. In some cases, various implementations of the electronic device 1300 may lack some or all of these components and/or include additional or alternative components.

The processing unit 1302 can control some or all of the operations of the electronic device 1300. The processing unit 1302 can communicate, either directly or indirectly, with some or all of the components of the electronic device 1300. For example, a system bus or other communication mechanism 1314 can provide communication between the processing unit 1302, the power source 1312, the memory 1304, the input device(s) 1306, and the output device(s) 1310. The processing unit 1302 may be operably coupled to the computer-readable memory 1304, which stores computer-readable instructions. The computer-readable instructions, when executed by the processing unit 1302 may cause the device or system to perform operations described herein with respect to the example embodiments and processes.

The processing unit 1302 can be implemented as any electronic device capable of processing, receiving, or transmitting data or instructions. For example, the processing unit 1302 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1300 can be controlled by multiple processing units. For example, select components of the electronic device 1300 (e.g., an input device 1306) may be controlled by a first processing unit and other components of the electronic device 1300 (e.g., the display 1308) may be controlled by a second processing unit, where the first and second processing units may or may not be in communication with each other.

The power source 1312 can be implemented with any device capable of providing energy to the electronic device 1300. For example, the power source 1312 may be one or more batteries or rechargeable batteries. Additionally, or alternatively, the power source 1312 can be a power connector or power cord that connects the electronic device 1300 to another power source, such as a wall outlet.

The memory 1304 can store electronic data that can be used by the electronic device 1300. For example, the memory 1304 can store electronic data or content such as, for example, audio and video files, documents and applications, device settings and user preferences, timing signals, control signals, and data structures or databases. The memory 1304 can be configured as any type of memory. By way of example only, the memory 1304 can be implemented as random access memory, read-only memory, flash memory, removable memory, other types of storage elements, or combinations of such devices.

In various embodiments, the display 1308 provides a graphical output, for example associated with an operating system, user interface, and/or applications of the electronic device 1300 (e.g., a chat user interface, an issue-tracking user interface, an issue-discovery user interface, etc.). In one embodiment, the display 1308 includes one or more sensors and is configured as a touch-sensitive (e.g., single-touch, multi-touch) and/or force-sensitive display to receive inputs from a user. For example, the display 1308 may be integrated with a touch sensor (e.g., a capacitive touch sensor) and/or a force sensor to provide a touch- and/or force-sensitive display. The display 1308 is operably coupled to the processing unit 1302 of the electronic device 1300.

The display 1308 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 1308 is positioned beneath and viewable through a cover that forms at least a portion of an enclosure of the electronic device 1300.

In various embodiments, the input devices 1306 may include any suitable components for detecting inputs. Examples of input devices 1306 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1306 may be configured to detect one or more particular types of input and provide a signal (e.g., an input signal) corresponding to the detected input. The signal may be provided, for example, to the processing unit 1302.

As discussed above, in some cases, the input device(s) 1306 include a touch sensor (e.g., a capacitive touch sensor) integrated with the display 1308 to provide a touch-sensitive display. Similarly, in some cases, the input device(s) 1306 include a force sensor (e.g., a capacitive force sensor) integrated with the display 1308 to provide a force-sensitive display.

The output devices 1310 may include any suitable components for providing outputs. Examples of output devices 1310 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device of the output devices 1310 may be configured to receive one or more signals (e.g., an output signal provided by the processing unit 1302) and provide an output corresponding to the signal.

In some cases, input devices 1306 and output devices 1310 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1302 may be operably coupled to the input devices 1306 and the output devices 1310. The processing unit 1302 may be adapted to exchange signals with the input devices 1306 and the output devices 1310. For example, the processing unit 1302 may receive an input signal from an input device 1306 that corresponds to an input detected by the input device 1306. The processing unit 1302 may interpret the received input signal to determine whether to provide and/or change one or more outputs in response to the input signal. The processing unit 1302 may then send an output signal to one or more of the output devices 1310, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore, the foregoing examples and description of instances of purpose-configured software, whether accessible via API as a request-response service, an event-driven service, or whether configured as a self-contained data processing service are understood as not exhaustive. The various functions and operations of a system, such as described herein, can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A computer-implemented method for generating content within a content collaboration platform, the method comprising:

causing display of a graphical user interface of the content collaboration platform, the graphical user interface including a navigation panel and a content panel, the navigational panel including a hierarchical element tree having a set of hierarchically arranged elements, each element selectable to cause display of respective content of a respective content item in the content panel of the graphical user interface;

prior to display of the graphical user interface, identifying a set of content items satisfying a content timeliness criteria, the set of content items managed by the content collaboration platform;

extracting content from a particular content item of the identified set of content items;

analyzing the extracted content to identify a set of text segments having a content ranking satisfying a relevance criteria;

generating a prompt including:

predetermined query prompt text;

the set of text segments satisfying the relevance criteria;

providing the prompt to a generative output engine;

obtaining a generative response from the generative output engine produced in response to the prompt;

publishing the generative response to a node of a graph-based storage structure of the content collaboration platform;

in response to a user input with respect to a particular element of the set of hierarchically arranged elements, causing display of a window element overlaying at least a portion of the content panel;

extracting a first set of data from the particular content item associated with the particular element;

querying the graph-based storage structure to obtain content stored in the node corresponding to the particular content item;

causing display of the first set of data and at least a portion of the content obtained from the node in the window element; and in response to a user selection of the particular element, cause display of particular content of the particular content item in the content panel of the graphical user interface.

2. The computer-implemented method of claim 1, wherein:

the prompt is a second prompt;

the generative response is a second generative response;

the predetermined query prompt text is a second predetermined query prompt text; and the method further comprises:

generating a first prompt including:

the extracted content from the particular content item;

first predetermined query prompt text including a set of example content classification types;

obtaining a first generative response from the generative output engine, the first generative response generated in response to the first prompt being provided to the generative output engine, the first generative response including a predicted classification type; and selecting the second predetermined query prompt text from a set of predetermined prompt texts based on the predicted classification type of the first generative response.

3. The computer-implemented method of claim 1, wherein:

the prompt is a second prompt;

the generative response is a second generative response;

the predetermined query prompt text is a second predetermined query prompt text; and the method further comprises:

generating a first prompt including:

the extracted content from the particular content item;

first predetermined query prompt text including one or more content formatting styles;

obtaining a first generative response from the generative output engine, the first generative response generated in response to the first prompt being provided to the generative output engine, the first generative response including a recommended formatting style; and selecting the second predetermined query prompt text from a set of predetermined prompt texts based on the recommended formatting style of the first generative response.

4. The computer-implemented method of claim 3, wherein:

the second predetermined query prompt text includes instructions to generate a table using the set of text segments; and the window element includes the table.

5. The computer-implemented method of claim 1, wherein:

the predetermined query prompt text is selected from a set of predetermined prompt texts based on an anticipated role of an authenticated user;

the graph-based storage structure includes multiple generative responses for a corresponding content item, each of the multiple generative responses associated with a different anticipated role;

querying the graph-based storage structure to obtain the content further includes a particular role of a particular user providing the user input with respect to the particular element; and the content obtained from the graph-based storage structure is selected based, at least in part, on the particular role of the particular user.

6. The computer-implemented method of claim 1, wherein:

the generative response is published to the graph-based storage structure with timestamp data;

the timestamp data corresponds to a time associated with the content extraction; and evaluation of a respective content item with respect to the content timeliness criteria includes evaluating an amount of new content created subsequent to a respective timestamp of a respective node of the graph-based storage structure.

7. The computer-implemented method of claim 6, wherein:

the amount of new content is determined using a substantial update flag; and the substantial update flag is associated with the respective content item.

8. The computer-implemented method of claim 1, wherein:

the extracted content is further analyzed to detect a presence of one or more linked content items; and the displayed window element includes one or more selectable graphical objects corresponding to the one or more linked content items.

9. The computer-implemented method of claim 1, wherein:

analyzing the extracted content to identify the set of text segments includes:

determining or obtaining vector representations of two or more of multiple text segments of the particular content item; and selecting the set of text segments based on a topic analysis using the vector representations.

10. A system of a content collaboration platform, the system comprising:

one or more processing units;

computer readable memory storing computer readable instructions that when executed by the one or more processing units cause the system to:

identify a set of content items satisfying a content criteria;

extract content from a particular content item of the identified set of content items;

analyze the extracted content to identify a set of text segments having a content ranking satisfying a relevance criteria;

generate a prompt including:

predetermined query prompt text; and the set of text segments;

provide the prompt to a generative output engine;

obtain a generative response from the generative output engine, the generative response produced in response to the prompt being provided to the generative output engine;

publish the generative response to a node of a knowledge graph of a content store of the content collaboration platform;

cause display of a graphical user interface of the content collaboration platform, the graphical user interface including a content panel displaying respective content of a respective page, the respective content including a selectable graphical object that is selectable to cause display of the particular content item;

in response to a user input with respect to the selectable graphical object, cause display of a window element overlaying at least a portion of the content panel;

extract a first set of data from the particular content item associated with the selectable graphical object;

query the knowledge graph of the content store to obtain content stored in the node corresponding to the particular content item; and cause display of the first set of data and at least a portion of the content obtained from the node in the window element.

11. The system of claim 10, wherein:

the selectable graphical object is associated with a path to the particular content item;

the selectable graphical object includes metadata extracted from the particular content item;

the metadata is extracted from the particular content item using the path associated with the selectable graphical object; and the particular content item is provided by the content collaboration platform.

12. The system of claim 10, wherein:

the particular content item is provided by an external platform that is external to the content collaboration platform;

the content extracted from the particular content item of the identified set of content items is extracted using a first application programming interface call to the external platform;

the selectable graphical object includes metadata extracted from the particular content item; and the metadata is extracted from the particular content item using a second application programming interface call to the external platform.

13. The system of claim 10, wherein:

the prompt is a second prompt;

the generative response is a second generative response;

the predetermined query prompt text is a second predetermined query prompt text; and the computer readable instructions, when executed by the one or more processing units, further cause the system to:

generate a first prompt including:

the extracted content from the particular content item;

first predetermined query prompt text including one or more content formatting styles;

obtain a first generative response from the generative output engine, the first generative response generated in response to the first prompt being provided to the generative output engine, the first generative response including a recommended formatting style; and select the second predetermined query prompt text from a set of predetermined prompt texts based on the recommended formatting style of the first generative response.

14. The system of claim 10, wherein the user input provided with respect to the selectable graphical object includes a hover cursor input.

15. A computer-implemented method for providing a graphical user interface of a content collaboration platform, the method comprising:

causing display of the graphical user interface of the content collaboration platform, the graphical user interface including a feed including a set of feed items, each feed item selectable to cause display of respective content of a respective content item in a content panel of the graphical user interface;

prior to display of the graphical user interface, identifying a set of content items satisfying a content criteria, the set of content items managed by a set of distinct platforms including the content collaboration platform;

extracting content from a particular content item of the identified set of content items;

generating a prompt including:

predetermined prompt query text;

the extracted content from the particular content item;

providing the prompt to a generative output engine;

obtaining a generative response from the generative output engine produced in response to the prompt;

publishing the generative response to a node of a knowledge graph of the content collaboration platform;

in response to a user input with respect to a particular feed item of the set of feed items, causing display of a window element in the graphical user interface;

extracting a first set of data from the particular content item associated with the particular feed item;

querying the knowledge graph to obtain content stored in the node corresponding to the particular feed item;

causing display of the first set of data and at least a portion of the content obtained from the node in the window element; and in response to a user selection of the particular feed item, cause display of particular content of the particular content item in the content panel of the graphical user interface.

16. The computer-implemented method of claim 15, wherein:

one or more feed items of the set of feed items are generated in response to a respective event occurring with respect to a respective content item on an external platform of the set of distinct platforms;

the content collaboration platform is a documentation platform hosting electronic document content items; and the external platform is an issue tracking platform hosting issue content items.

17. The computer-implemented method of claim 16, wherein extracting content from issue content items includes executing an application programming interface call to the issue tracking platform to obtain the content from one or more of a set of issue content items managed by the issue tracking platform.

18. The computer-implemented method of claim 15, wherein:

the prompt is a second prompt;

the generative response is a second generative response;

the predetermined query prompt text is a second predetermined query prompt text; and the method further comprises:

generating a first prompt including:

the extracted content from the particular content item;

first predetermined query prompt text including a set of example content classification types;

obtaining a first generative response from the generative output engine, the first generative response generated in response to the first prompt being provided to the generative output engine, the first generative response including a predicted classification type; and selecting the second predetermined query prompt text from a set of predetermined prompt texts based on the predicted classification type of the first generative response.

19. The computer-implemented method of claim 15, wherein:

the predetermined query prompt text is selected from a set of predetermined prompt texts based on an anticipated role of an authenticated user;

the knowledge graph includes multiple generative responses for a corresponding content item, each of the multiple generative responses associated with a different anticipated role;

querying the knowledge graph to obtain the content further includes a particular role of a particular user providing the user input with respect to the particular feed item; and the content obtained from the knowledge graph is selected based, at least in part, on the particular role of the particular user.

20. The computer-implemented method of claim 15, wherein extracting content from the particular content item comprises:

generating vector representations of two or more of a set of multiple text segments of the particular content item; and selecting a subset of top-ranking text segments of the two or more text segments using a topic analysis of the vector representations.

\* \* \* \* \*